US012562107B2

(12) United States Patent
Lim et al.

(10) Patent No.: US 12,562,107 B2
(45) Date of Patent: Feb. 24, 2026

(54) PIXEL CIRCUIT, DISPLAY APPARATUS INCLUDING THE SAME AND ELECTRONIC APPARATUS INCLUDING THE SAME

(71) Applicant: Samsung Display Co., LTD., Yongin-si (KR)

(72) Inventors: Jaekeun Lim, Yongin-si (KR); Bon-Seog Gu, Yongin-si (KR); Jinyoung Roh, Yongin-si (KR); Hae-Kwan Seo, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/964,861

(22) Filed: Dec. 2, 2024

(65) Prior Publication Data

US 2025/0225917 A1 Jul. 10, 2025

(30) Foreign Application Priority Data

Jan. 4, 2024 (KR) ........................ 10-2024-0001330

(51) Int. Cl.
*G09G 3/32* (2016.01)

(52) U.S. Cl.
CPC ....... *G09G 3/32* (2013.01); *G09G 2300/0819* (2013.01); *G09G 2300/0842* (2013.01); *G09G 2300/0861* (2013.01); *G09G 2310/08* (2013.01); *G09G 2330/021* (2013.01)

(58) Field of Classification Search
CPC ............. G09G 3/32; G09G 2300/0819; G09G 2300/0842; G09G 2300/0861; G09G 2310/08; G09G 2330/021
See application file for complete search history.

(56) References Cited

U.S. PATENT DOCUMENTS

| | | | | |
|---|---|---|---|---|
| 2010/0265237 | A1 | 10/2010 | Tsuge | |
| 2019/0066598 | A1 | 2/2019 | Kim et al. | |
| 2019/0096321 | A1* | 3/2019 | Yang | H05B 45/60 |
| 2019/0371238 | A1 | 12/2019 | Gao et al. | |
| 2021/0335281 | A1* | 10/2021 | Nam | G09G 3/3696 |
| 2022/0122534 | A1 | 4/2022 | Kim | |
| 2023/0306907 | A1* | 9/2023 | Park | G09G 3/3291 |
| 2023/0395030 | A1* | 12/2023 | Kim | G09G 3/3233 |

OTHER PUBLICATIONS

Extended European Search Report, Application No. 25150074.0, mailed Apr. 28, 2025, 24 pages.

* cited by examiner

*Primary Examiner* — Andrew Sasinowski
(74) *Attorney, Agent, or Firm* — CANTOR COLBURN LLP

(57) ABSTRACT

A pixel circuit includes a light emitting element, a first switching element including a control electrode connected to a first node, a first electrode connected to a second node and a second electrode connected to a third node and applying a driving current to the light emitting element, a second switching element applying the data voltage to the second node in response to a writing gate signal, a third switching element connecting the first node and the third node in response to a compensation gate signal, a capacitor including a first electrode connected to the first node and a second electrode connected to a fourth node, an eighth switching element including a first electrode receiving a reference voltage and a second electrode connected to the fourth node and a ninth switching element including a first electrode receiving a first power voltage and a second electrode connected to the fourth node.

34 Claims, 49 Drawing Sheets

PIXEL CIRCUIT, DISPLAY APPARATUS INCLUDING THE SAME AND ELECTRONIC APPARATUS INCLUDING THE SAME

This application claims priority to Korean Patent Application No. 10-2024-0001330, filed on Jan. 4, 2024, and all the benefits accruing therefrom under 35 U.S.C. § 119, the content of which in its entirety is herein incorporated by reference.

BACKGROUND

1. Field

Embodiments of the present invention relate to a pixel circuit, a display apparatus including the pixel circuit and an electronic apparatus including the display apparatus. More particularly, embodiments of the present invention relate to a pixel circuit including a light emitting element having a driving current determined based on a reference voltage lower than a first power voltage, a display apparatus including the pixel circuit and an electronic apparatus including the display apparatus.

2. Description of the Related Art

Generally, a display apparatus includes a display panel and a display panel driver. The display panel includes a plurality of gate lines, a plurality of data lines, a plurality of emission lines and a plurality of pixels. The display panel driver includes a gate driver, a data driver, an emission driver and a driving controller. The gate driver outputs gate signals to the gate lines. The data driver outputs data voltages to the data lines. The emission driver outputs emission signals to the emission lines. The driving controller controls the gate driver, the data driver and the emission driver.

In a conventional pixel circuit, a driving current of a light emitting element may be determined based on a difference between a first power voltage and a data voltage so that the conventional pixel circuit may be driven in a relatively high power consumption.

SUMMARY

Embodiments of the present invention provide a pixel circuit including a light emitting element having a driving current determined based on a difference between a reference voltage, which is lower than a first power voltage, and a data voltage to reduce a power consumption.

Embodiments of the present invention also provide a display apparatus including the pixel circuit.

Embodiments of the present invention also provide an electronic apparatus including the display panel.

In an embodiment of a pixel circuit according to the present invention, the pixel circuit includes a light emitting element, a first switching element including a control electrode connected to a first node, a first electrode connected to a second node and a second electrode connected to a third node and configured to apply a driving current to the light emitting element, a second switching element configured to apply a data voltage to the second node in response to a data writing gate signal, a third switching element configured to connect the first node and the third node in response to a compensation gate signal, a capacitor including a first electrode connected to the first node and a second electrode connected to a fourth node, an eighth switching element including a first electrode configured to receive a reference voltage and a second electrode connected to the fourth node and a ninth switching element including a first electrode configured to receive a first power voltage and a second electrode connected to the fourth node. One of the eighth switching element and the ninth switching element is an N-type transistor and the other of the eighth switching element and the ninth switching element is a P-type transistor.

In an embodiment, the reference voltage may be lower than the first power voltage.

In an embodiment, the driving current may be determined by a difference between the reference voltage and the data voltage.

In an embodiment, the eighth switching element may further include a control electrode configured to receive the compensation gate signal. The ninth switching element may further include a control electrode configured to receive the compensation gate signal.

In an embodiment, the pixel circuit may further include a fourth switching element including a control electrode configured to receive an initialization gate signal, a first electrode connected to the first node and a second electrode configured to receive a first initialization voltage, a fifth switching element including a control electrode configured to receive an emission signal, a first electrode configured to receive the first power voltage and a second electrode connected to the second node, a sixth switching element including a control electrode configured to receive the emission signal, a first electrode connected to the third node and a second electrode connected to an anode electrode of the light emitting element and a seventh switching element including a control electrode configured to receive the data writing gate signal, a first electrode configured to receive a second initialization voltage and a second electrode connected to the anode electrode.

In an embodiment, the pixel circuit may further include a fourth switching element including a control electrode configured to receive an initialization gate signal, a first electrode connected to the first node and a second electrode configured to receive a first initialization voltage, a fifth switching element including a control electrode configured to receive an emission signal, a first electrode configured to receive the first power voltage and a second electrode connected to the second node, a sixth switching element including a control electrode configured to receive the emission signal, a first electrode connected to the third node and a second electrode connected to an anode electrode of the light emitting element and a seventh switching element including a control electrode configured to receive the initialization gate signal, a first electrode configured to receive a second initialization voltage and a second electrode connected to the anode electrode.

In an embodiment, the pixel circuit may further include a fourth switching element including a control electrode configured to receive an initialization gate signal, a first electrode connected to the first node and a second electrode configured to receive a first initialization voltage, a fifth switching element including a control electrode configured to receive an emission signal, a first electrode configured to receive the first power voltage and a second electrode connected to the second node, a sixth switching element including a control electrode configured to receive the emission signal, a first electrode connected to the third node and a second electrode connected to an anode electrode of the light emitting element and a seventh switching element including a control electrode configured to receive the compensation gate signal, a first electrode configured to receive a second initialization voltage and a second electrode connected to the anode electrode.

In an embodiment, the pixel circuit may further include a fourth switching element including a control electrode configured to receive an initialization gate signal, a first electrode connected to the first node and a second electrode configured to receive a first initialization voltage, a fifth switching element including a control electrode configured to receive an emission signal, a first electrode configured to receive the first power voltage and a second electrode connected to the second node, a sixth switching element including a control electrode configured to receive the emission signal, a first electrode connected to the third node and a second electrode connected to an anode electrode of the light emitting element and a seventh switching element including a control electrode configured to receive the emission signal, a first electrode configured to receive a second initialization voltage and a second electrode connected to the anode electrode.

In an embodiment, the pixel circuit may further include a fourth switching element including a control electrode configured to receive an initialization gate signal, a first electrode connected to the first node and a second electrode configured to receive a first initialization voltage, a fifth switching element including a control electrode configured to receive an emission signal, a first electrode configured to receive the first power voltage and a second electrode connected to the second node, a sixth switching element including a control electrode configured to receive the emission signal, a first electrode connected to the third node and a second electrode connected to an anode electrode of the light emitting element and a seventh switching element including a control electrode configured to receive a data writing gate signal of a previous stage, a first electrode configured to receive a second initialization voltage and a second electrode connected to the anode electrode.

In an embodiment, the eighth switching element may further include a control electrode configured to receive an emission signal. The ninth switching element may further include a control electrode configured to receive the emission signal.

In an embodiment, the pixel circuit may further include a fourth switching element including a control electrode configured to receive an initialization gate signal, a first electrode connected to the first node and a second electrode configured to receive a first initialization voltage, a fifth switching element including a control electrode configured to receive the emission signal, a first electrode configured to receive the first power voltage and a second electrode connected to the second node, a sixth switching element including a control electrode configured to receive the emission signal, a first electrode connected to the third node and a second electrode connected to an anode electrode of the light emitting element and a seventh switching element including a control electrode configured to receive the data writing gate signal, a first electrode configured to receive a second initialization voltage and a second electrode connected to the anode electrode.

In an embodiment, the pixel circuit may further include a fourth switching element including a control electrode configured to receive an initialization gate signal, a first electrode connected to the first node and a second electrode configured to receive a first initialization voltage, a fifth switching element including a control electrode configured to receive the emission signal, a first electrode configured to receive the first power voltage and a second electrode connected to the second node, a sixth switching element including a control electrode configured to receive the emission signal, a first electrode connected to the third node and a second electrode connected to an anode electrode of the light emitting element and a seventh switching element including a control electrode configured to receive the initialization gate signal, a first electrode configured to receive a second initialization voltage and a second electrode connected to the anode electrode.

In an embodiment, the pixel circuit may further include a fourth switching element including a control electrode configured to receive an initialization gate signal, a first electrode connected to the first node and a second electrode configured to receive a first initialization voltage, a fifth switching element including a control electrode configured to receive the emission signal, a first electrode configured to receive the first power voltage and a second electrode connected to the second node, a sixth switching element including a control electrode configured to receive the emission signal, a first electrode connected to the third node and a second electrode connected to an anode electrode of the light emitting element and a seventh switching element including a control electrode configured to receive the compensation gate signal, a first electrode configured to receive a second initialization voltage and a second electrode connected to the anode electrode.

In an embodiment, the pixel circuit may further include a fourth switching element including a control electrode configured to receive an initialization gate signal, a first electrode connected to the first node and a second electrode configured to receive a first receive the emission signal, a first electrode configured to receive the first power voltage and a second electrode connected to the second node, a sixth switching element including a control electrode configured to receive the emission signal, a first electrode connected to the third node and a second electrode connected to an anode electrode of the light emitting element and a seventh switching element including a control electrode configured to receive the emission signal, a first electrode configured to receive a second initialization voltage and a second electrode connected to the anode electrode.

In an embodiment, the pixel circuit may further include a fourth switching element including a control electrode configured to receive an initialization gate signal, a first electrode connected to the first node and a second electrode configured to receive a first initialization voltage, a fifth switching element including a control electrode configured to receive the emission signal, a first electrode configured to receive the first power voltage and a second electrode connected to the second node, a sixth switching element including a control electrode configured to receive the emission signal, a first electrode connected to the third node and a second electrode connected to an anode electrode of the light emitting element and a seventh switching element including a control electrode configured to receive a data writing gate signal of a previous stage, a first electrode configured to receive a second initialization voltage and a second electrode connected to the anode electrode.

In an embodiment, the eighth switching element may further include a control electrode configured to receive a reference gate signal. The ninth switching element may further include a control electrode configured to receive the reference gate signal.

In an embodiment, the pixel circuit may further include a fourth switching element including a control electrode configured to receive an initialization gate signal, a first electrode connected to the first node and a second electrode configured to receive a first receive an emission signal, a first electrode configured to receive the first power voltage and a second electrode connected to the second node, a sixth switching element including a control electrode configured to receive the emission signal, a first electrode connected to the third node and a second electrode connected to an anode electrode of the light emitting element and a seventh switching element including a control electrode configured to receive the data writing gate signal, a first electrode configured to receive a second initialization voltage and a second electrode connected to the anode electrode.

In an embodiment, the pixel circuit may further include a fourth switching element including a control electrode configured to receive an initialization gate signal, a first electrode connected to the first node and a second electrode configured to receive a first initialization voltage, a fifth switching element including a control electrode configured to receive an emission signal, a first electrode configured to receive the first power voltage and a second electrode connected to the second node, a sixth switching element including a control electrode configured to receive the emission signal, a first electrode connected to the third node and a second electrode connected to an anode electrode of the light emitting element and a seventh switching element including a control electrode configured to receive the reference gate signal, a first electrode configured to receive a second initialization voltage and a second electrode connected to the anode electrode. The seventh switching element and the eighth pixel switching element may be P-type transistors. The ninth switching element may be an N-type transistor.

In an embodiment, the pixel circuit may further include a fourth switching element including a control electrode configured to receive an initialization gate signal, a first electrode connected to the first node and a second electrode configured to receive a first initialization voltage, a fifth switching element including a control electrode configured to receive an emission signal, a first electrode configured to receive the first power voltage and a second electrode connected to the second node, a sixth switching element including a control electrode configured to receive the emission signal, a first electrode connected to the third node and a second electrode connected to an anode electrode of the light emitting element and a seventh switching element including a control electrode configured to receive the reference gate signal, a first electrode configured to receive a second initialization voltage and a second electrode connected to the anode electrode. The seventh switching element and the eighth pixel switching element may be N-type transistors. The ninth switching element may be a P-type transistor.

In an embodiment, the pixel circuit may further include a fourth switching element including a control electrode configured to receive an initialization gate signal, a fifth switching element including a control electrode configured to receive an emission signal and a sixth switching element including a control electrode configured to receive the emission signal. The eighth switching element may further include a control electrode configured to receive the compensation gate signal. The ninth switching element may further include a control electrode configured to receive the compensation gate signal.

In an embodiment, in a first period, the emission signal may have an inactive level, the initialization gate signal may have an active level, the compensation gate signal may have a low level and the data writing gate signal may have an inactive level.

In an embodiment, in a second period subsequent to the first period, the emission signal may have the inactive level, the initialization gate signal may have an inactive level, the compensation gate signal may have a high level and the data writing gate signal may have the inactive level.

In an embodiment, in a third period subsequent to the second period, the emission signal may have the inactive level, the initialization gate signal may have the inactive level, the compensation gate signal may have the high level and the data writing gate signal may have an active level.

In an embodiment, in a fourth period subsequent to the third period, the emission signal may have the inactive level, the initialization gate signal may have the inactive level, the compensation gate signal may have the low level and the data writing gate signal may have the inactive level.

In an embodiment, in a fifth period subsequent to the fourth period, the emission signal may have an active level, the initialization gate signal may have inactive level, the compensation gate signal may have the low level and the data writing gate signal may have the inactive level.

In an embodiment, in a second period subsequent to the first period, the emission signal may have the inactive level, the initialization gate signal may have the active level, the compensation gate signal may have the high level and the data writing gate signal may have the inactive level.

In an embodiment, the pixel circuit may further include a fourth switching element including a control electrode configured to receive an initialization gate signal, a fifth switching element including a control electrode configured to receive an emission signal and a sixth switching element including a control electrode configured to receive the emission signal. The eighth switching element may further include a control electrode configured to receive the emission signal. The ninth switching element further may further include a control electrode configured to receive the emission signal.

In an embodiment, in a first period, the emission signal may have a high level, the initialization gate signal may have an active level, the compensation gate signal may have an inactive level and the data writing gate signal may have an inactive level. In a third period subsequent to the first period, the emission signal may have the high level, the initialization gate signal may have an inactive level, the compensation gate signal may have an active level and the data writing gate signal may have an active level. In a fifth period subsequent to the third period, the emission signal may have an active level, the initialization gate signal may have the inactive level, the compensation gate signal may have a low level and the data writing gate signal may have the inactive level.

In an embodiment, the pixel circuit may further include a fourth switching element including a control electrode configured to receive an initialization gate signal, a fifth switching element including a control electrode configured to receive an emission signal and a sixth switching element including a control electrode configured to receive the emission signal. The eighth switching element may further include a control electrode configured to receive a reference gate signal. The ninth switching element may further include a control electrode configured to receive the reference gate signal.

In an embodiment, in a first period, the emission signal may have an inactive level, the initialization gate signal may have an active level, the compensation gate signal may have an inactive level, the data writing gate signal may have an inactive level and the reference gate signal may have a high level. In a third period subsequent to the first period, the emission signal may have the inactive level, the initialization gate signal may have an inactive level, the compensation gate signal may have an active level, the data writing gate signal may have an active level and the reference gate signal may have the high level. In a fifth period subsequent to the third period, the emission signal may have an active level, the initialization gate signal may have the inactive level, the compensation gate signal may have the inactive level, the data writing gate signal may have the inactive level and the reference gate signal may have a low level.

In an embodiment, in a writing frame in which the data voltage is written to the second node and the light emitting element emits a light, the emission signal may have an active period and an inactive period, the initialization gate signal may have an active period and an inactive period, the compensation gate signal may have an active period and an inactive period, the data writing gate signal may have an active period and an inactive period and the reference gate signal may have an active period and an inactive period. In a holding frame in which the data voltage is not written to the second node and the light emitting element emits a light, the emission signal may have the active period and the inactive period, the initialization gate signal may have only the inactive period among the inactive period and the active period, the compensation gate signal may have only the inactive period among the inactive period and the active period, the data writing gate signal may have only the inactive period among the inactive period and the active period and the reference gate signal may have the active period and the inactive period.

In an embodiment, the reference voltage may have a first voltage level in the writing frame. The reference voltage may have a second voltage level lower than the first voltage level in the holding frame.

In an embodiment of a display apparatus according to the present invention, the display apparatus includes a display panel, a gate driver, a data driver and an emission driver. The display panel includes a pixel. The gate driver is configured to apply a gate signal to the pixel. The data driver is configured to apply a data voltage to the pixel. The emission driver is configured to apply an emission signal to the pixel. The pixel includes a light emitting element, a first switching element including a control electrode connected to a first node, a first electrode connected to a second node and a second electrode connected to a third node and configured to apply a driving current to the light emitting element, a second switching element configured to apply the data voltage to the second node in response to a data writing gate signal, a third switching element configured to connect the first node and the third node in response to a compensation gate signal, a capacitor including a first electrode connected to the first node and a second electrode connected to a fourth node, an eighth switching element including a first electrode configured to receive a reference voltage and a second electrode connected to the fourth node and a ninth switching element including a first electrode configured to receive a first power voltage and a second electrode connected to the fourth node. One of the eighth switching element and the ninth switching element is an N-type transistor and the other of the eighth switching element and the ninth switching element is a P-type transistor.

In an embodiment of an electronic apparatus according to the present invention, the electronic apparatus includes a display panel, a gate driver, a data driver, an emission driver, a driving controller and a host. The display panel includes a pixel configured to display an image based on input image data. The gate driver is configured to apply a gate signal to the pixel. The data driver is configured to apply a data voltage to the pixel. The emission driver is configured to apply an emission signal to the pixel. The pixel includes a light emitting element, a first switching element including a control electrode connected to a first node, a first electrode connected to a second node and a second electrode connected to a third node and configured to apply a driving current to the light emitting element, a second switching element configured to apply the data voltage to the second node in response to a data writing gate signal, a third switching element configured to connect the first node and the third node in response to a compensation gate signal, a capacitor including a first electrode connected to the first node and a second electrode connected to a fourth node, an eighth switching element including a first electrode configured to receive a reference voltage and a second electrode connected to the fourth node and a ninth switching element including a first electrode configured to receive a first power voltage and a second electrode connected to the fourth node. One of the eighth switching element and the ninth switching element is an N-type transistor and the other of the eighth switching element and the ninth switching element is a P-type transistor.

According to the pixel circuit, the display apparatus including the pixel circuit and the electronic apparatus including the display apparatus, the driving current of the light emitting element may be determined based on the difference between the reference voltage, which is lower than the first power voltage, and the data voltage in the pixel circuit. Thus, the power consumption of the pixel circuit may be reduced.

BRIEF DESCRIPTION OF THE DRAWINGS

The above and other features and advantages of the invention will become more apparent by describing in detailed embodiments thereof with reference to the accompanying drawings, in which.

DETAILED DESCRIPTION OF THE INVENTION

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

It will be understood that when an element is referred to as "connected to" another element, it can be directly connected to the other element or intervening elements may be present therebetween. In contrast, when an element is referred to as "connected to" another element, there are no intervening elements present. Hereinafter, the present invention will be explained in detail with reference to the accompanying drawings.

Figure 1:
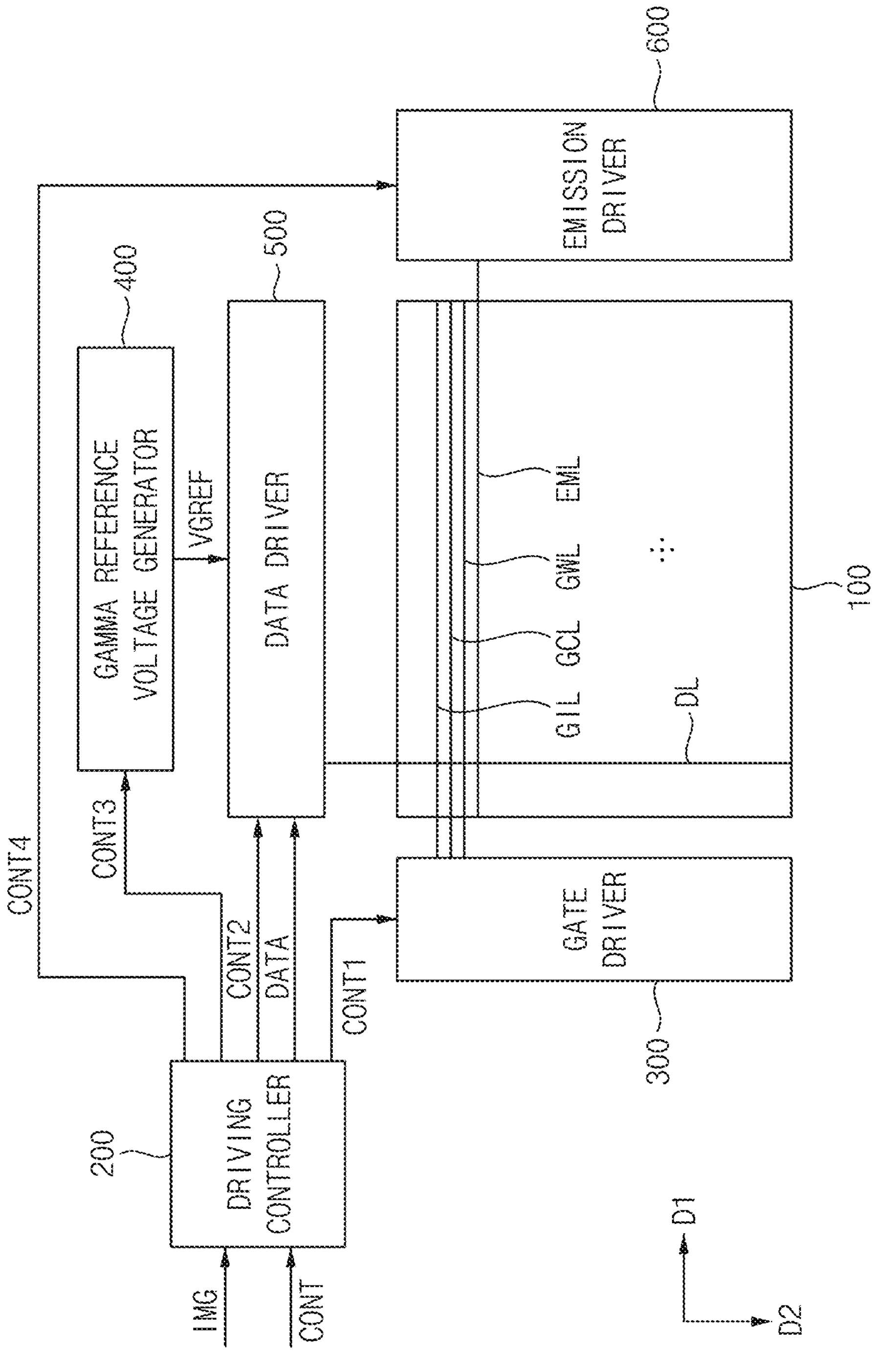
FIG. 1 is a block diagram illustrating a display apparatus according to an embodiment of the present invention.

FIG. 1 is a block diagram illustrating a display apparatus according to an embodiment of the present invention.

Referring to FIG. 1, the display apparatus includes a display panel 100 and a display panel driver. The display panel driver includes a driving controller 200, a gate driver

300, a gamma reference voltage generator 400, a data driver 500 and an emission driver 600.

The display panel 100 has a display region on which an image is displayed and a peripheral region adjacent to the display region.

The display panel 100 includes a plurality of gate lines GIL, GCL and GWL, a plurality of data lines DL, a plurality of emission lines EML and a plurality of pixels electrically connected to the gate lines GIL, GCL and GWL, the data lines DL and the emission lines EML. The gate lines GIL, GCL and GWL may extend in a first direction D1, the data lines DL may extend in a second direction D2 crossing the first direction D1 and the emission lines EML may extend in the first direction D1.

The driving controller 200 receives input image data IMG and an input control signal CONT from an external apparatus (e.g. a host or an application processor). For example, the input image data IMG may include red image data, green image data and blue image data. The input image data IMG may include white image data. The input image data IMG may include magenta image data, cyan image data and yellow image data. The input control signal CONT may include a master clock signal and a data enable signal. The input control signal CONT may further include a vertical synchronizing signal and a horizontal synchronizing signal.

The driving controller 200 generates a first control signal CONT1, a second control signal CONT2, a third control signal CONT3, a fourth control signal CONT4 and a data signal DATA based on the input image data IMG and the input control signal CONT.

The driving controller 200 generates the first control signal CONT1 for controlling an operation of the gate driver 300 based on the input control signal CONT, and outputs the first control signal CONT1 to the gate driver 300. The first control signal CONT1 may include a vertical start signal and a gate clock signal.

The driving controller 200 generates the second control signal CONT2 for controlling an operation of the data driver 500 based on the input control signal CONT, and outputs the second control signal CONT2 to the data driver 500. The second control signal CONT2 may include a horizontal start signal and a load signal.

The driving controller 200 generates the data signal DATA based on the input image data IMG. The driving controller 200 outputs the data signal DATA to the data driver 500.

The driving controller 200 generates the third control signal CONT3 for controlling an operation of the gamma reference voltage generator 400 based on the input control signal CONT, and outputs the third control signal CONT3 to the gamma reference voltage generator 400.

The driving controller 200 generates the fourth control signal CONT4 for controlling an operation of the emission driver 600 based on the input control signal CONT, and outputs the fourth control signal CONT4 to the emission driver 600.

The gate driver 300 generates gate signals driving the gate lines GIL, GCL and GWL in response to the first control signal CONT1 received from the driving controller 200. The gate driver 300 may output the gate signals to the gate lines GIL, GCL and GWL. The gate signals may include an initialization gate signal GI, a compensation gate signal GCL and a data writing gate signal GWL (See FIG. 2). The initialization gate signal GI, the compensation gate signal GC and the data writing gate signal GW may be transferred to the pixels through the initialization gate line GIL, the compensation gate line GCL and the data writing gate line GWL, respectively.

In an embodiment of the present invention, the gate driver 300 may be integrated on the peripheral region of the display panel 100. In an embodiment of the present invention, the gate driver 300 may be mounted on the peripheral region of the display panel 100.

The gamma reference voltage generator 400 generates a gamma reference voltage VGREF in response to the third control signal CONT3 received from the driving controller 200. The gamma reference voltage generator 400 provides the gamma reference voltage VGREF to the data driver 500. The gamma reference voltage VGREF has a value corresponding to a level of the data signal DATA.

In an embodiment, the gamma reference voltage generator 400 may be disposed in the driving controller 200, or in the data driver 500.

The data driver 500 receives the second control signal CONT2 and the data signal DATA from the driving controller 200, and receives the gamma reference voltages VGREF from the gamma reference voltage generator 400. The data driver 500 converts the data signal DATA into data voltages having an analog type using the gamma reference voltages VGREF. The data driver 500 outputs the data voltages to the data lines DL. The data voltage VDATA may be transferred to the pixels through the data lines DL.

In an embodiment of the present invention, the data driver 500 may be integrated on the peripheral region of the display panel 100. In an embodiment of the present invention, the data driver 500 may be mounted on the peripheral region of the display panel 100.

The emission driver 600 generates emission signals to drive the emission lines EML in response to the fourth control signal CONT4 received from the driving controller 200. The emission driver 600 may output the emission signals to the emission lines EML. The emission signals EM may be transferred to the pixels through the emission lines EML (See FIG. 2).

In an embodiment of the present invention, the emission driver 600 may be integrated on the peripheral region of the display panel 100. In an embodiment of the present invention, the emission driver 600 may be mounted on the peripheral region of the display panel 100.

Although the gate driver 300 is disposed at a first side of the display panel 100 and the emission driver 600 is disposed at a second side of the display panel 100 opposite to the first side in FIG. 1 for convenience of explanation, the present invention may not be limited thereto. For example, both of the gate driver 300 and the emission driver 600 may be disposed at the first side of the display panel 100. For example, the gate driver 300 and the emission driver 600 may be integrally formed. For example, both of the gate driver 300 and the emission driver 600 may be disposed at both sides of the display panel 100.

Figure 2:
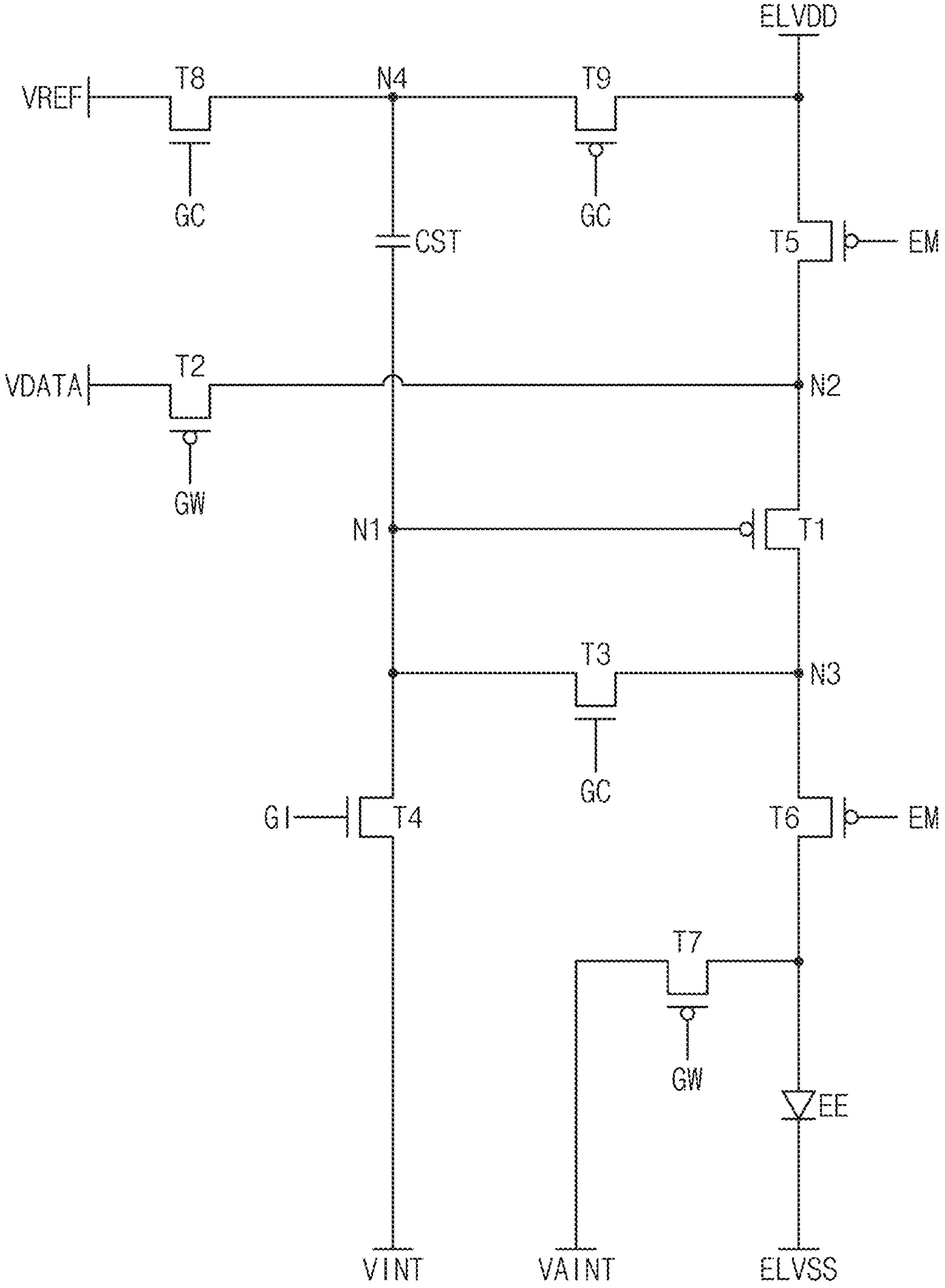
FIG. 2 is a circuit diagram illustrating a pixel circuit of a display panel of FIG. 1.

FIG. 2 is a circuit diagram illustrating the pixel circuit of the display panel 100 of FIG. 1.

Referring to FIGS. 1 and 2, the pixel circuit includes a light emitting element EE, a first switching element T1, a second switching element T2, a third switching element T3, a capacitor CST, an eighth switching element T8 and a ninth switching element T9.

The first switching element T1 includes a control electrode connected to a first node N1, a first electrode connected to a second node N2 and a second electrode connected to a third node N3. The first switching element T1 applies a driving current to the light emitting element EE.

The second switching element T2 applies a data voltage VDATA to the second node N2 in response to a data writing gate signal GW. For example, the second switching element T2 may include a control electrode for receiving the data writing gate signal GW, a first electrode for receiving the data voltage VDATA and a second electrode connected to the second node N2.

The third switching element T3 connects the first node N1 and the third node N3 in response to a compensation gate signal GC. For example, the third switching element T3 may include a control electrode for receiving the compensation gate signal GC, a first electrode connected to the first node N1 and a second electrode connected to the third node N3.

The capacitor CST includes a first electrode connected to the first node N1 and a second electrode connected to a fourth node N4.

The eighth switching element T8 includes a first electrode for receiving a reference voltage VREF and a second electrode connected to the fourth node N4. The ninth switching element T9 includes a first electrode for receiving a first power voltage ELVDD and a second electrode connected to the fourth node N4. One of the eighth switching element T8 and the ninth switching element T9 is an N-type transistor, and the other of the eighth switching element T8 and the ninth switching element T9 is a P-type transistor. In other words, the eighth switching element T8 and the ninth switching element T9 may form a Complementary Metal Oxide Semiconductor (CMOS) circuit.

In the present embodiment, the eighth switching element T8 may further include a control electrode for receiving the compensation gate signal GC. In addition, the ninth switching element T9 may further include a control electrode for receiving the compensation gate signal GC.

In the present embodiment, the eighth switching element T8 may be an N-type transistor and the ninth switching element T9 may be a P-type transistor. The same signal (the compensation gate signal GC) may be applied to the control electrode of the eighth switching element T8 and the control electrode of the ninth switching element T9. Thus, when the eighth switching element T8 is turned on, the ninth switching element T9 may be turned off. When the eighth switching element T8 is turned off, the ninth switching element T9 may be turned on.

In the present embodiment, the driving current of the light emitting element EE may be determined by a difference between the reference voltage VREF and the data voltage VDATA. The reference voltage VREF may be lower than the first power voltage ELVDD. In a conventional pixel circuit, the driving current of the light emitting element EE is determined by a difference between the first power voltage ELVDD and the data voltage VDATA. In contrast, in the pixel circuit of the present embodiment, the driving current of the light emitting element EE is determined by the difference between the reference voltage VREF, which is lower than the first power voltage ELVDD, and the data voltage VDATA. Thus, levels of the data voltages VDATA may be reduced and a level of a data power voltage applied to the data driver 500 may also be reduced.

A power consumption of the data driver 500 may be determined by a following Equation 1.

$$P = f * C * V_{LIN} * \Delta V \quad \text{[Equation 1]}$$

Herein, P is the power consumption of the data driver 500, f is a driving frequency of the display panel 100, C is a total capacitance of the data line, $V_{LIN}$ is the data power voltage, $\Delta V$ is a toggling degree of the data voltage VDATA.

In the present embodiment, the data power voltage $V_{LIN}$ may be reduced so that the power consumption of the data driver 500 may be reduced. In a conventional pixel circuit, a gate-source voltage Vgs of the first switching element T1 is Vgs=ELVDD−(VDATA-VTH). However, in the present pixel circuit, a gate-source voltage Vgs of the first switching element T1 is Vgs=VREF−(VDATA-VTH).

Accordingly, the levels of the data voltages VDATA may be decreased by a difference between the first power voltage ELVDD and the reference voltage VREF. For example, when the difference between the first power voltage ELVDD and the reference voltage VREF is 1.5V, a data voltage corresponding to a black grayscale value may be decreased by 1.5V compared to a conventional data voltage corresponding to the black grayscale value and a data voltage corresponding to a white grayscale value may be decreased by 1.5V compared to a conventional data voltage corresponding to the white grayscale value.

The pixel circuit may further include a fourth switching element T4, a fifth switching element T5, a sixth switching element T6 and a seventh switching element T7.

The fourth switching element T4 may include a control electrode for receiving an initialization gate signal GI, a first electrode connected to the first node N1 and a second electrode for receiving a first initialization voltage VINT.

The fifth switching element T5 may include a control electrode for receiving the emission signal EM, a first electrode for receiving the first power voltage ELVDD and a second electrode connected to the second node N2.

The sixth switching element T6 may include a control electrode for receiving the emission signal EM, a first electrode connected to the third node N3 and a second electrode connected to an anode electrode of the light emitting element EE.

In the present embodiment, the seventh switching element T7 may include a control electrode for receiving the data writing gate signal GW, a first electrode for receiving a second initialization voltage VAINT and a second electrode connected to the anode electrode.

The light emitting element EE may include the anode electrode and a cathode electrode for receiving a second power voltage ELVSS.

For example, the first power voltage ELVDD may be a high power voltage for emitting the light emitting element EE and the second power voltage ELVSS may be a low power voltage for emitting the light emitting element EE. The first power voltage ELVDD may be greater than the second power voltage ELVSS.

Each of the first to ninth switching elements T1 to T9 may include a single transistor. However, the present invention may not be limited thereto. Alternatively, at least one of the first to ninth switching elements T1 to T9 may include a plurality of transistors connected to each other in series.

In the present embodiment, some of the transistors in the pixel circuit may be P-type transistors and some of the transistors in the pixel circuit may be N-type transistors. For example, the P-type transistor may be a low temperature polycrystalline silicon ("LTPS") transistor. For example, the N-type transistor may be an oxide semiconductor transistor. For example, the P-type transistor may be a P-Channel Metal-Oxide-Semiconductor ("PMOS"). For example, the N-type transistor may be N-Channel Metal-Oxide-Semiconductor ("NMOS").

For example, the first switching element T1 may be the P-type transistor. The second switching element T2 may be the P-type transistor. The third switching element T3 may be the N-type transistor. The fourth switching element T4 may be the N-type transistor. The fifth switching element T5 may be the P-type transistor. The sixth switching element T6 may be the P-type transistor. The seventh switching element T7 may be the P-type transistor.

Figure 3:
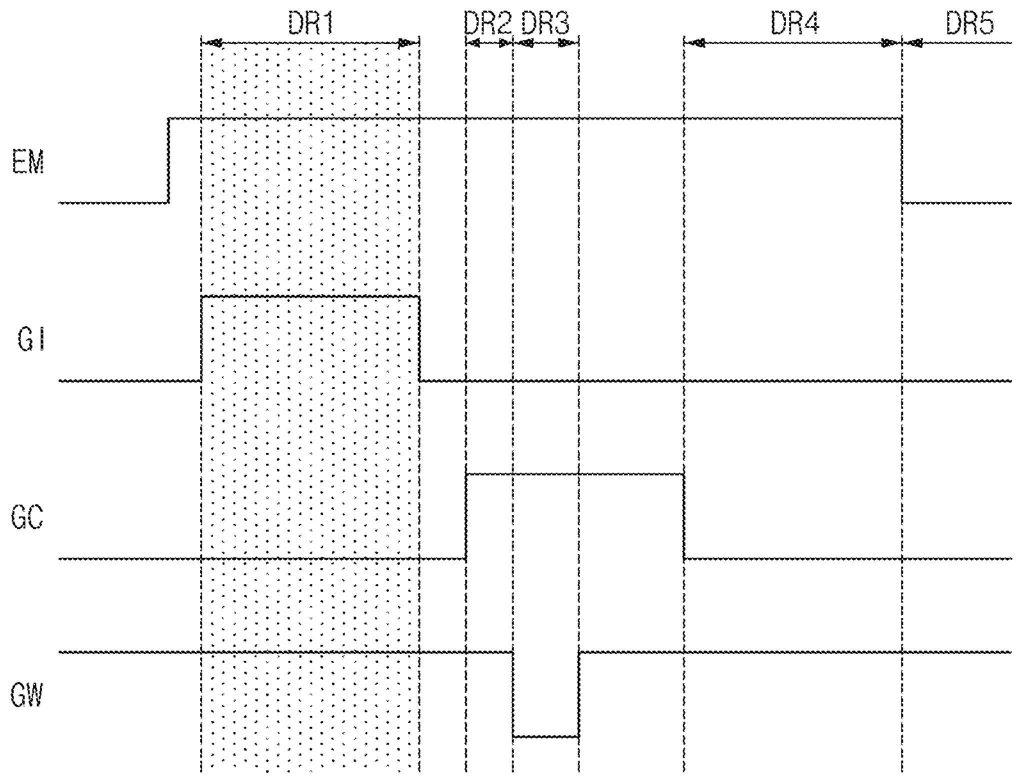
FIG. 3 is a timing diagram illustrating an example of an operation of the pixel circuit of FIG. 2 in a first period.
Figure 4:
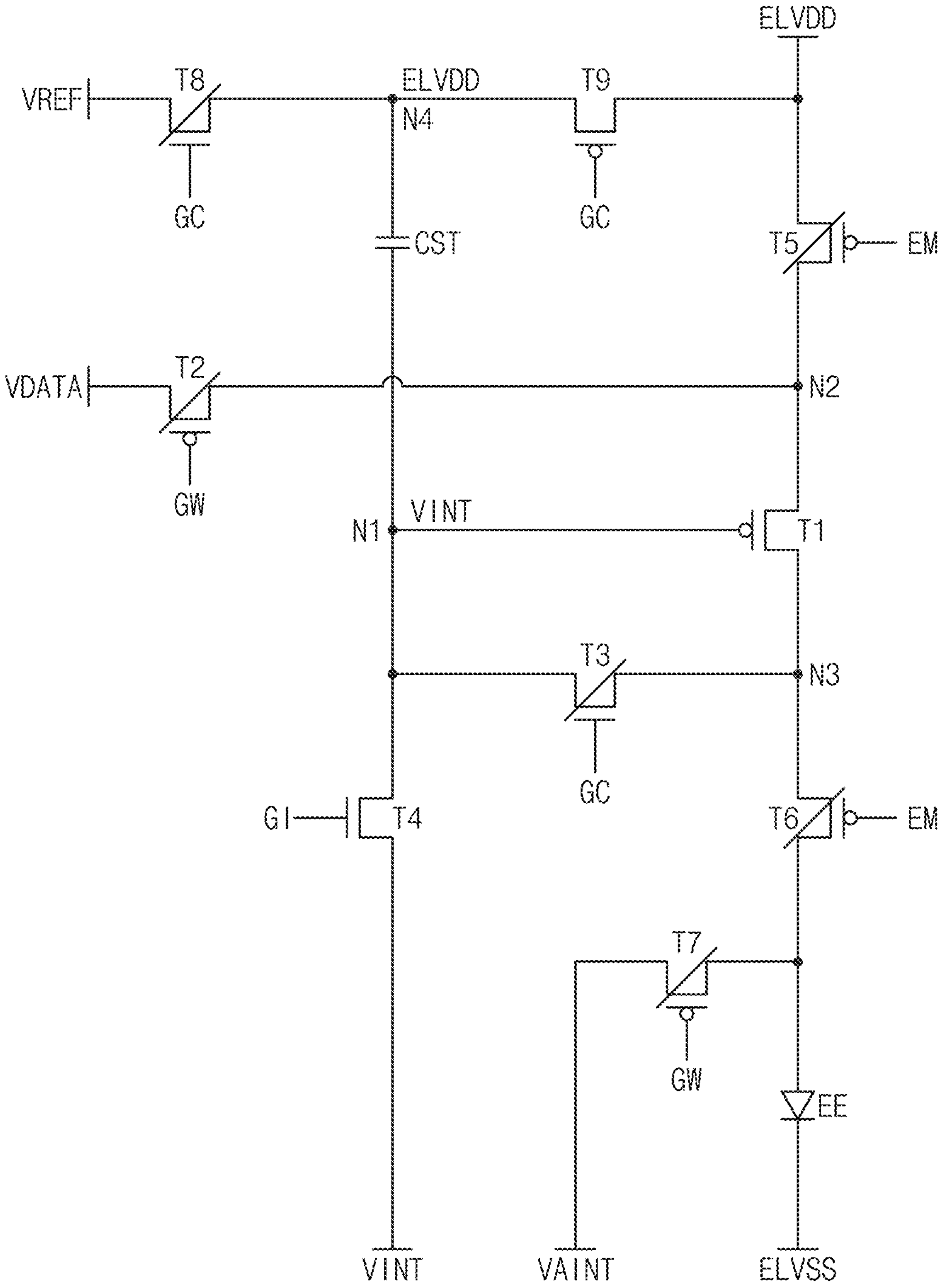
FIG. 4 is a circuit diagram illustrating an example of the operation of the pixel circuit of FIG. 2 in the first period.
Figure 5:
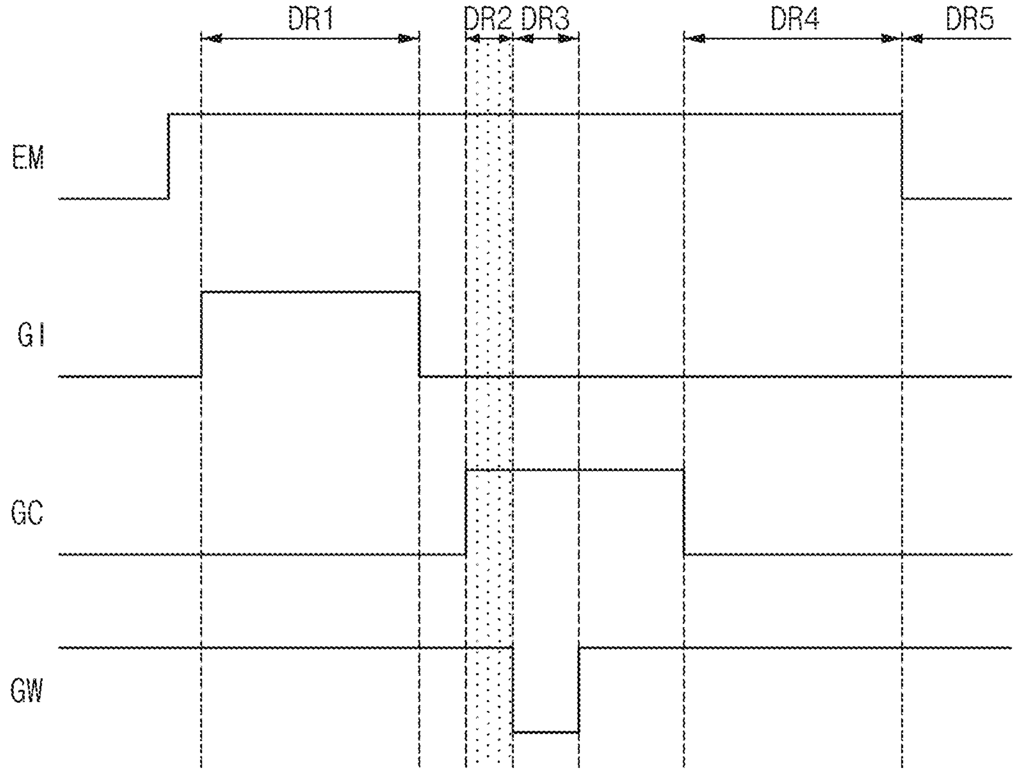
FIG. 5 is a timing diagram illustrating an example of an operation of the pixel circuit of FIG. 2 in a second period.
Figure 6:
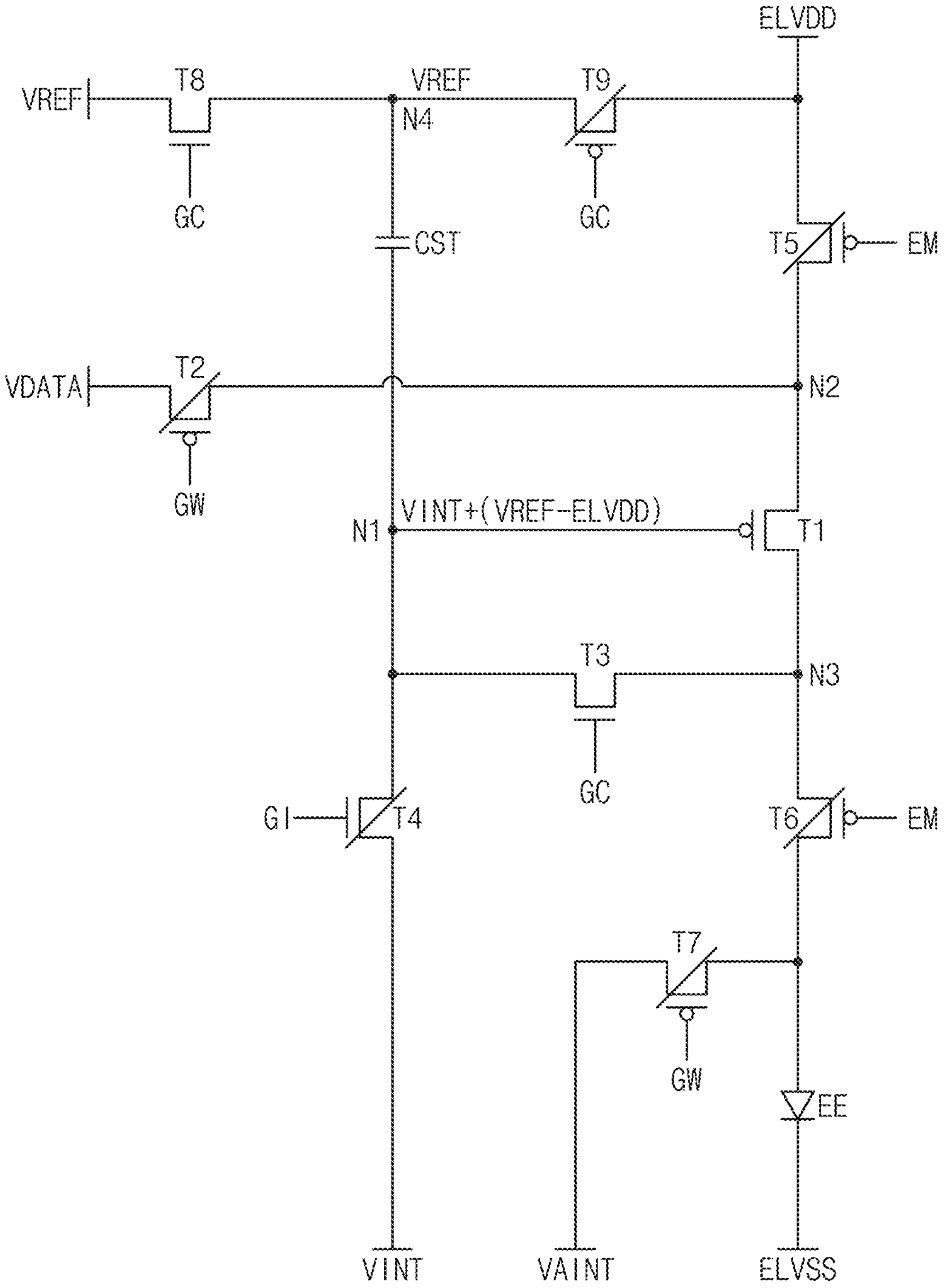
FIG. 6 is a circuit diagram illustrating an example of the operation of the pixel circuit of FIG. 2 in the second period.
Figure 7:
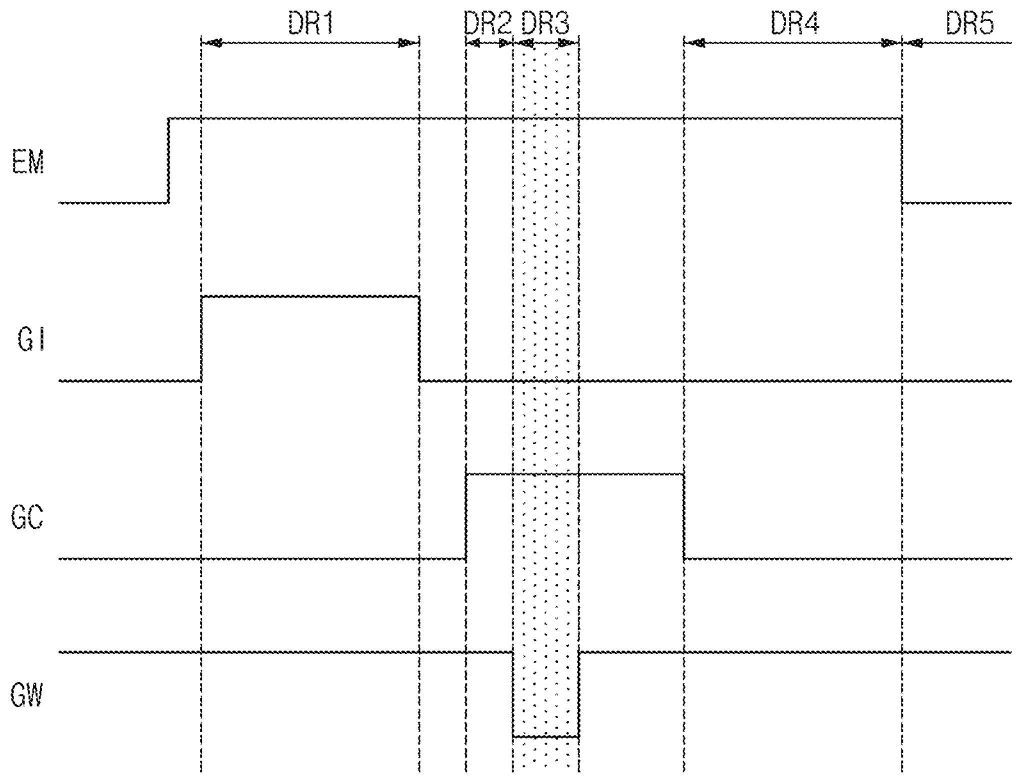
FIG. 7 is a timing diagram illustrating an example of an operation of the pixel circuit of FIG. 2 in a third period.
Figure 8:
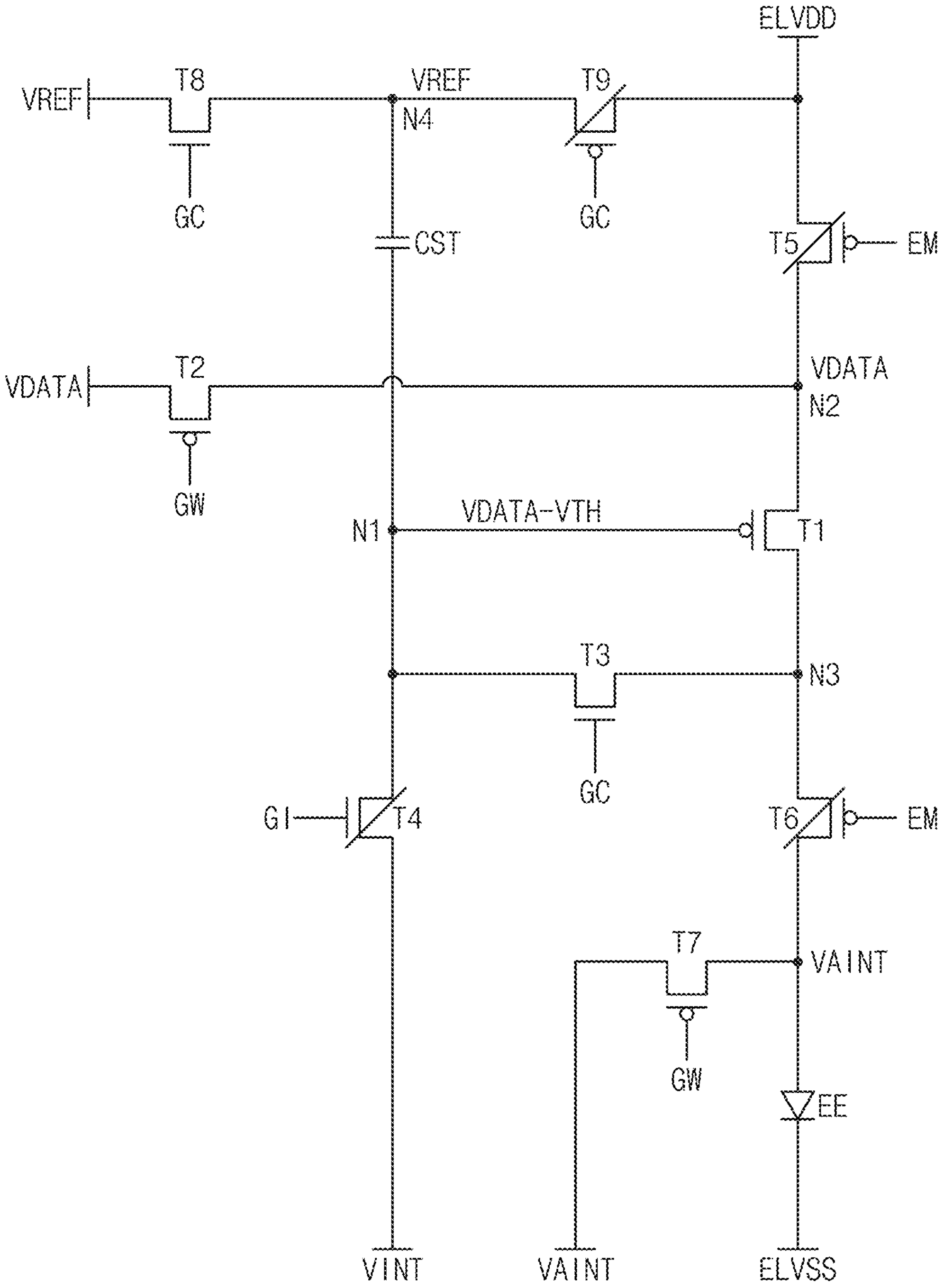
FIG. 8 is a circuit diagram illustrating an example of the operation of the pixel circuit of FIG. 2 in the third period.
Figure 9:
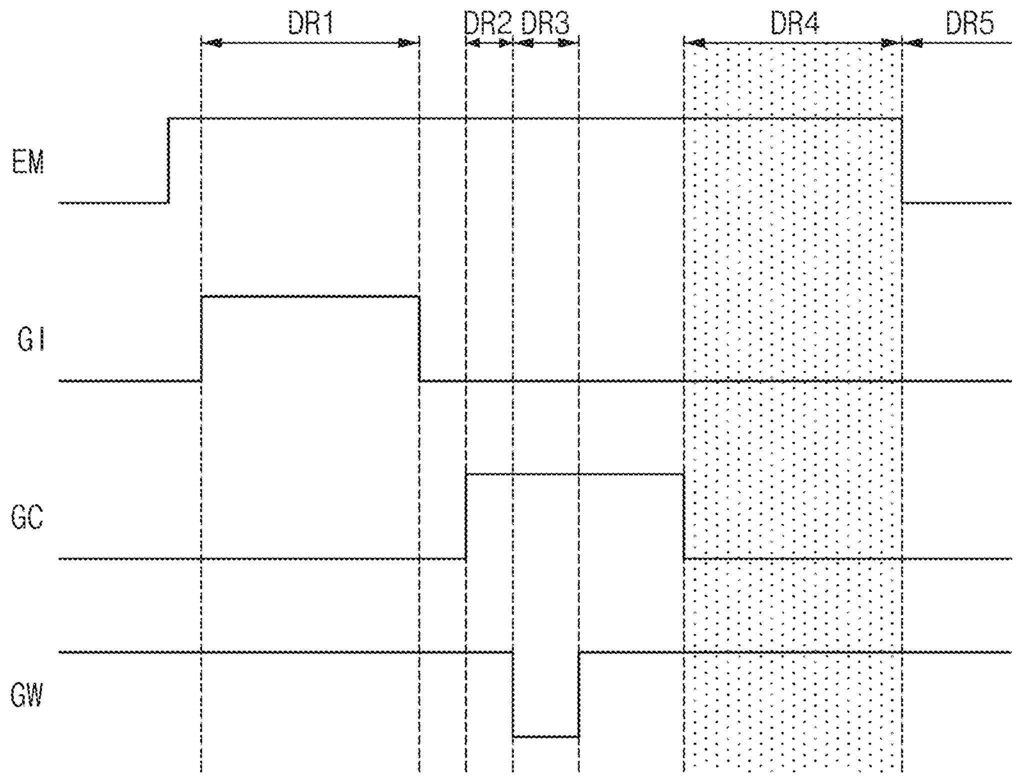
FIG. 9 is a timing diagram illustrating an example of an operation of the pixel circuit of FIG. 2 in a fourth period.
Figure 10:
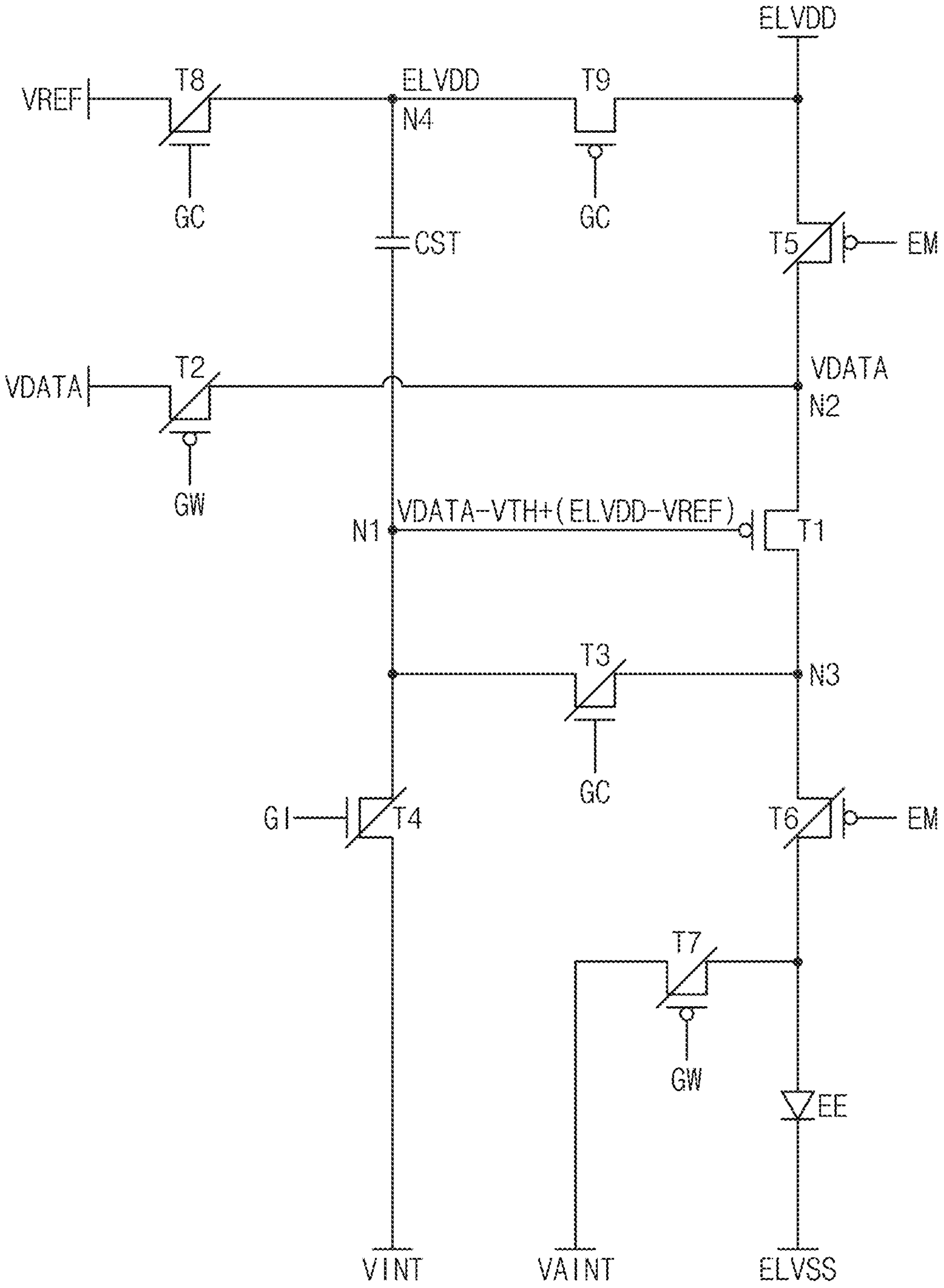
FIG. 10 is a circuit diagram illustrating an example of the operation of the pixel circuit of FIG. 2 in the fourth period.
Figure 11:
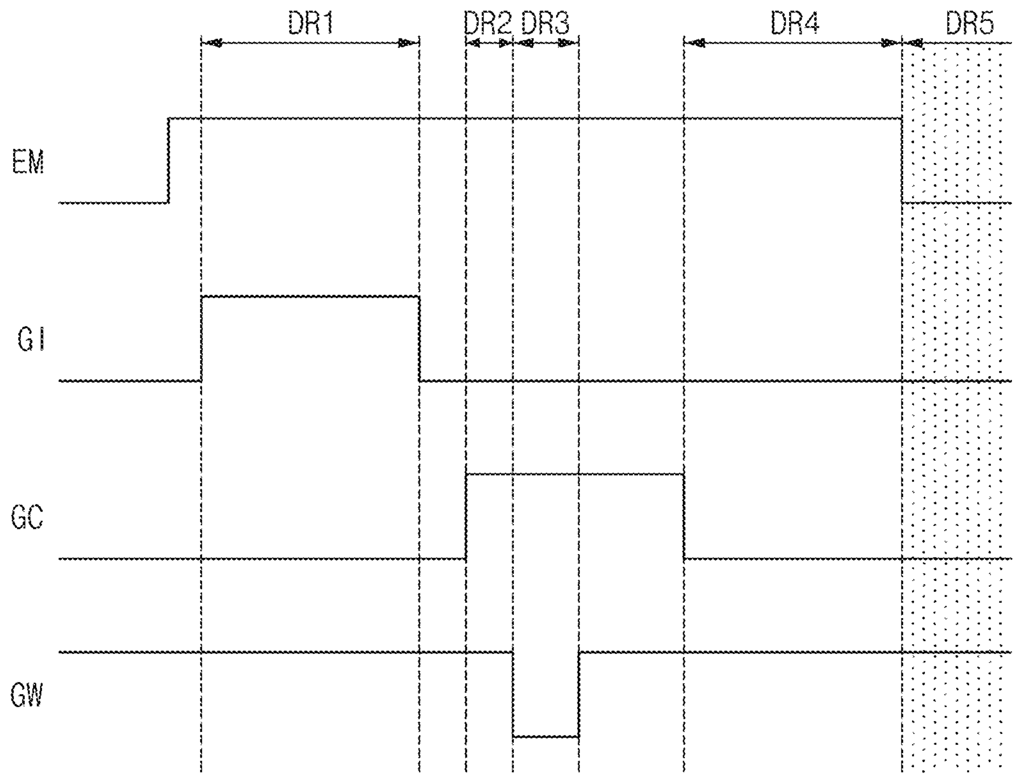
FIG. 11 is a timing diagram illustrating an example of an operation of the pixel circuit of FIG. 2 in a fifth period.
Figure 12:
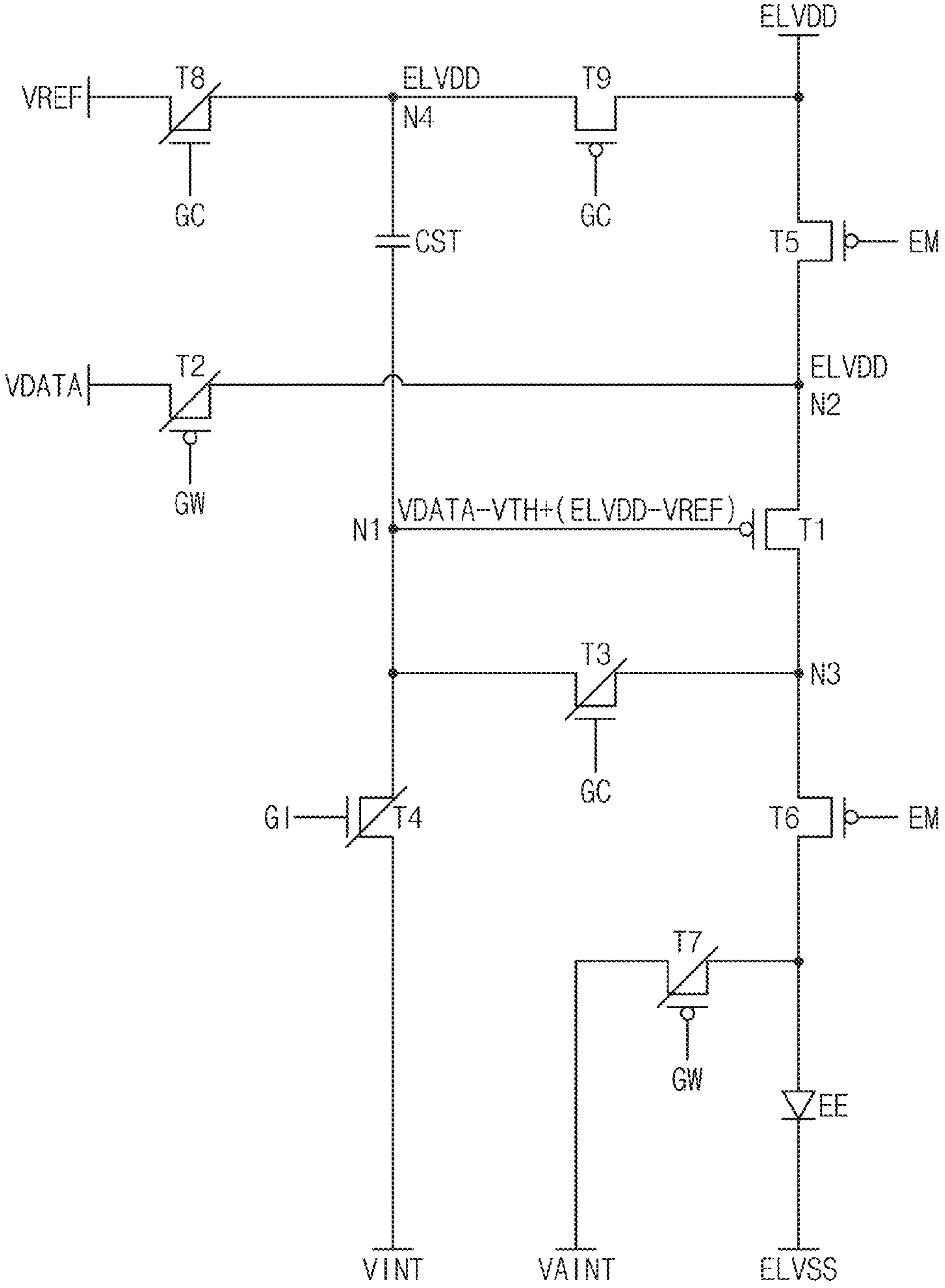
FIG. 12 is a circuit diagram illustrating an example of the operation of the pixel circuit of FIG. 2 in the fifth period.

FIG. 3 is a timing diagram illustrating an example of an operation of the pixel circuit of FIG. 2 in a first period DR1. FIG. 4 is a circuit diagram illustrating an example of the first period DR1. FIG. 5 is a timing diagram operation of the pixel circuit of FIG. 2 in the illustrating an example of an operation of the pixel circuit of FIG. 2 in a second period DR2. FIG. 6 is a circuit diagram illustrating an example of the operation of the pixel circuit of FIG. 2 in the second period DR2. FIG. 7 is a timing diagram illustrating an example of an operation of the pixel circuit of FIG. 2 in a third period DR3. FIG. 8 is a circuit diagram illustrating an example of the operation of the pixel circuit of FIG. 2 in the third period DR3. FIG. 9 is a timing diagram illustrating an example of an operation of the pixel circuit of FIG. 2 in a fourth period DR4. FIG. 10 is a circuit diagram illustrating an example of the operation of the pixel circuit of FIG. 2 in the fourth period DR4. FIG. 11 is a timing diagram illustrating an example of an operation of the pixel circuit of FIG. 2 in a fifth period DR5. FIG. 12 is a circuit diagram illustrating an example of the operation of the pixel circuit of FIG. 2 in the fifth period DR5.

Referring to FIGS. 1 to 12, the first period DR1 may be an initialization period of the first switching element T1.

In the first period DR1, the emission signal EM may have an inactive level, the initialization gate signal GI may have an active level, the compensation gate signal GC may have a low level and the data writing gate signal GW may have an inactive level.

Herein, when the transistor receiving the emission signal EM, the initialization gate signal GI, the compensation gate signal GC or the data writing gate signal GW is a P-type transistor, the active level may be a low level and the inactive level may be a high level. In contrast, when the transistor receiving the emission signal EM, the initialization gate signal GI, the compensation gate signal GC or the data writing gate signal GW is an N-type transistor, the active level may be a high level and the inactive level may be a low level.

Thus, in FIGS. 3, 5, 7, 9 and 11, the active level of the emission signal EM may be a low level, the active level of the initialization gate signal GI may be a high level, and the active level of the data writing gate signal GW may be a low level. However, a low level of the compensation gate signal GC may be the inactive level to the eighth switching element T8 and the active level to the ninth switching element T9, while a high level of the compensation gate signal GC may be the active level to the eighth switching element T8 and the inactive level to the ninth switching element T9.

In the first period DR1, the initialization voltage VINT may be applied to the first node N1 by the fourth switching element T4 turned on in response to the active level of the initialization gate signal GI.

In the first period DR1, the first power voltage ELVDD may be applied to the fourth node N4 by the ninth switching element T9 turned on in response to the active level of the compensation gate signal GC.

The second period DR2 may be a turn-on period of the compensation gate signal GC.

In the second period DR2 subsequent to the first period DR1, the emission signal EM may have the inactive level, the initialization gate signal GI may have an inactive level, the compensation gate signal GC may have a high level and the data writing gate signal GW may have the inactive level.

In the second period DR2, the reference voltage VREF may be applied to the fourth node N4 by the eighth switching element T8 turned on in response to the active level of the compensation gate signal GC.

In the second period DR2, the first node N1 and the third node N3 may be connected to each other by the third switching element T3 turned on in response to the active level of the compensation gate signal GC.

Herein, a voltage change VREF-ELVDD of the fourth node N4 may be reflected to the first node N1 by the capacitor CST. Thus, in the second period DR2, a voltage of the first node N1 may be VINT+(VREF-ELVDD)

The third period DR3 may be a data writing and compensation period.

In the third period DR3 subsequent to the second period DR2, the emission signal EM may have the inactive level, the initialization gate signal GI may have the inactive level, the compensation gate signal GC may have the high level and the data writing gate signal GW may have an active level.

In the third period DR3, the reference voltage VREF may be still applied to the fourth node N4 by the eighth switching element T8 turned on in response to the active level of the compensation gate signal GC.

In the third period DR3, the data voltage VDATA including a threshold voltage VTH of the first switching element T1 may be written to the first node N1 by the second switching element T2 turned on in response to the active level of the data writing gate signal GW, the first switching element T1 turned on in response to the voltage of the first node N1 and the third switching element T3 turned on in response to the active level of the compensation gate signal GC. In the third period DR3, the voltage of the first node N1 may be VDATA-VTH.

In the third period DR3, a voltage of the second node N2 may be VDATA and a gate-source voltage Vgs of the first switching element T1 may be VTH.

In the present embodiment, an initialization of the anode electrode of the light emitting element EE may be operated in the third period DR3. In the third period DR3, the second initialization voltage VAINT may be applied to the anode electrode by the seventh switching element T7 turned on in response to the active level of the data writing gate signal GW.

The fourth period DR4 may be a voltage changing period of the fourth node N4.

In the fourth period DR4 subsequent to the third period DR3, the emission signal EM may have the inactive level, the initialization gate signal GI may have the inactive level, the compensation gate signal GC may have the low level and the data writing gate signal GW may have the inactive level.

In the fourth period DR4, the first power voltage ELVDD may be applied to the fourth node N4 by the ninth switching element T9 turned on in response to the inactive level of the compensation gate signal GC.

Herein, a voltage change ELVDD-VREF of the fourth node N4 may be reflected to the first node N1 by the capacitor CST. Thus, in the fourth period DR4, a voltage of the first node N1 may be VDATA-VTH+(ELVDD-VREF).

In the fourth period DR4, the voltage of the second node N2 is VDATA and the gate-source voltage Vgs of the first switching element T1 may be VREF-ELVDD+VTH.

The fifth period DR5 may be a light emitting period.

In the fifth period DR5 subsequent to the fourth period DR4, the emission signal EM may have an active level, the initialization gate signal GI may have the inactive level, the compensation gate signal GC may have the low level and the data writing gate signal GW may have the inactive level.

In the fifth period DR5, the first power voltage ELVDD may be applied to the second node N2 by the fifth switching element T5 turned on in response to the active level of the emission signal EM.

In the fifth period DR5, the third node N3 may be connected to the anode electrode of the light emitting element EE by the sixth switching element T6 turned on in response to the active level of the emission signal EM.

In the fifth period DR5, the light emitting element EE may emit a light along a path of the turned-on fifth switching element T5, the turned-on first switching element T1 and the turned-on sixth switching element T6.

In the fifth period DR5, the voltage of the first node N1 may be VDATA-VTH+(ELVDD-VREF).

In the fifth period DR5, the voltage of the second node N2 may be ELVDD and the gate-source voltage Vgs of the first switching element T1 may be VREF-VDATA+VTH.

In the fifth period DR5, a current of the light emitting element EE may be a following Equation 2.

$$IEE=\frac{1}{2}u\,\mathrm{Cox}\,W/L(VREF-VDATA)^2 \quad \text{[Equation 2]}$$

Herein, the current flowing through the light emitting element EE may be IEE, u may be a mobility of the first switching element T1, Cox may be a capacitance of the first switching element T1 and W/L may be a ratio of a width and a length of a channel of the first switching element T1.

As shown in Equation 2, the current of the light emitting element EE may be determined by a difference between the reference voltage VREF and the data voltage VDATA. Thus, a luminance of the light emitting element EE may be maintained even if levels of the reference voltage VREF and the data voltage VDATA are lowered together while maintaining the difference between the reference voltage VREF and the data voltage VDATA.

In the pixel circuit of the present embodiment, the levels of the reference voltage VREF and the data voltage VDATA may be lowered compared to those of the conventional pixel circuit so that the power consumption of the display apparatus may be reduced.

According to the present embodiment, the driving current of the light emitting element EE may be determined based on the difference between the reference voltage VREF, which is lower than the first power voltage ELVDD, and the data voltage VDATA in the pixel circuit. Thus, the power consumption of the pixel circuit may be reduced.

Figure 13:
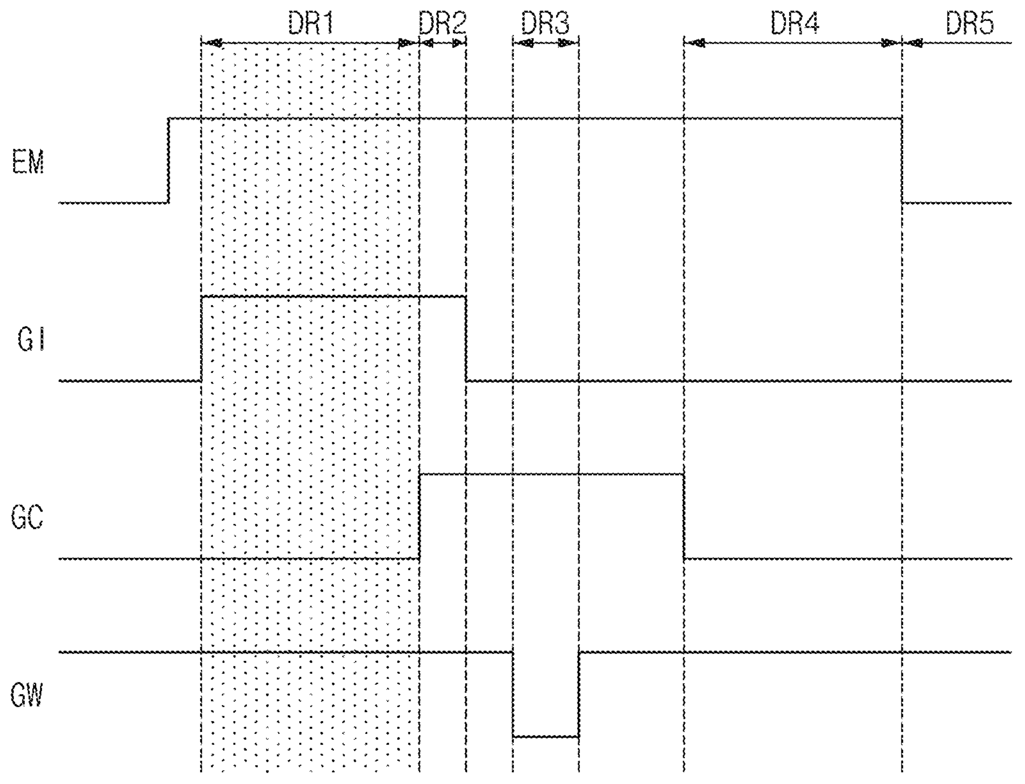
FIG. 13 is a timing diagram illustrating an example of an operation of the pixel circuit of FIG. 2 in a first period.
Figure 14:
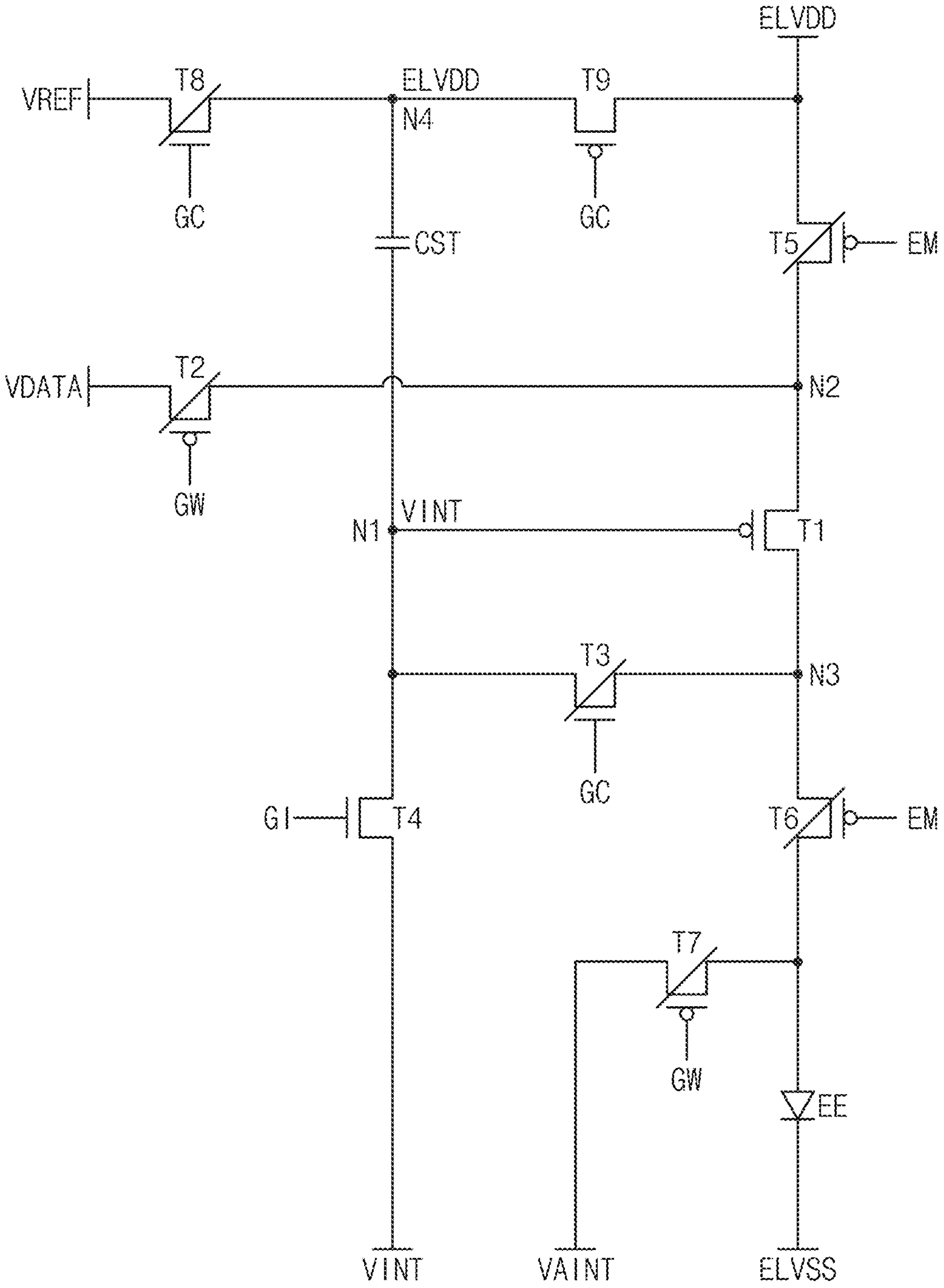
FIG. 14 is a circuit diagram illustrating an example of the operation of the pixel circuit of FIG. 2 in the first period.
Figure 15:
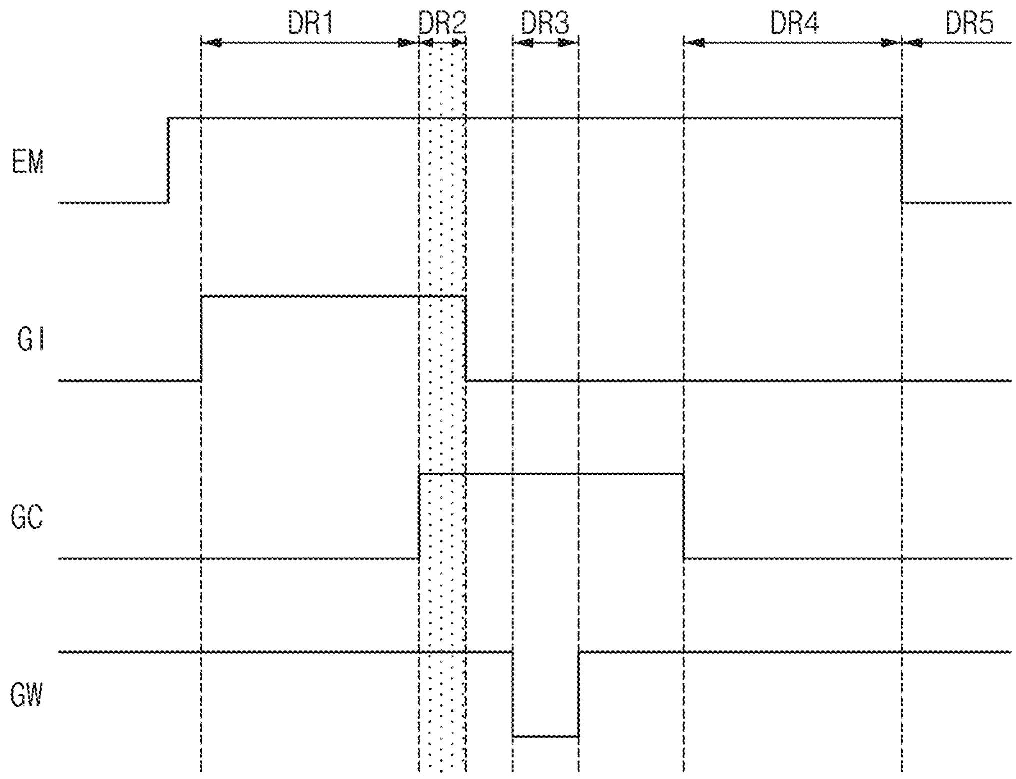
FIG. 15 is a timing diagram illustrating an example of an operation of the pixel circuit of FIG. 2 in a second period.
Figure 16:
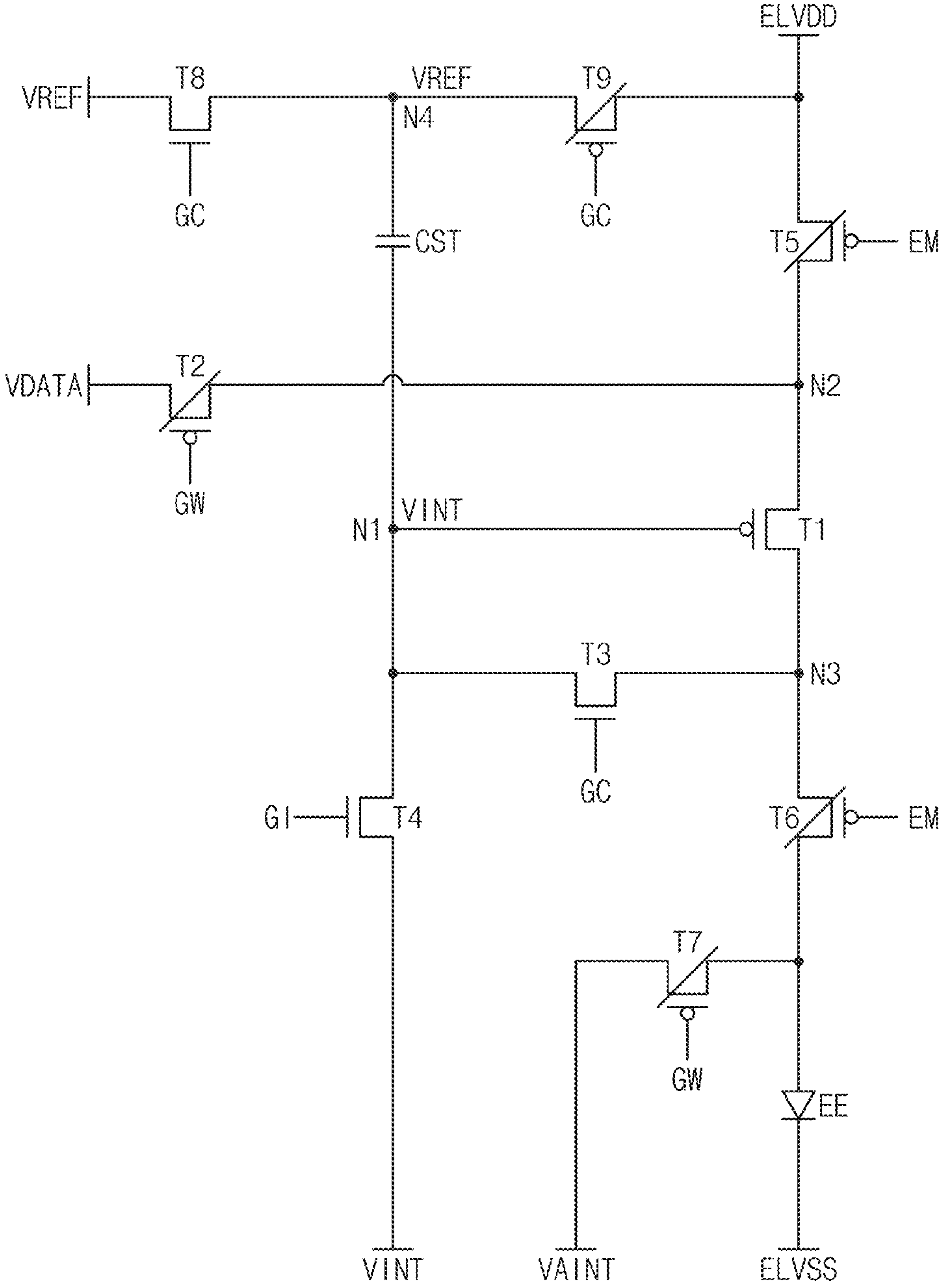
FIG. 16 is a circuit diagram illustrating an example of the operation of the pixel circuit of FIG. 2 in the second period.
Figure 17:
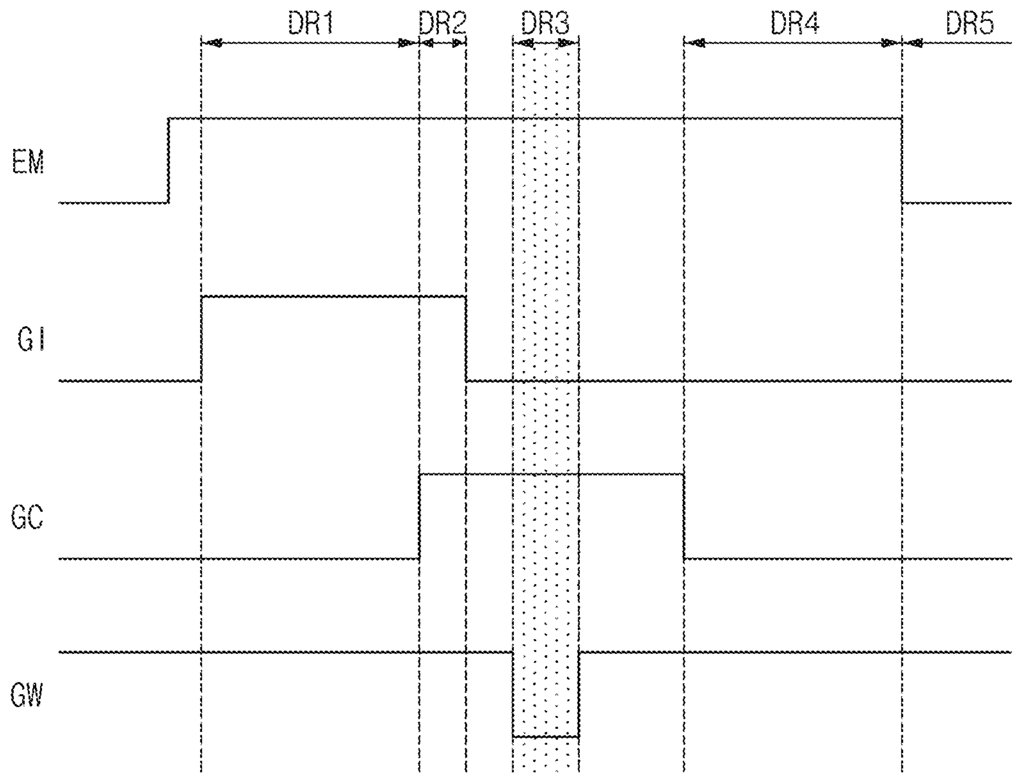
FIG. 17 is a timing diagram illustrating an example of an operation of the pixel circuit of FIG. 2 in a third period.
Figure 18:
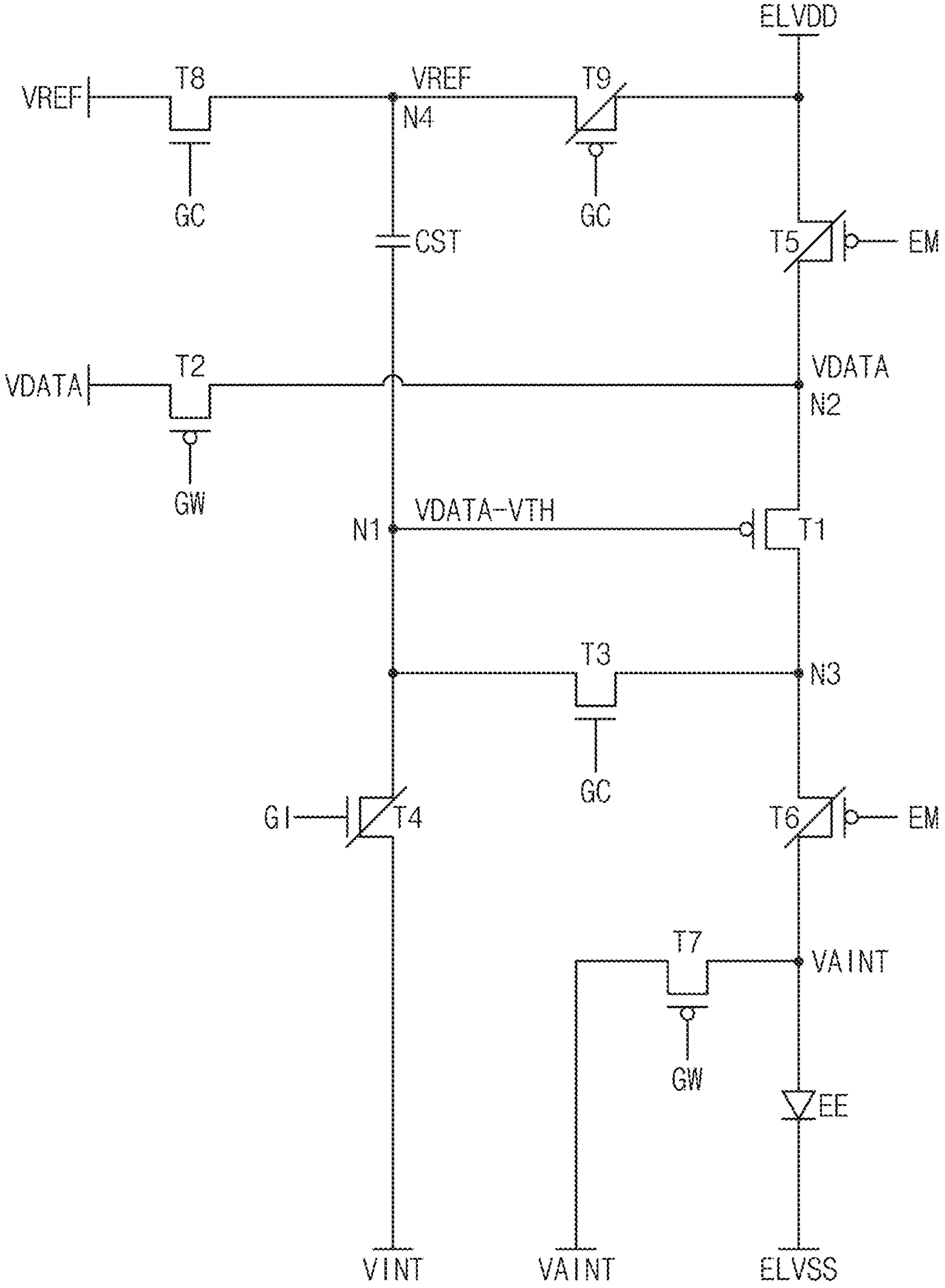
FIG. 18 is a circuit diagram illustrating an example of the operation of the pixel circuit of FIG. 2 in the third period.
Figure 19:
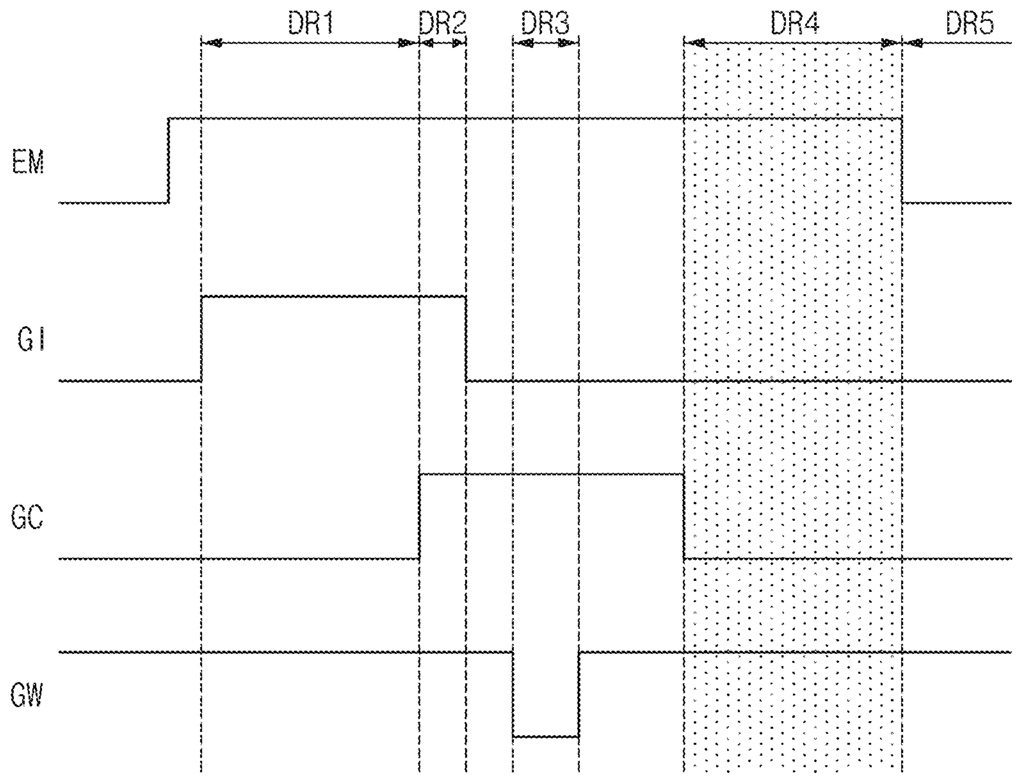
FIG. 19 is a timing diagram illustrating an example of an operation of the pixel circuit of FIG. 2 in a fourth period.
Figure 20:
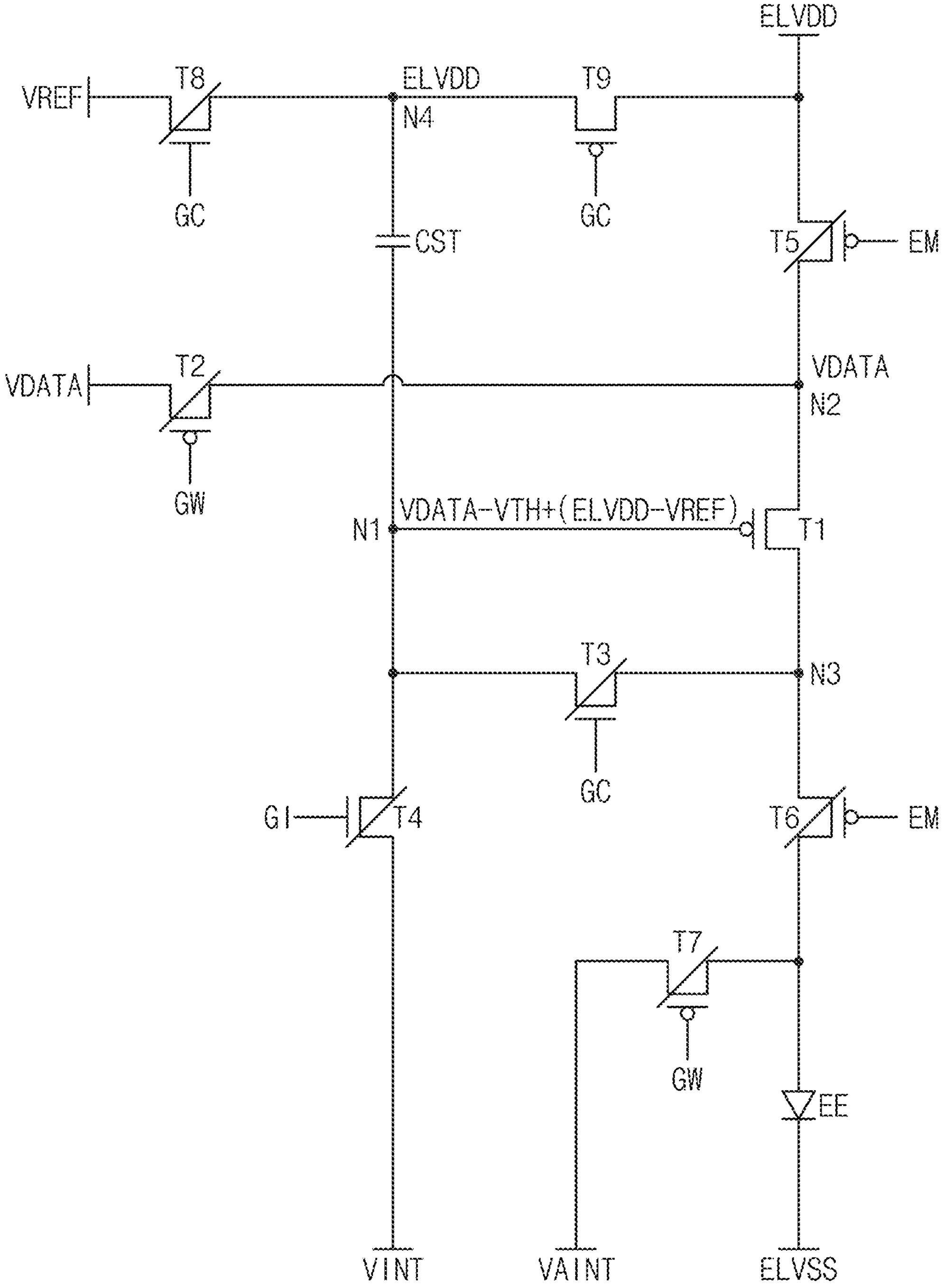
FIG. 20 is a circuit diagram illustrating an example of the operation of the pixel circuit of FIG. 2 in the fourth period.
Figure 21:
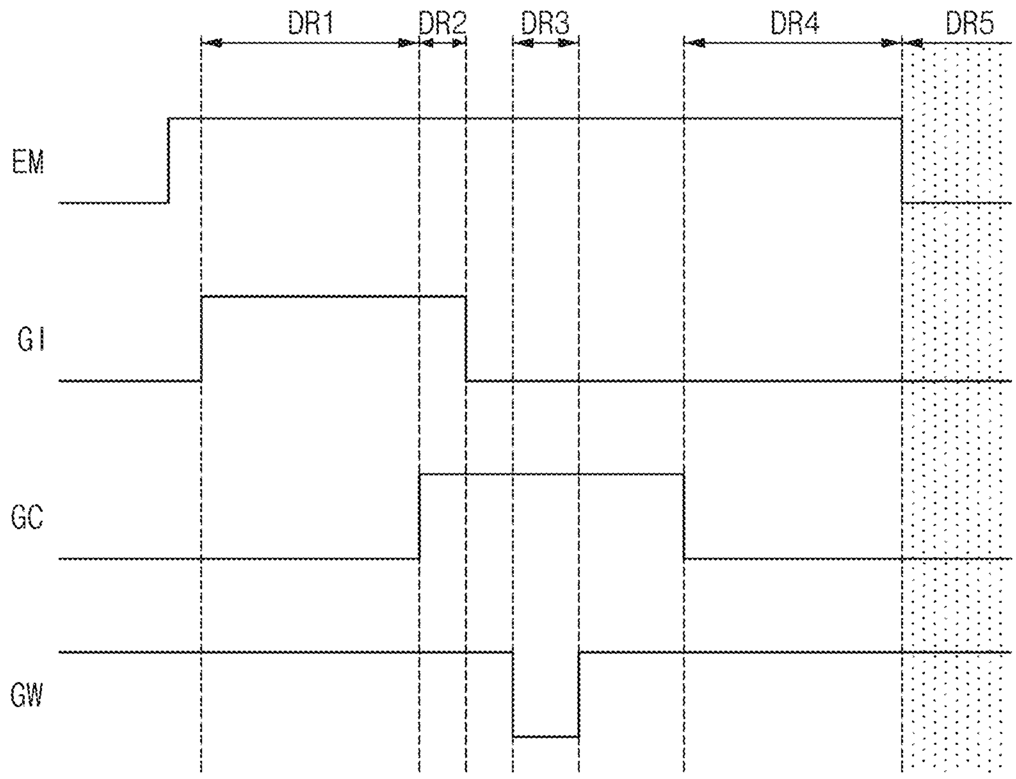
FIG. 21 is a timing diagram illustrating an example of an operation of the pixel circuit of FIG. 2 in a fifth period.
Figure 22:
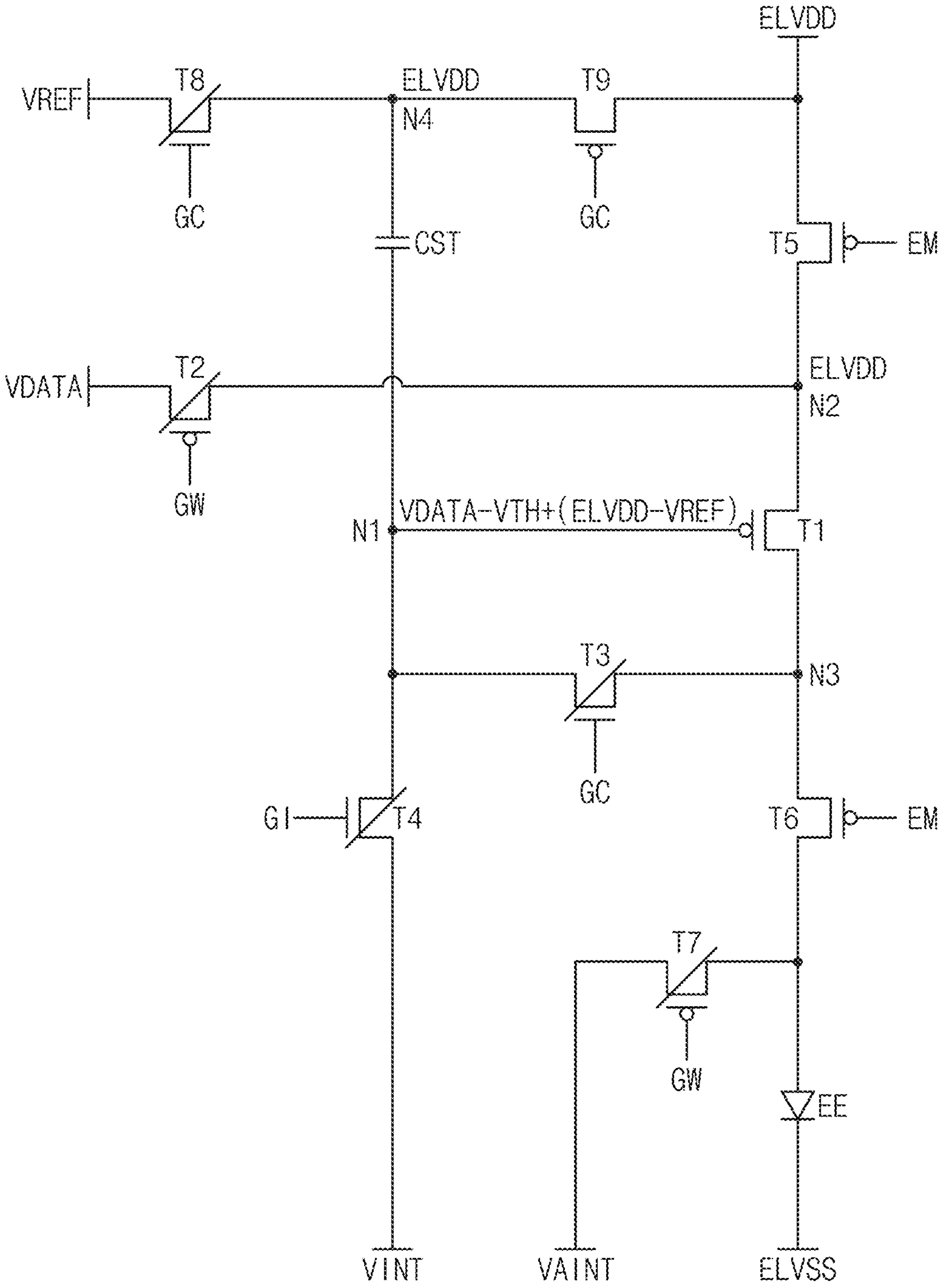
FIG. 22 is a circuit diagram illustrating an example of the operation of the pixel circuit of FIG. 2 in the fifth period.

FIG. 13 is a timing diagram illustrating an example of an operation of the pixel circuit of FIG. 2 in a first period DR1. FIG. 14 is a circuit diagram illustrating an example of the operation of the pixel circuit of FIG. 2 in the first period DR1. FIG. 15 is a timing diagram illustrating an example of an operation of the pixel circuit of FIG. 2 in a second period DR2. FIG. 16 is a circuit diagram illustrating an example of the operation of the pixel circuit of FIG. 2 in the second period DR2. FIG. 17 is a timing diagram illustrating an example of an operation of the pixel circuit of FIG. 2 in a third period DR3. FIG. 18 is a circuit diagram illustrating an example of the operation of the pixel circuit of FIG. 2 in the third period DR3. FIG. 19 is a timing diagram illustrating an example of an operation of the pixel circuit of FIG. 2 in a fourth period DR4. FIG. 20 is a circuit diagram illustrating an example of the operation of the pixel circuit of FIG. 2 in the fourth period DR4. FIG. 21 is a timing diagram illustrating an example of an operation of the pixel circuit of FIG. 2 in a fifth period DR5. FIG. 22 is a circuit diagram illustrating an example of the operation of the pixel circuit of FIG. 2 in the fifth period DR5.

The timing diagrams in FIGS. 13, 15, 17, 19 and 21 are substantially the same as the timing diagrams in FIGS. 3, 5, 7, 9 and 11 except that the active duration of the initialization gate signal GI overlaps the high duration of the compensation gate signal GC.

Referring to FIGS. 1, 2 and 13 to 22, a first period DR1 may be an initialization period of the first switching element T1.

In the first period DR1, the emission signal EM may have an inactive level, the initialization gate signal GI may have an active level, the compensation gate signal GC may have a low level and the data writing gate signal GW may have an inactive level.

A second period DR2 may be a turn-on period of the compensation gate signal GC.

In the second period DR2 subsequent to the first period DR1, the emission signal EM may have the inactive level, the initialization gate signal GI may have the active level, the compensation gate signal GC may have a high level and the data writing gate signal GW may have the inactive level.

In the second period DR2, the reference voltage VREF may be applied to the fourth node N4 by the eighth switching element T8 turned on in response to the active level of the compensation gate signal GC.

In the second period DR2, the first node N1 and the third node N3 may be connected to each other by the third switching element T3 turned on in response to the active level of the compensation gate signal GC.

In the second period DR2, the initialization voltage VINT may be applied to the first node N1 by the fourth switching element T4 turned on in response to the active level of the initialization gate signal GI.

In the present embodiment, the voltage of the first node N1 is maintained at the initialization voltage VINT prior to a data writing and compensation period DR3 so that the compensation may be stably operated.

A third period DR3 may be the data writing and compensation period.

In the third period DR3 subsequent to the second period DR2, the emission signal EM may have the inactive level, the initialization gate signal GI may have the inactive level, the compensation gate signal GC may have the high level and the data writing gate signal GW may have an active level.

In the third period DR3, the reference voltage VREF may be still applied to the fourth node N4 by the eighth switching element T8 turned on in response to the active level of the compensation gate signal GC.

In the third period DR3, the data voltage VDATA including a threshold voltage VTH of the first switching element T1 may be written to the first node N1 by the second switching element T2 turned on in response to the active level of the data writing gate signal GW, the first switching element T1 turned on in response to the voltage of the first node N1 and the third switching element T3 turned on in response to the active level of the compensation gate signal GC. In the third period DR3, the voltage of the first node N1 may be VDATA-VTH.

In the third period DR3, a voltage of the second node N2 may be VDATA and a gate-source voltage Vgs of the first switching element T1 may be VTH.

A fourth period DR4 may be a voltage changing period of the fourth node N4.

In the fourth period DR4 subsequent to the third period DR3, the emission signal EM may have the inactive level, the initialization gate signal GI may have the inactive level, the compensation gate signal GC may have the low level and the data writing gate signal GW may have the inactive level.

In the fourth period DR4, the first power voltage ELVDD may be applied to the fourth node N4 by the ninth switching element T9 turned on in response to the active level of the compensation gate signal GC.

Herein, a voltage change ELVDD-VREF of the fourth node N4 may be reflected to the first node N1 by the capacitor CST. Thus, in the fourth period DR4, a voltage of the first node N1 may be VDATA-VTH+(ELVDD-VREF).

In the fourth period DR4, the voltage of the second node N2 is VDATA and the gate-source voltage Vgs of the first switching element T1 may be VREF-ELVDD+VTH.

A fifth period DR5 may be a light emitting period.

In the fifth period DR5 subsequent to the fourth period DR4, the emission signal EM may have an active level, the initialization gate signal GI may have the inactive level, the compensation gate signal GC may have the low level and the data writing gate signal GW may have the inactive level.

In the fifth period DR5, the first power voltage ELVDD may be applied to the second node N2 by the fifth switching element T5 turned on in response to the active level of the emission signal EM.

In the fifth period DR5, the third node N3 may be connected to the anode electrode of the light emitting element EE by the sixth switching element T6 turned on in response to the active level of the emission signal EM.

In the fifth period DR5, the light emitting element EE may emit a light along a path of the turned-on fifth switching element T5, the turned-on first switching element T1 and the turned-on sixth switching element T6.

In the fifth period DR5, the voltage of the first node N1 may be VDATA-VTH+(ELVDD-VREF).

In the fifth period DR5, the voltage of the second node N2 may be ELVDD and the gate-source voltage Vgs of the first switching element T1 may be VREF-VDATA+VTH.

According to the present embodiment, the driving current IEE of the light emitting element EE may be determined based on the difference between the reference voltage VREF, which is lower than the first power voltage ELVDD, and the data voltage VDATA in the pixel circuit. Thus, the power consumption of the pixel circuit may be reduced.

Figure 23:
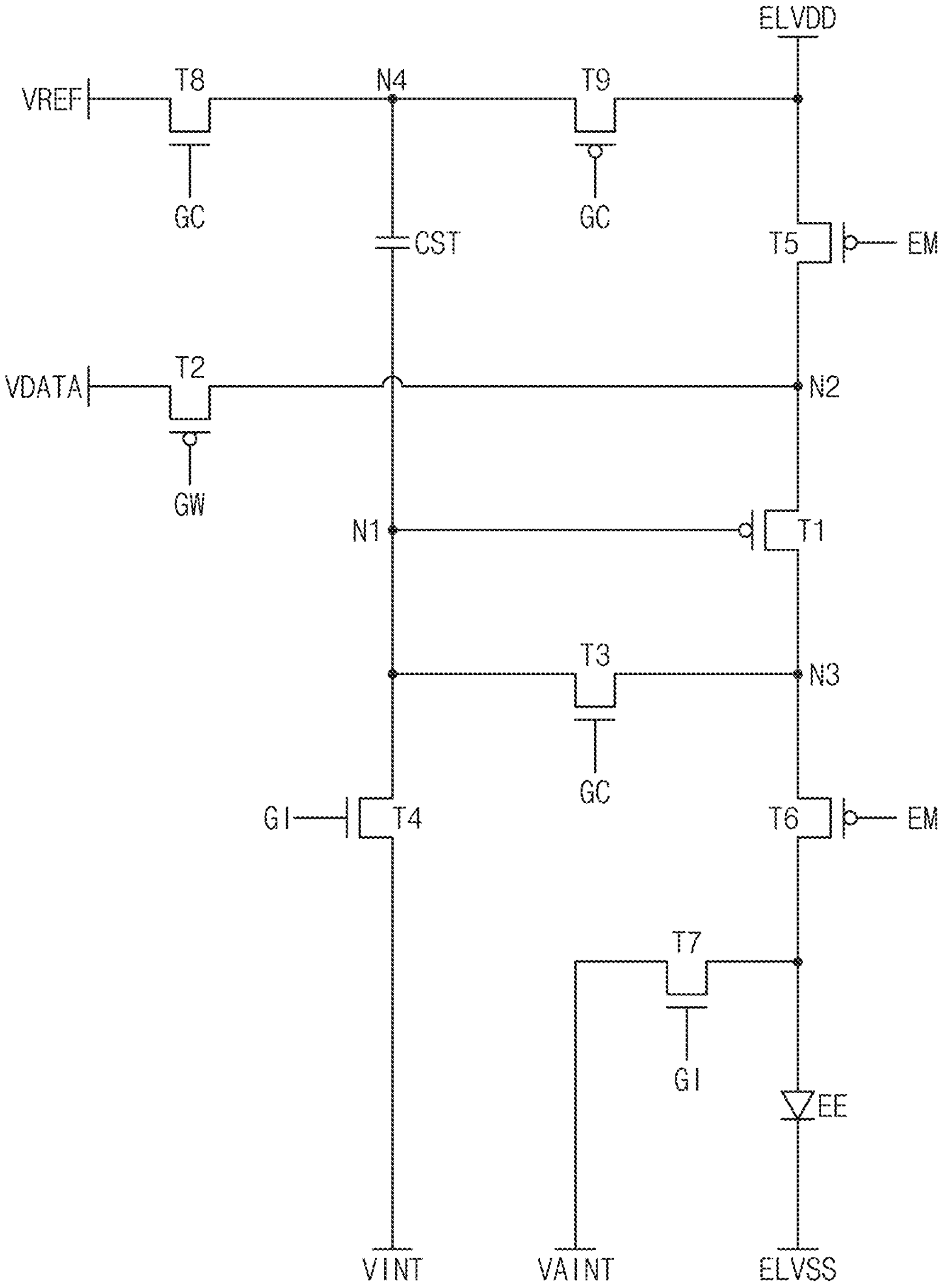
FIG. 23 is a circuit diagram illustrating a pixel circuit of a display apparatus according to an embodiment of the present invention.

FIG. 23 is a circuit diagram illustrating a pixel circuit of a display apparatus according to an embodiment of the present invention.

The pixel circuit of the display apparatus according to the present embodiment is substantially the same as the pixel circuit of the display apparatus of the previous embodiment explained referring to FIGS. 1 to 12 except for the seventh switching element. Thus, the same reference numerals will be used to refer to the same or like parts as those described in the previous embodiment of FIGS. 1 to 12 and any repetitive explanation concerning the above elements will be omitted.

Referring to FIGS. 1 and 23, the pixel circuit includes a light emitting element EE, a first switching element T1, a second switching element T2, a third switching element T3, a capacitor CST, an eighth switching element T8 and a ninth switching element T9.

The first switching element T1 includes a control electrode connected to a first node N1, a first electrode connected to a second node N2 and a second electrode connected to a third node N3. The first switching element T1 applies a driving current to the light emitting element EE.

The second switching element T2 applies a data voltage VDATA to the second node N2 in response to a data writing gate signal GW.

The third switching element T3 connects the first node N1 and the third node N3 in response to a compensation gate signal GC.

The capacitor CST includes a first electrode connected to the first node N1 and a second electrode connected to a fourth node N4.

The eighth switching element T8 includes a first electrode for receiving a reference voltage VREF and a second electrode connected to the fourth node N4. The ninth switching element T9 includes a first electrode for receiving a first power voltage ELVDD and a second electrode connected to the fourth node N4. One of the eighth switching element T8 and the ninth switching element T9 is an N-type transistor and the other of the eighth switching element T8 and the ninth switching element T9 is a P-type transistor. In other words, the eighth switching element T8 and the ninth switching element T9 may form a Complementary Metal Oxide Semiconductor (CMOS) circuit.

In the present embodiment, the eighth switching element T8 may further include a control electrode for receiving the compensation gate signal GC. In addition, the ninth switching element T9 may further include a control electrode for receiving the compensation gate signal GC.

In the present embodiment, the eighth switching element T8 may be an N-type transistor and the ninth switching element T9 may be a P-type transistor. The same signal (the compensation gate signal GC) may be applied to the control electrode of the eighth switching element T8 and the control electrode of the ninth switching element T9. Thus, when the eighth switching element T8 is turned on, the ninth switching element T9 may be turned off. When the eighth switching element T8 is turned off, the ninth switching element T9 may be turned on.

In the present embodiment, the driving current of the light emitting element EE may be determined by a difference between the reference voltage VREF and the data voltage VDATA. The reference voltage VREF may be lower than the first power voltage ELVDD.

The pixel circuit may further include a fourth switching element T4, a fifth switching element T5, a sixth switching element T6 and a seventh switching element T7.

The fourth switching element T4 may include a control electrode for receiving an initialization gate signal GI, a first electrode connected to the first node N1 and a second electrode for receiving a first initialization voltage VINT.

The fifth switching element T5 may include a control electrode for receiving the emission signal EM, a first electrode for receiving the first power voltage ELVDD and a second electrode connected to the second node N2.

The sixth switching element T6 may include a control electrode for receiving the emission signal EM, a first electrode connected to the third node N3 and a second electrode connected to an anode electrode of the light emitting element EE.

In the present embodiment, the seventh switching element T7 may include a control electrode for receiving the initialization gate signal GI, a first electrode for receiving a second initialization voltage VAINT and a second electrode connected to the anode electrode. Thus, in the present embodiment, the anode electrode of the light emitting element EE may be initialized in the first period DR1 of FIG. 3.

The light emitting element EE may include the anode electrode and a cathode electrode for receiving a second power voltage ELVSS.

For example, the first switching element T1 may be the P-type transistor. The second switching element T2 may be the P-type transistor. The third switching element T3 may be the N-type transistor. The fourth switching element T4 may be the N-type transistor. The fifth switching element T5 may be the P-type transistor. The sixth switching element T6 may be the P-type transistor. The seventh switching element T7 may be the N-type transistor.

According to the present embodiment, the driving current IEE of the light emitting element EE may be determined based on the difference between the reference voltage VREF, which is lower than the first power voltage ELVDD, and the data voltage VDATA in the pixel circuit. Thus, the power consumption of the pixel circuit may be reduced.

Figure 24:
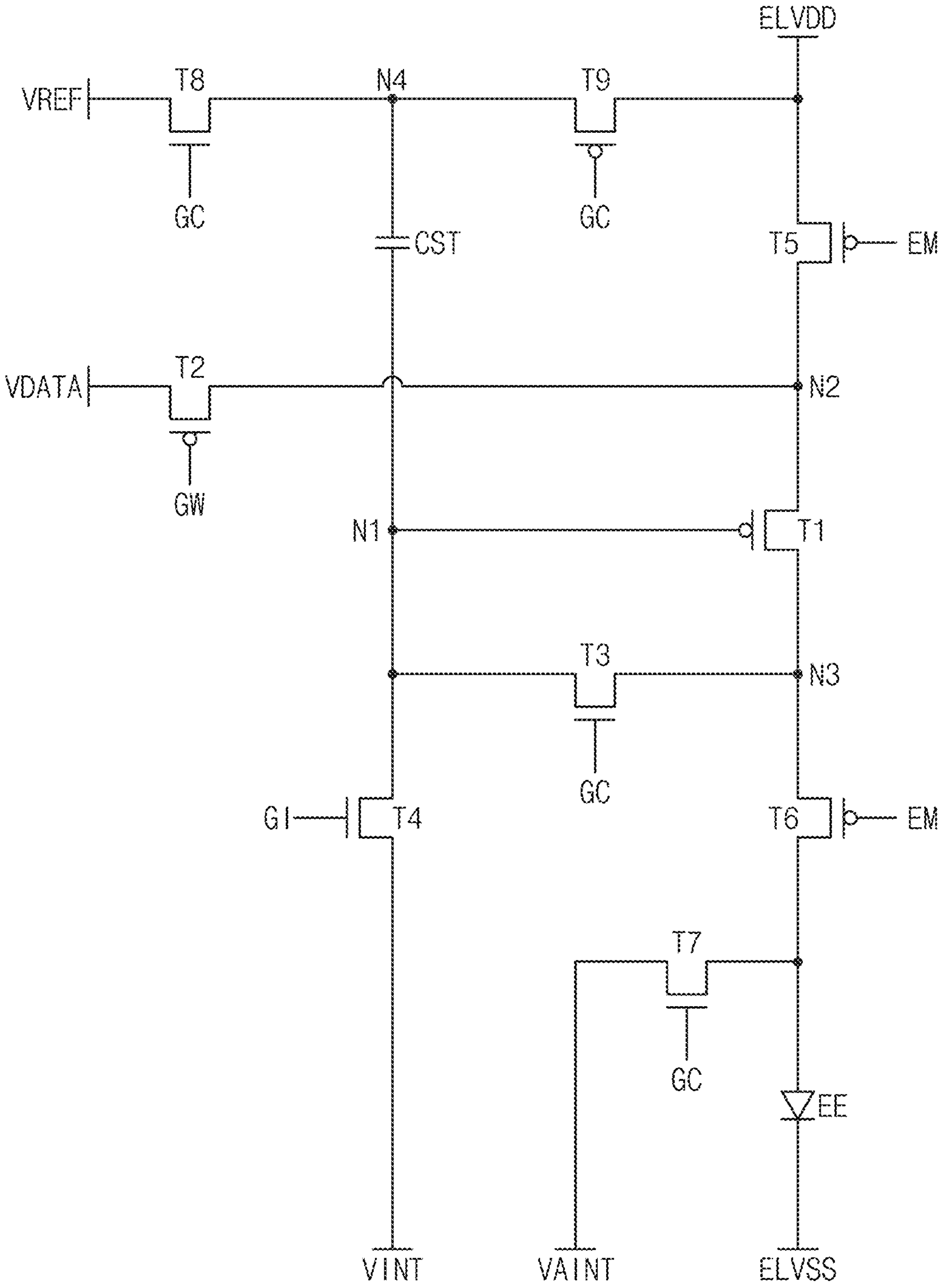
FIG. 24 is a circuit diagram illustrating a pixel circuit of a display apparatus according to an embodiment of the present invention.

FIG. 24 is a circuit diagram illustrating a pixel circuit of a display apparatus according to an embodiment of the present invention.

The pixel circuit of the display apparatus according to the present embodiment is substantially the same as the pixel circuit of the display apparatus of the previous embodiment explained referring to FIGS. 1 to 12 except for the seventh switching element. Thus, the same reference numerals will be used to refer to the same or like parts as those described in the previous embodiment of FIGS. 1 to 12 and any repetitive explanation concerning the above elements will be omitted.

Referring to FIGS. 1 and 24, the pixel circuit includes a light emitting element EE, a first switching element T1, a second switching element T2, a third switching element T3, a capacitor CST, an eighth switching element T8 and a ninth switching element T9.

The first switching element T1 includes a control electrode connected to a first node N1, a first electrode connected to a second node N2 and a second electrode connected to a third node N3. The first switching element T1 applies a driving current to the light emitting element EE.

The second switching element T2 applies a data voltage VDATA to the second node N2 in response to a data writing gate signal GW.

The third switching element T3 connects the first node N1 and the third node N3 in response to a compensation gate signal GC.

The capacitor CST includes a first electrode connected to the first node N1 and a second electrode connected to a fourth node N4.

The eighth switching element T8 includes a first electrode for receiving a reference voltage VREF and a second electrode connected to the fourth node N4. The ninth switching element T9 includes a first electrode for receiving a first power voltage ELVDD and a second electrode connected to the fourth node N4. One of the eighth switching element T8 and the ninth switching element T9 is an N-type transistor and the other of the eighth switching element T8 and the ninth switching element T9 is a P-type transistor. In other words, the eighth switching element T8 and the ninth switching element T9 may form a Complementary Metal Oxide Semiconductor (CMOS) circuit.

In the present embodiment, the eighth switching element T8 may further include a control electrode for receiving the compensation gate signal GC. In addition, the ninth switching element T9 may further include a control electrode for receiving the compensation gate signal GC.

In the present embodiment, the eighth switching element T8 may be an N-type transistor and the ninth switching element T9 may be a P-type transistor. The same signal (the compensation gate signal GC) may be applied to the control electrode of the eighth switching element T8 and the control electrode of the ninth switching element T9. Thus, when the eighth switching element T8 is turned on, the ninth switching element T9 may be turned off. When the eighth switching element T8 is turned off, the ninth switching element T9 may be turned on.

In the present embodiment, the driving current of the light emitting element EE may be determined by a difference between the reference voltage VREF and the data voltage VDATA. The reference voltage VREF may be lower than the first power voltage ELVDD.

The pixel circuit may further include a fourth switching element T4, a fifth switching element T5, a sixth switching element T6 and a seventh switching element T7.

The fourth switching element T4 may include a control electrode for receiving an initialization gate signal GI, a first electrode connected to the first node N1 and a second electrode for receiving a first initialization voltage VINT.

The fifth switching element T5 may include a control electrode for receiving the emission signal EM, a first electrode for receiving the first power voltage ELVDD and a second electrode connected to the second node N2.

The sixth switching element T6 may include a control electrode for receiving the emission signal EM, a first electrode connected to the third node N3 and a second electrode connected to an anode electrode of the light emitting element EE.

In the present embodiment, the seventh switching element T7 may include a control electrode for receiving the compensation gate signal GC, a first electrode for receiving a second initialization voltage VAINT and a second electrode connected to the anode electrode. Thus, in the present embodiment, the anode electrode of the light emitting element EE may be initialized in the second period DR2 of FIG. 5 and the third period DR3 of FIG. 7 when the compensation gate signal GC has the active level.

The light emitting element EE may include the anode electrode and a cathode electrode for receiving a second power voltage ELVSS.

For example, the first switching element T1 may be the P-type transistor. The second switching element T2 may be the P-type transistor. The third switching element T3 may be the N-type transistor. The fourth switching element T4 may be the N-type transistor. The fifth switching element T5 may be the P-type transistor. The sixth switching element T6 may be the P-type transistor. The seventh switching element T7 may be the N-type transistor.

According to the present embodiment, the driving current IEE of the light emitting element EE may be determined based on the difference between the reference voltage VREF, which is lower than the first power voltage ELVDD, and the data voltage VDATA in the pixel circuit. Thus, the power consumption of the pixel circuit may be reduced.

Figure 25:
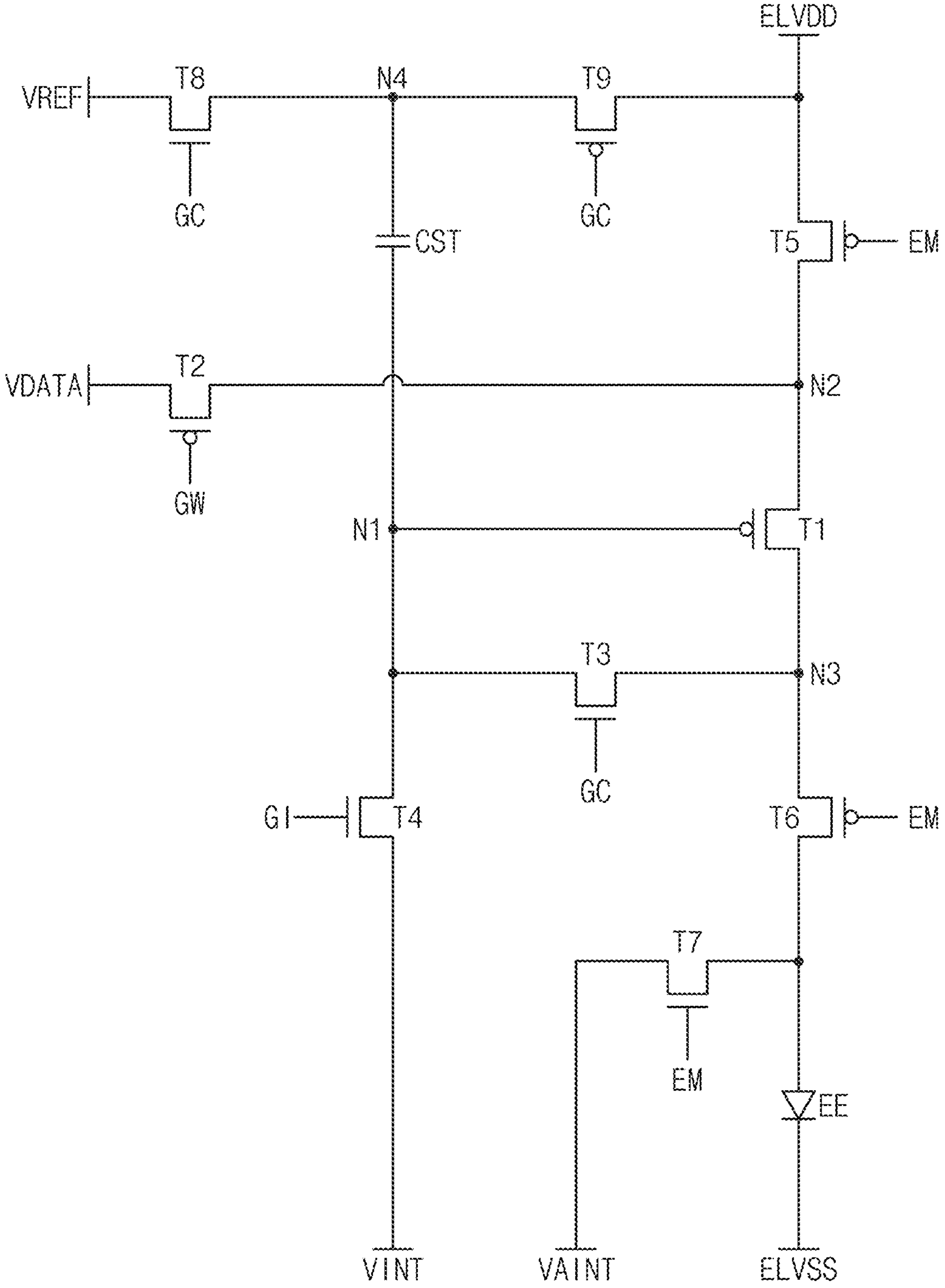
FIG. 25 is a circuit diagram illustrating a pixel circuit of a display apparatus according to an embodiment of the present invention.

FIG. 25 is a circuit diagram illustrating a pixel circuit of a display apparatus according to an embodiment of the present invention.

The pixel circuit of the display apparatus according to the present embodiment is substantially the same as the pixel circuit of the display apparatus of the previous embodiment explained referring to FIGS. 1 to 12 except for the seventh switching element. Thus, the same reference numerals will be used to refer to the same or like parts as those described in the previous embodiment of FIGS. 1 to 12 and any repetitive explanation concerning the above elements will be omitted.

Referring to FIGS. 1 and 25, the pixel circuit includes a light emitting element EE, a first switching element T1, a second switching element T2, a third switching element T3, a capacitor CST, an eighth switching element T8 and a ninth switching element T9.

The first switching element T1 includes a control electrode connected to a first node N1, a first electrode connected to a second node N2 and a second electrode connected to a third node N3. The first switching element T1 applies a driving current to the light emitting element EE.

The second switching element T2 applies a data voltage VDATA to the second node N2 in response to a data writing gate signal GW.

The third switching element T3 connects the first node N1 and the third node N3 in response to a compensation gate signal GC.

The capacitor CST includes a first electrode connected to the first node N1 and a second electrode connected to a fourth node N4.

The eighth switching element T8 includes a first electrode for receiving a reference voltage VREF and a second electrode connected to the fourth node N4. The ninth switching element T9 includes a first electrode for receiving a first power voltage ELVDD and a second electrode connected to the fourth node N4. One of the eighth switching element T8 and the ninth switching element T9 is an N-type transistor and the other of the eighth switching element T8 and the ninth switching element T9 is a P-type transistor. In other words, the eighth switching element T8 and the ninth switching element T9 may form a Complementary Metal Oxide Semiconductor (CMOS) circuit.

In the present embodiment, the eighth switching element T8 may further include a control electrode for receiving the compensation gate signal GC. In addition, the ninth switching element T9 may further include a control electrode for receiving the compensation gate signal GC.

In the present embodiment, the eighth switching element T8 may be an N-type transistor and the ninth switching element T9 may be a P-type transistor. The same signal (the compensation gate signal GC) may be applied to the control electrode of the eighth switching element T8 and the control electrode of the ninth switching element T9. Thus, when the eighth switching element T8 is turned on, the ninth switching element T9 may be turned off. When the eighth switching element T8 is turned off, the ninth switching element T9 may be turned on.

In the present embodiment, the driving current of the light emitting element EE may be determined by a difference between the reference voltage VREF and the data voltage VDATA. The reference voltage VREF may be lower than the first power voltage ELVDD.

The pixel circuit may further include a fourth switching element T4, a fifth switching element T5, a sixth switching element T6 and a seventh switching element T7.

The fourth switching element T4 may include a control electrode for receiving an initialization gate signal GI, a first electrode connected to the first node N1 and a second electrode for receiving a first initialization voltage VINT.

The fifth switching element T5 may include a control electrode for receiving the emission signal EM, a first electrode for receiving the first power voltage ELVDD and a second electrode connected to the second node N2.

The sixth switching element T6 may include a control electrode for receiving the emission signal EM, a first electrode connected to the third node N3 and a second electrode connected to an anode electrode of the light emitting element EE.

In the present embodiment, the seventh switching element T7 may include a control electrode for receiving the emission signal EM, a first electrode for receiving a second initialization voltage VAINT and a second electrode connected to the anode electrode. Thus, in the present embodiment, the anode electrode of the light emitting element EE may be initialized in the first period DR1 of FIG. 3, the second period DR2 of FIG. 5, the third period DR3 of FIG. 7 and the fourth period DR4 of FIG. 9 when the emission signal EM has the inactive level (the high level).

The light emitting element EE may include the anode electrode and a cathode electrode for receiving a second power voltage ELVSS.

For example, the first switching element T1 may be the P-type transistor. The second switching element T2 may be the P-type transistor. The third switching element T3 may be the N-type transistor. The fourth switching element T4 may be the N-type transistor. The fifth switching element T5 may be the P-type transistor. The sixth switching element T6 may be the P-type transistor. The seventh switching element T7 may be the N-type transistor.

According to the present embodiment, the driving current IEE of the light emitting element EE may be determined based on the difference between the reference voltage VREF, which is lower than the first power voltage ELVDD, and the data voltage VDATA in the pixel circuit. Thus, the power consumption of the pixel circuit may be reduced.

Figure 26:
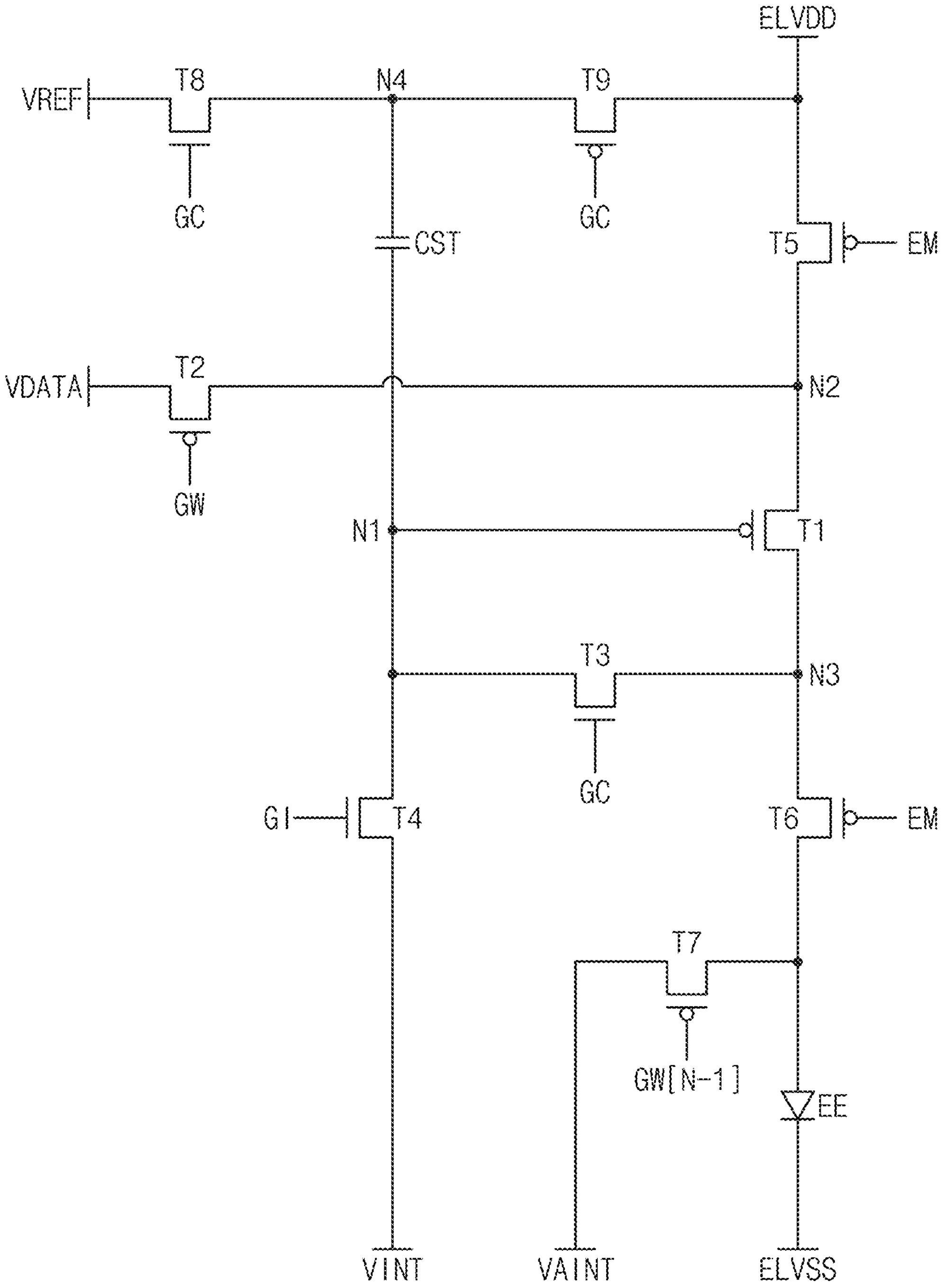
FIG. 26 is a circuit diagram illustrating a pixel circuit of a display apparatus according to an embodiment of the present invention.

FIG. 26 is a circuit diagram illustrating a pixel circuit of a display apparatus according to an embodiment of the present invention.

The pixel circuit of the display apparatus according to the present embodiment is substantially the same as the pixel circuit of the display apparatus of the previous embodiment explained referring to FIGS. 1 to 12 except for the seventh switching element. Thus, the same reference numerals will be used to refer to the same or like parts as those described in the previous embodiment of FIGS. 1 to 12 and any repetitive explanation concerning the above elements will be omitted.

Referring to FIGS. 1 and 26, the pixel circuit includes a light emitting element EE, a first switching element T1, a second switching element T2, a third switching element T3, a capacitor CST, an eighth switching element T8 and a ninth switching element T9.

The first switching element T1 includes a control electrode connected to a first node N1, a first electrode connected to a second node N2 and a second electrode connected to a third node N3. The first switching element T1 applies a driving current to the light emitting element EE.

The second switching element T2 applies a data voltage VDATA to the second node N2 in response to a data writing gate signal GW.

The third switching element T3 connects the first node N1 and the third node N3 in response to a compensation gate signal GC.

The capacitor CST includes a first electrode connected to the first node N1 and a second electrode connected to a fourth node N4.

The eighth switching element T8 includes a first electrode for receiving a reference voltage VREF and a second electrode connected to the fourth node N4. The ninth switching element T9 includes a first electrode for receiving a first power voltage ELVDD and a second electrode connected to the fourth node N4. One of the eighth switching element T8 and the ninth switching element T9 is an N-type transistor and the other of the eighth switching element T8 and the ninth switching element T9 is a P-type transistor. In other words, the eighth switching element T8 and the ninth switching element T9 may form a Complementary Metal Oxide Semiconductor (CMOS) circuit.

In the present embodiment, the eighth switching element T8 may further include a control electrode for receiving the compensation gate signal GC. In addition, the ninth switching element T9 may further include a control electrode for receiving the compensation gate signal GC.

In the present embodiment, the eighth switching element T8 may be an N-type transistor and the ninth switching element T9 may be a P-type transistor. The same signal (the compensation gate signal GC) may be applied to the control electrode of the eighth switching element T8 and the control electrode of the ninth switching element T9. Thus, when the eighth switching element T8 is turned on, the ninth switching element T9 may be turned off. When the eighth switching element T8 is turned off, the ninth switching element T9 may be turned on.

In the present embodiment, the driving current of the light emitting element EE may be determined by a difference between the reference voltage VREF and the data voltage VDATA. The reference voltage VREF may be lower than the first power voltage ELVDD.

The pixel circuit may further include a fourth switching element T4, a fifth switching element T5, a sixth switching element T6 and a seventh switching element T7.

The fourth switching element T4 may include a control electrode for receiving an initialization gate signal GI, a first electrode connected to the first node N1 and a second electrode for receiving a first initialization voltage VINT.

The fifth switching element T5 may include a control electrode for receiving the emission signal EM, a first electrode for receiving the first power voltage ELVDD and a second electrode connected to the second node N2.

The sixth switching element T6 may include a control electrode for receiving the emission signal EM, a first electrode connected to the third node N3 and a second electrode connected to an anode electrode of the light emitting element EE.

In the present embodiment, the seventh switching element T7 may include a control electrode for receiving a data writing gate signal GW[N−1] of a previous stage, a first electrode for receiving a second initialization voltage VAINT and a second electrode connected to the anode electrode.

In FIG. 26, "[N−1]" means an N-1-th pixel row. The other gate signals except for the data writing gate signal GW[N−1] and the emission signal may correspond to a present stage (an N-th pixel row). In other words, the emission signal EM, the initialization gate signal GI, the compensation gate signal GC and the data writing gate signal GW may be applied to the pixel corresponding to the N-th pixel row. In FIG. 26, EM, GI, GC and GW may be represented to EM[N], GI[N], GC[N] and GW[N].

The light emitting element EE may include the anode electrode and a cathode electrode for receiving a second power voltage ELVSS.

For example, the first switching element T1 may be the P-type transistor. The second switching element T2 may be the P-type transistor. The third switching element T3 may be the N-type transistor. The fourth switching element T4 may be the N-type transistor. The fifth switching element T5 may be the P-type transistor. The sixth switching element T6 may be the P-type transistor. The seventh switching element T7 may be the P-type transistor.

According to the present embodiment, the driving current IEE of the light emitting element EE may be determined based on the difference between the reference voltage VREF, which is lower than the first power voltage ELVDD, and the data voltage VDATA in the pixel circuit. Thus, the power consumption of the pixel circuit may be reduced.

Figure 27:
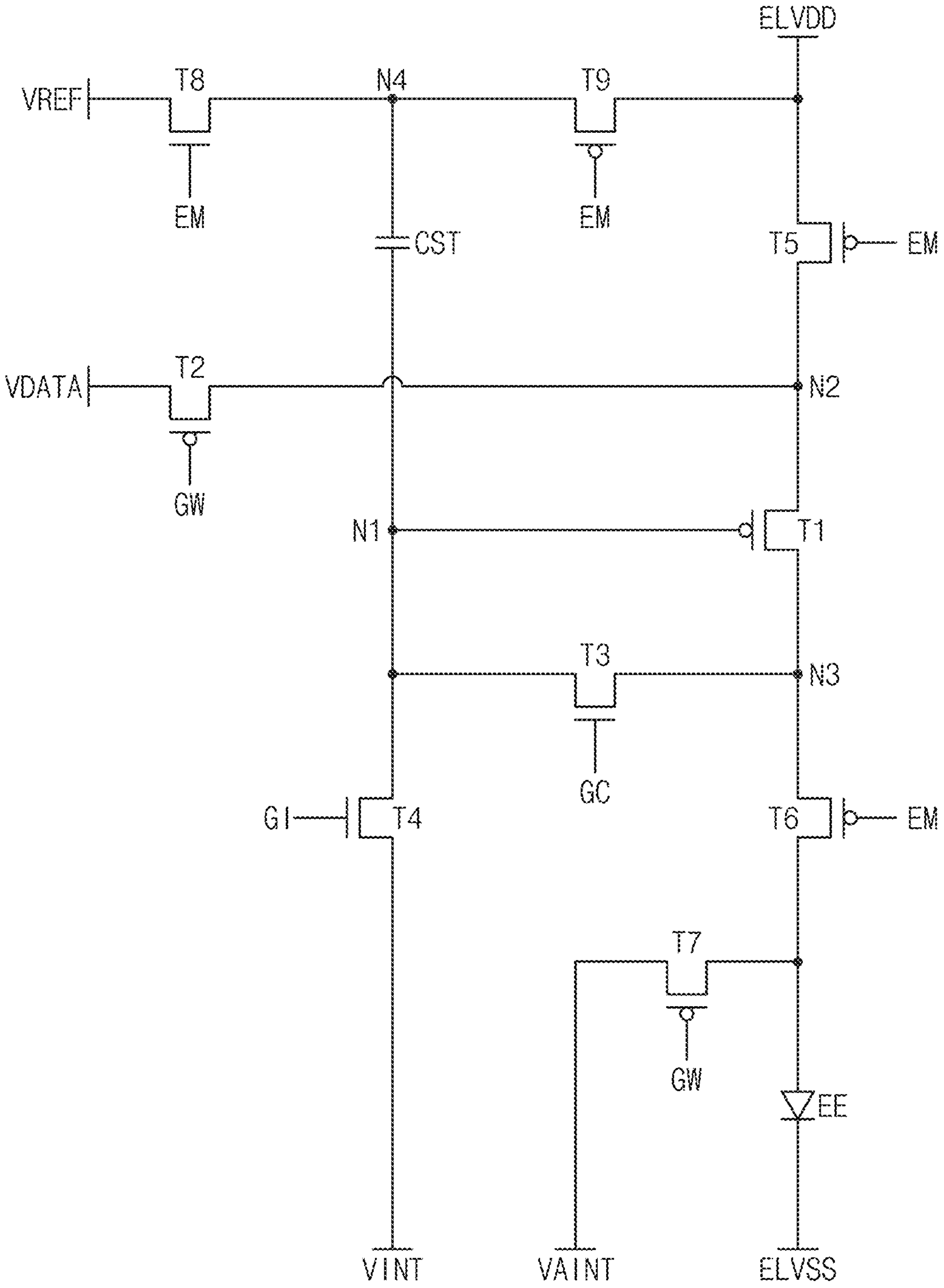
FIG. 27 is a circuit diagram illustrating a pixel circuit of a display apparatus according to an embodiment of the present invention.
Figure 28:
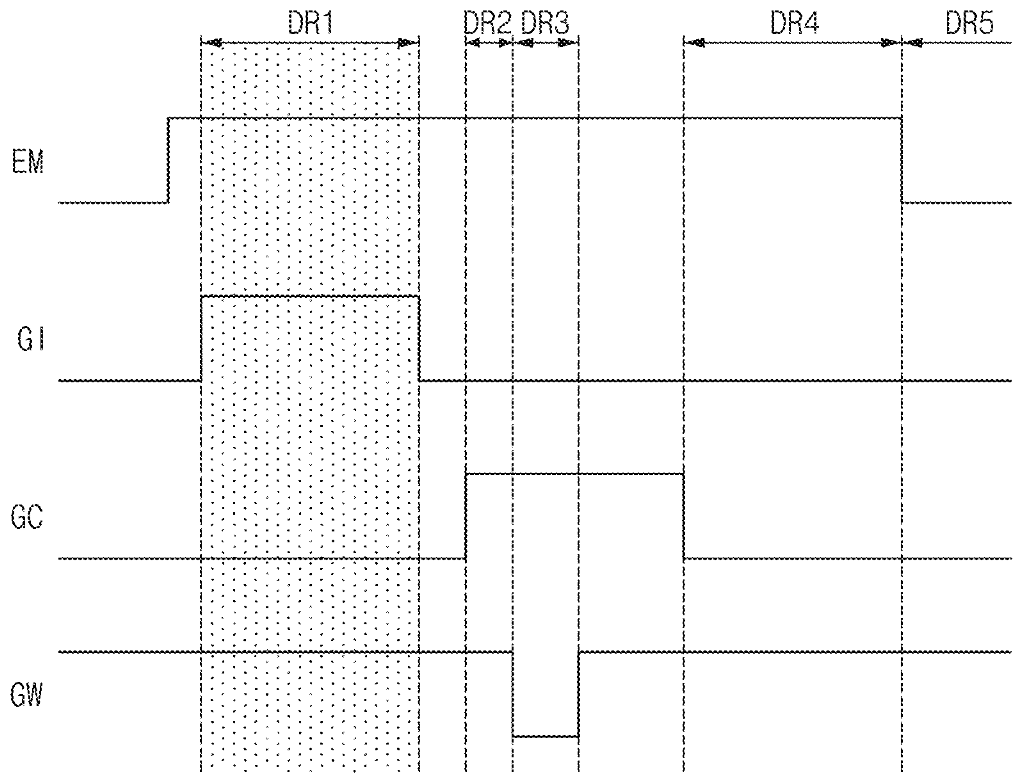
FIG. 28 is a timing diagram illustrating an example of an operation of the pixel circuit of FIG. 27 in a first period.
Figure 29:
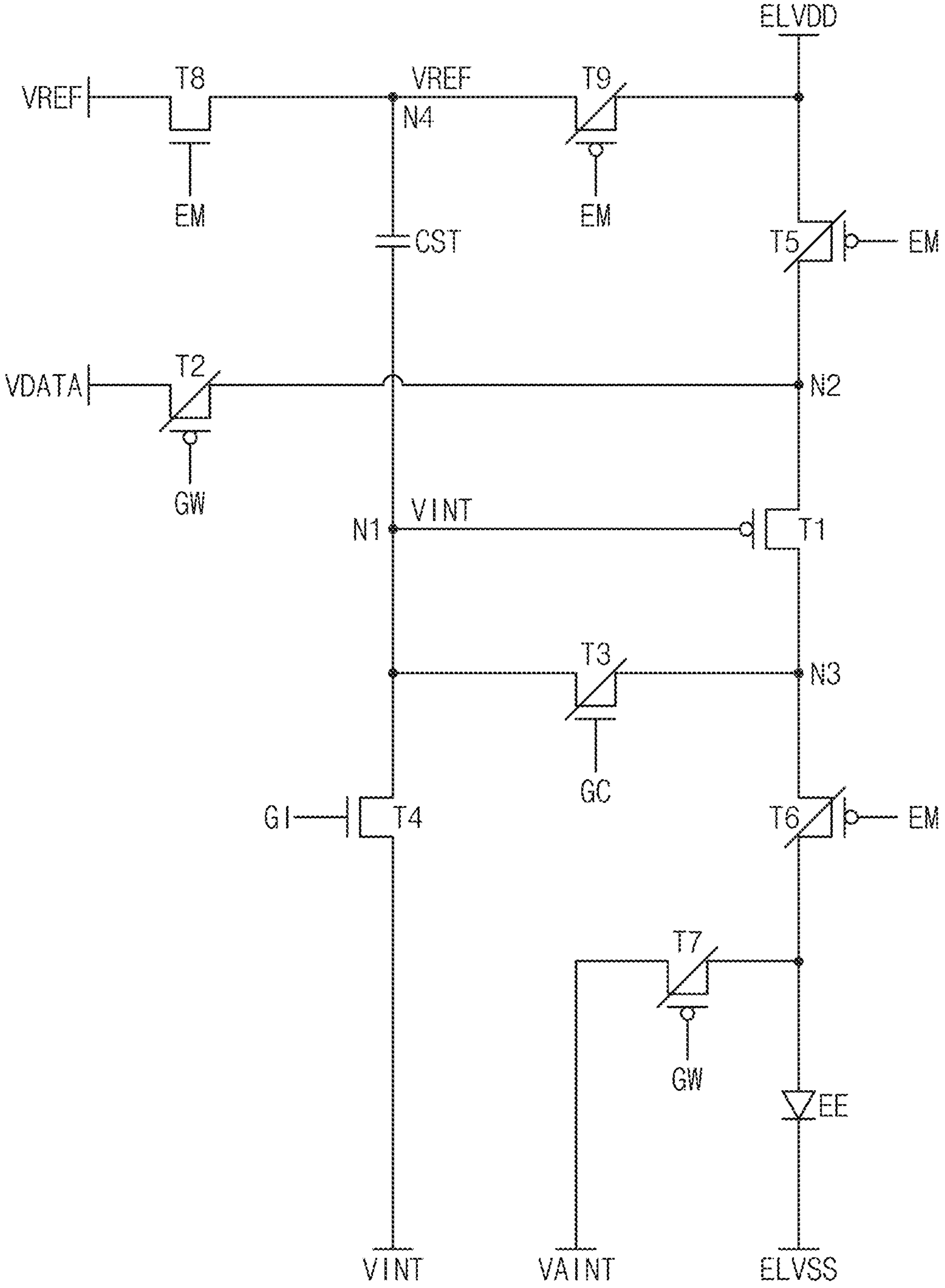
FIG. 29 is a circuit diagram illustrating an example of the operation of the pixel circuit of FIG. 27 in the first period.
Figure 30:
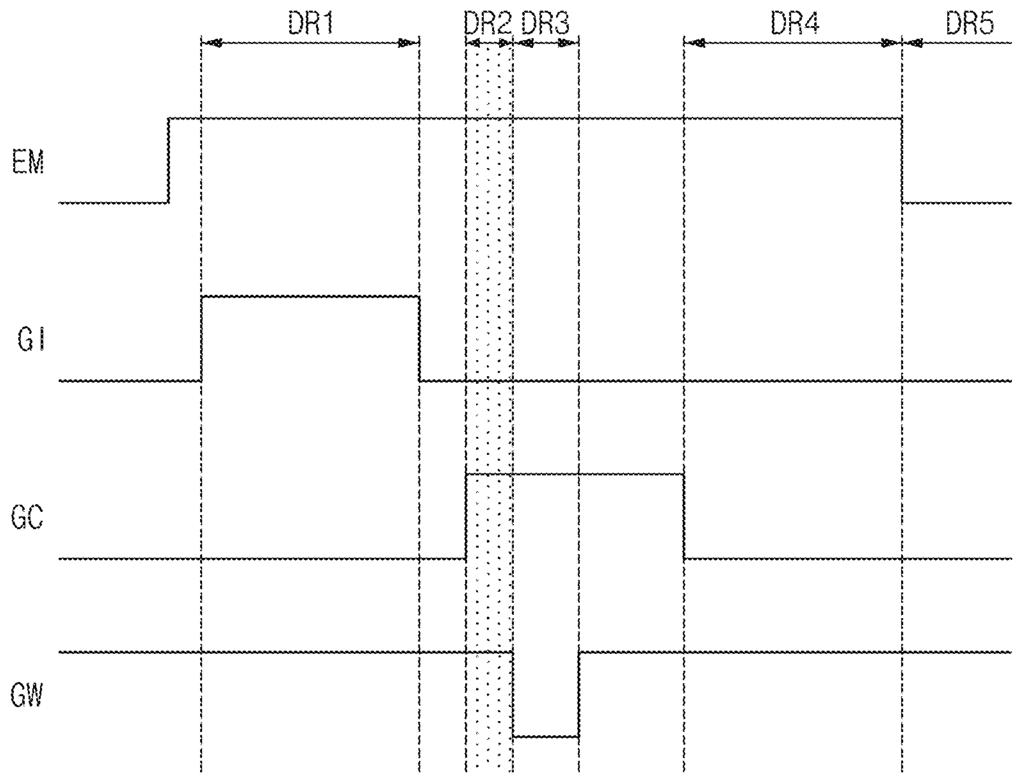
FIG. 30 is a timing diagram illustrating an example of an operation of the pixel circuit of FIG. 27 in a second period.
Figure 31:
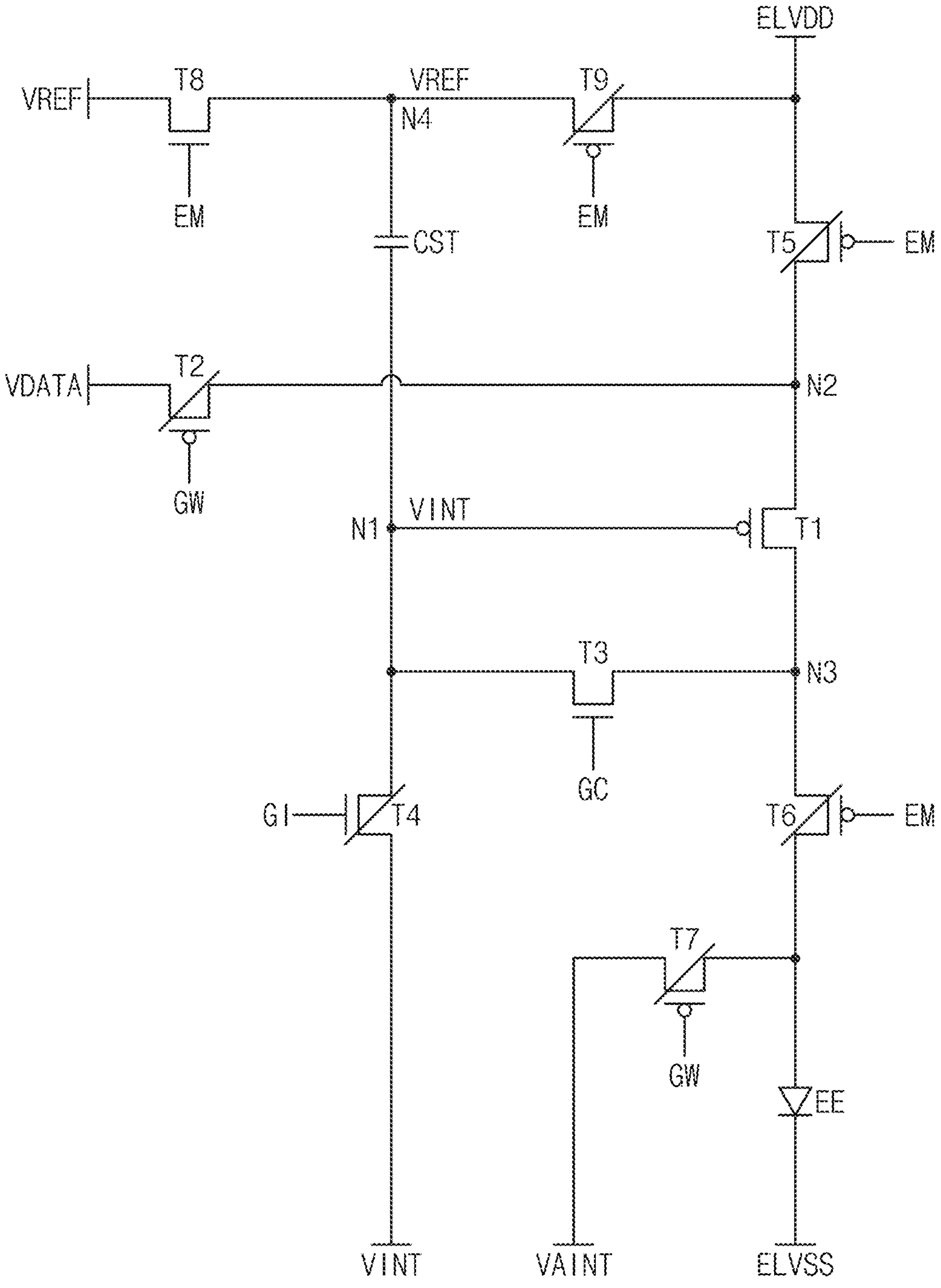
FIG. 31 is a circuit diagram illustrating an example of the operation of the pixel circuit of FIG. 27 in the second period.
Figure 32:
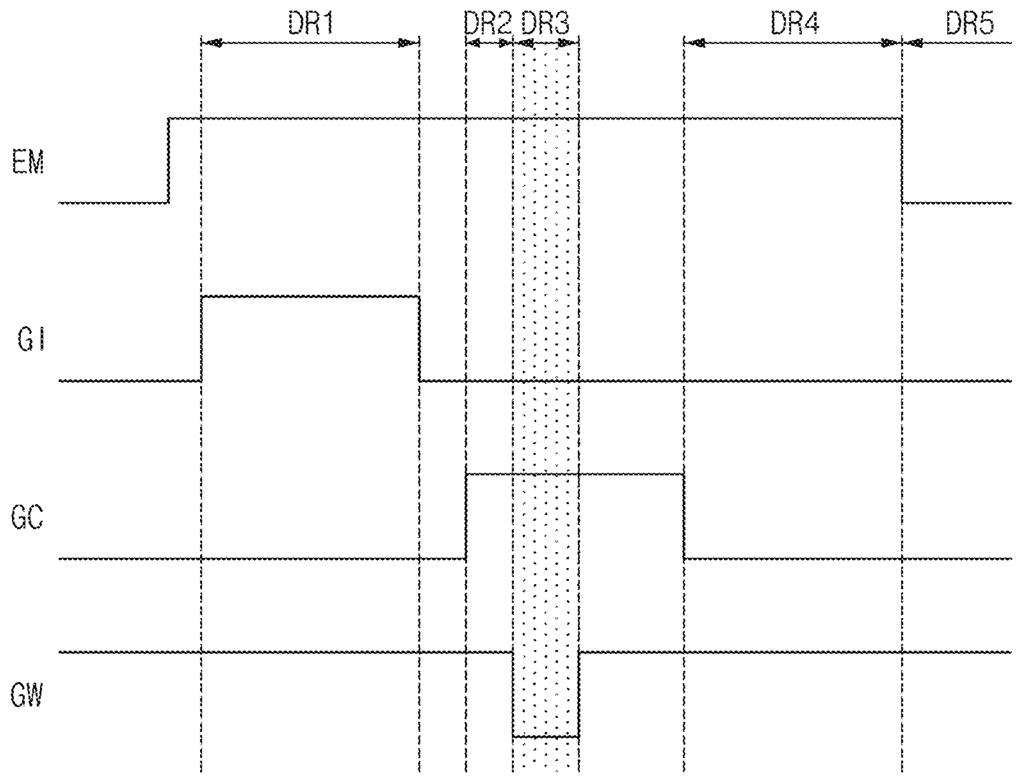
FIG. 32 is a timing diagram illustrating an example of an operation of the pixel circuit of FIG. 27 in a third period.
Figure 33:
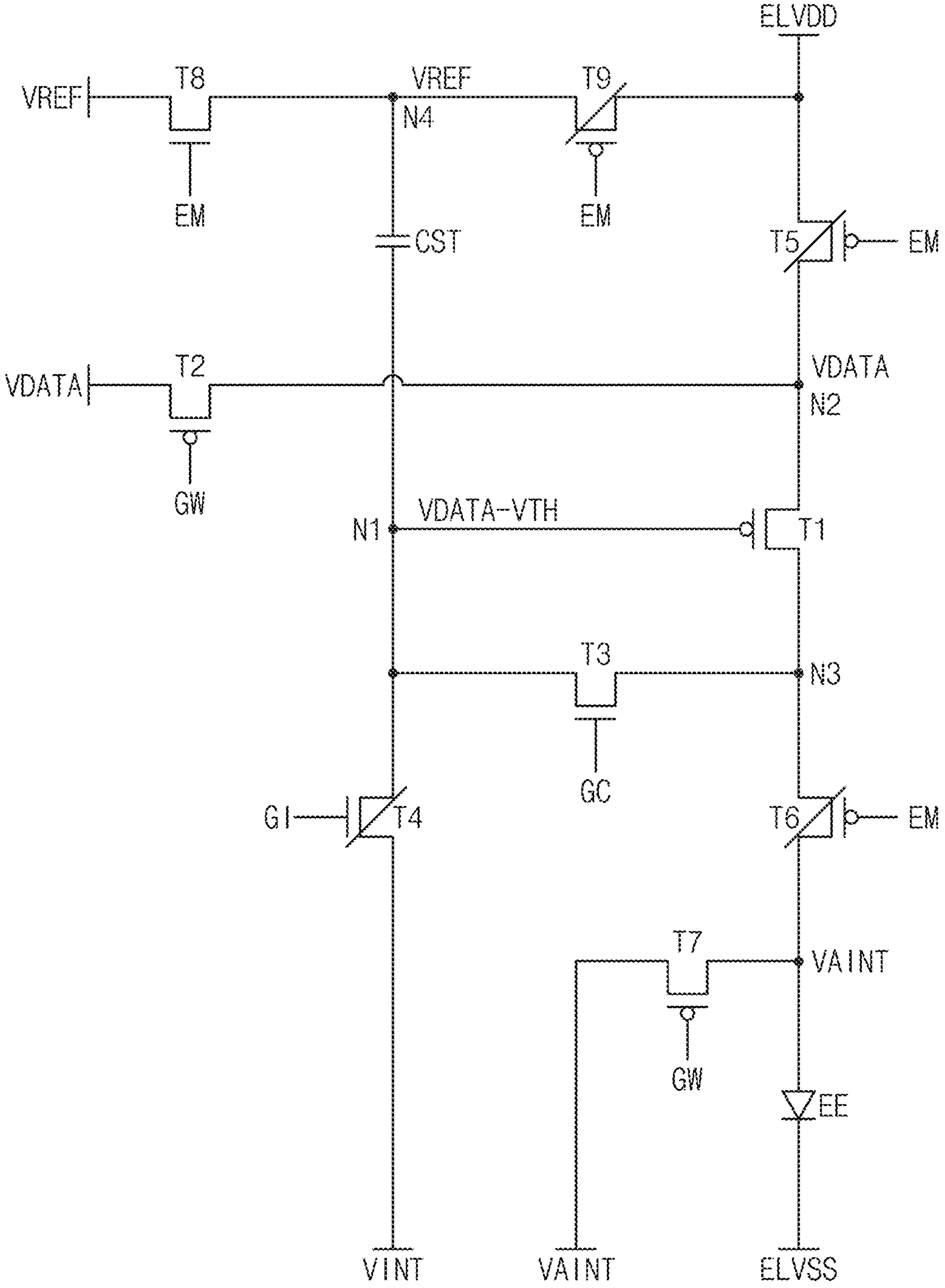
FIG. 33 is a circuit diagram illustrating an example of the operation of the pixel circuit of FIG. 27 in the third period.
Figure 34:
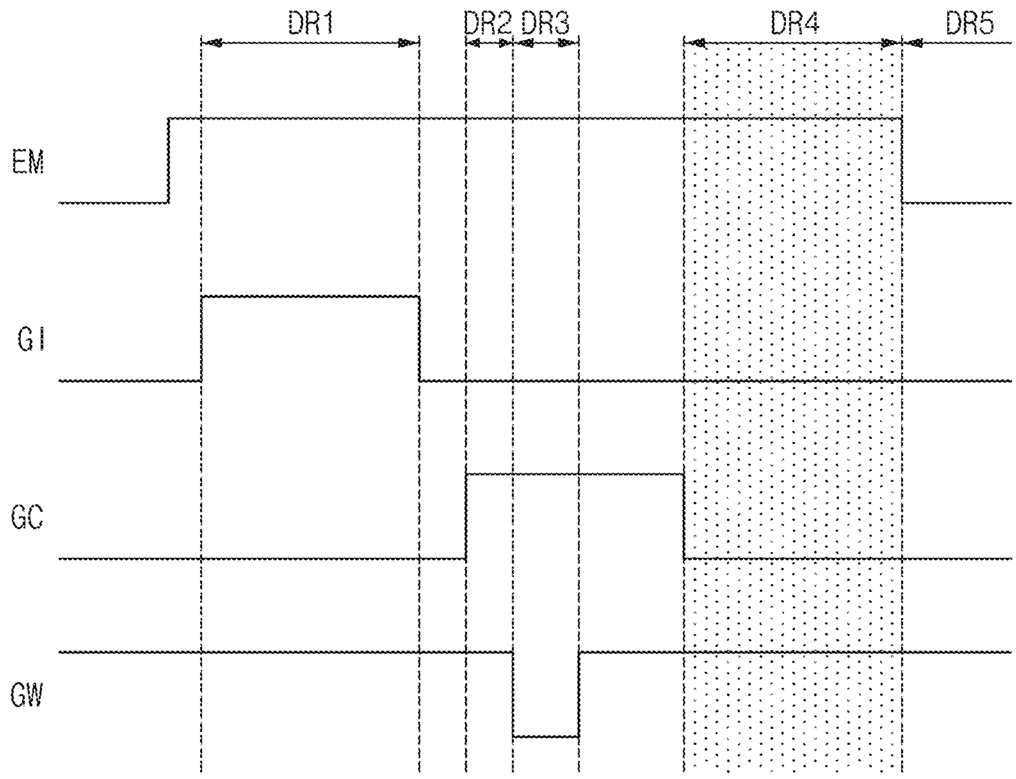
FIG. 34 is a timing diagram illustrating an example of an operation of the pixel circuit of FIG. 27 in a fourth period.
Figure 35:
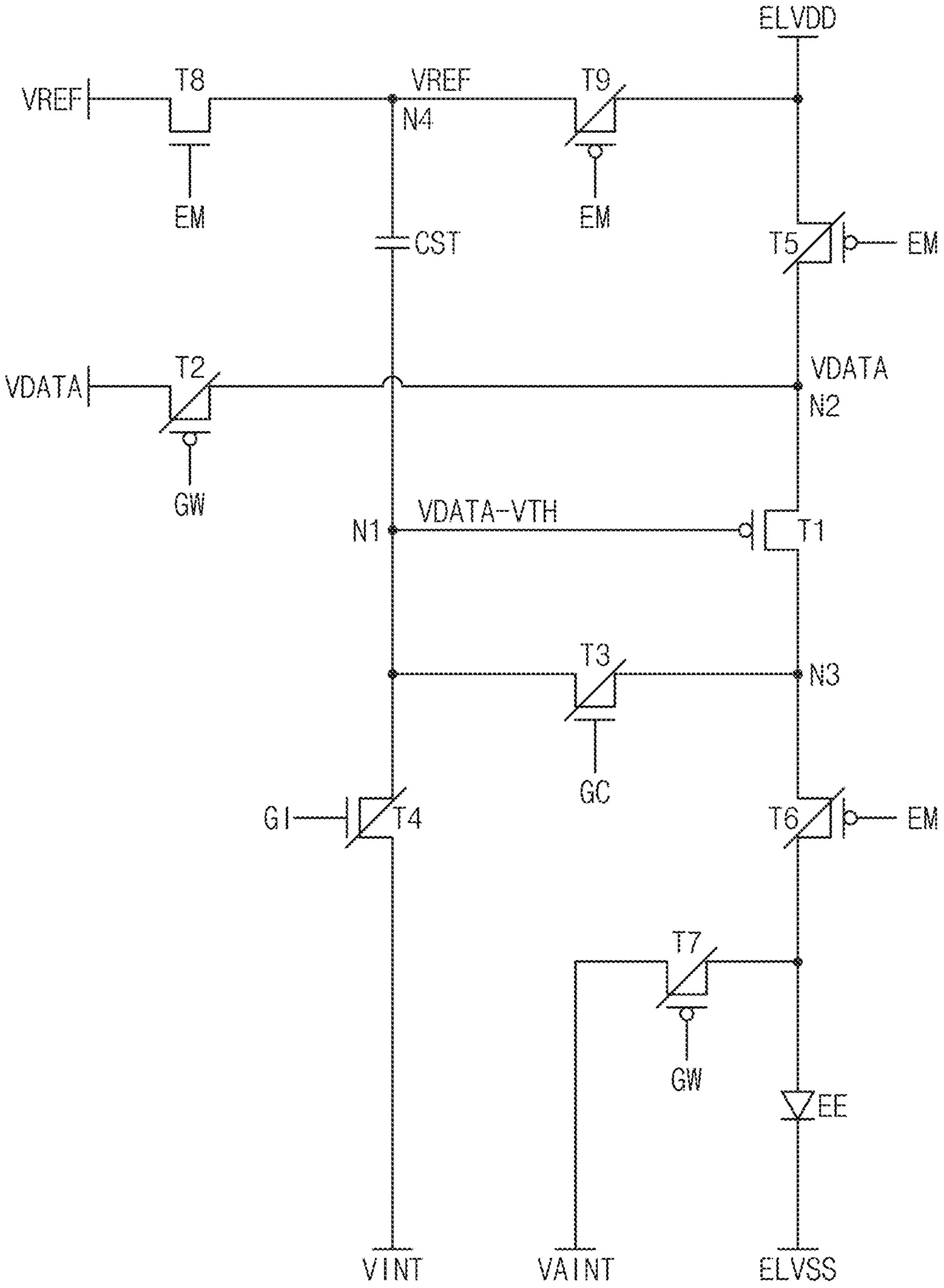
FIG. 35 is a circuit diagram illustrating an example of the operation of the pixel circuit of FIG. 27 in the fourth period.
Figure 36:
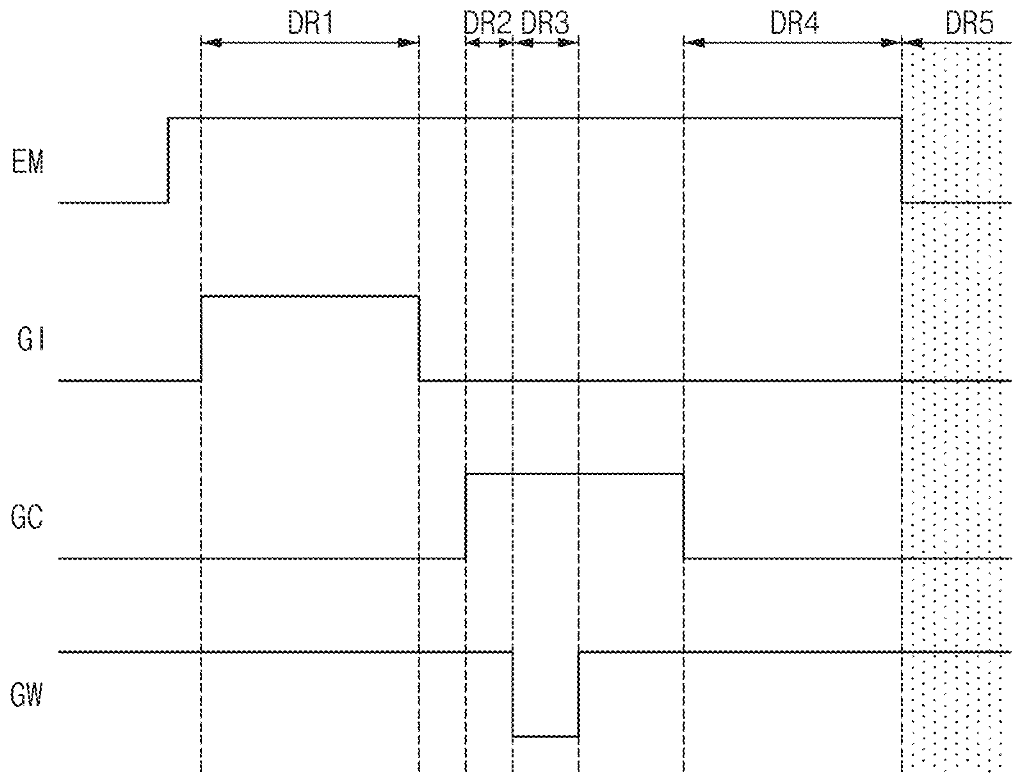
FIG. 36 is a timing diagram illustrating an example of an operation of the pixel circuit of FIG. 27 in a fifth period.
Figure 37:
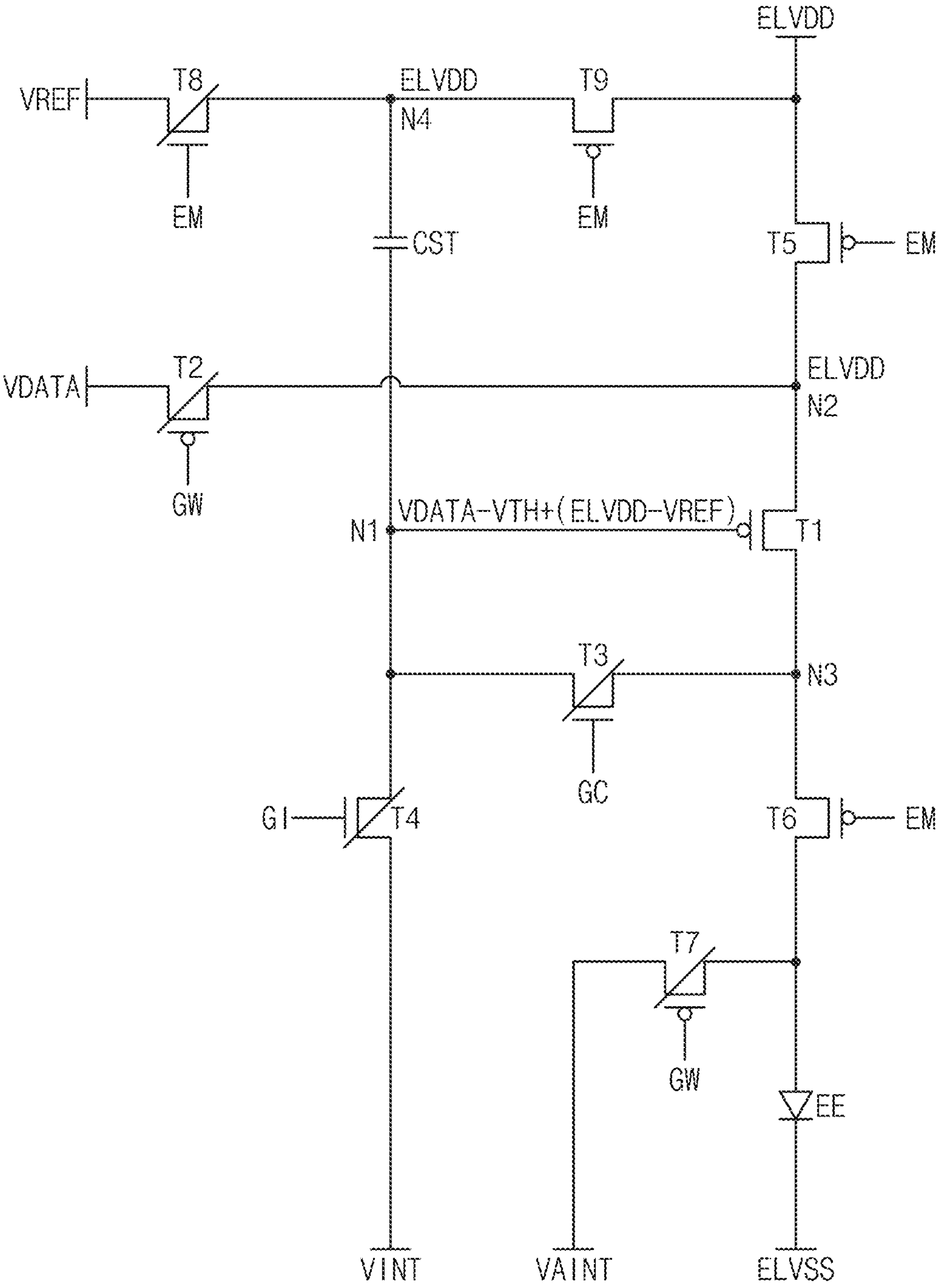
FIG. 37 is a circuit diagram illustrating an example of the operation of the pixel circuit of FIG. 27 in the fifth period.

FIG. 27 is a circuit diagram illustrating a pixel circuit of a display apparatus according to an embodiment of the present invention. FIG. 28 is a timing diagram illustrating an example of an operation of the pixel circuit of FIG. 27 in a first period DR1. FIG. 29 is a circuit diagram illustrating an example of the operation of the pixel circuit of FIG. 27 in the first period DR1. FIG. 30 is a timing diagram illustrating an example of an operation of the pixel circuit of FIG. 27 in a second period DR2. FIG. 31 is a circuit diagram illustrating an example of the operation of the pixel circuit of FIG. 27 in the second period DR2. FIG. 32 is a timing diagram illustrating an example of an operation of the pixel circuit of FIG. 27 in a third period DR3. FIG. 33 is a circuit diagram illustrating an example of the operation of the pixel circuit of FIG. 27 in the third period DR3. FIG. 34 is a timing diagram illustrating an example of an operation of the pixel circuit of FIG. 27 in a fourth period DR4. FIG. 35 is a circuit diagram illustrating an example of the operation of the pixel circuit of FIG. 27 in the fourth period DR4. FIG. 36 is a timing diagram illustrating an example of an operation of the pixel circuit of FIG. 27 in a fifth period DR5. FIG. 37 is a circuit diagram illustrating an example of the operation of the pixel circuit of FIG. 27 in the fifth period DR5.

The pixel circuit of the display apparatus according to the present embodiment is substantially the same as the pixel circuit of the display apparatus of the previous embodiment explained referring to FIGS. 1 to 12 except for the eighth switching element and the ninth switching element. Thus, the same reference numerals will be used to refer to the same or like parts as those described in the previous embodiment of FIGS. 1 to 12 and any repetitive explanation concerning the above elements will be omitted.

FIGS. 1 and 27 to 37, the pixel circuit includes a light emitting element EE, a first switching element T1, a second switching element T2, a third switching element T3, a capacitor CST, an eighth switching element T8 and a ninth switching element T9.

The first switching element T1 includes a control electrode connected to a first node N1, a first electrode connected to a second node N2 and a second electrode connected to a third node N3. The first switching element T1 applies a driving current to the light emitting element EE.

The second switching element T2 applies a data voltage VDATA to the second node N2 in response to a data writing gate signal GW.

The third switching element T3 connects the first node N1 and the third node N3 in response to a compensation gate signal GC.

The capacitor CST includes a first electrode connected to the first node N1 and a second electrode connected to a fourth node N4.

The eighth switching element T8 includes a first electrode for receiving a reference voltage VREF and a second electrode connected to the fourth node N4. The ninth switching element T9 includes a first electrode for receiving a first power voltage ELVDD and a second electrode connected to the fourth node N4. One of the eighth switching element T8 and the ninth switching element T9 is an N-type transistor and the other of the eighth switching element T8 and the ninth switching element T9 is a P-type transistor. In other words, the eighth switching element T8 and the ninth switching element T9 may form a Complementary Metal Oxide Semiconductor (CMOS) circuit.

In the present embodiment, the eighth switching element T8 may further include a control electrode for receiving the emission signal EM. In addition, the ninth switching element T9 may further include a control electrode for receiving the emission signal EM.

In the present embodiment, the eighth switching element T8 may be an N-type transistor and the ninth switching element T9 may be a P-type transistor. The same signal (the emission signal EM) may be applied to the control electrode of the eighth switching element T8 and the control electrode of the ninth switching element T9. Thus, when the eighth switching element T8 is turned on, the ninth switching element T9 may be turned off. When the eighth switching element T8 is turned off, the ninth switching element T9 may be turned on.

In the present embodiment, the driving current of the light emitting element EE may be determined by a difference between the reference voltage VREF and the data voltage VDATA. The reference voltage VREF may be lower than the first power voltage ELVDD.

The pixel circuit may further include a fourth switching element T4, a fifth switching element T5, a sixth switching element T6 and a seventh switching element T7.

The fourth switching element T4 may include a control electrode for receiving an initialization gate signal GI, a first electrode connected to the first node N1 and a second electrode for receiving a first initialization voltage VINT.

The fifth switching element T5 may include a control electrode for receiving the emission signal EM, a first electrode for receiving the first power voltage ELVDD and a second electrode connected to the second node N2.

The sixth switching element T6 may include a control electrode for receiving the emission signal EM, a first electrode connected to the third node N3 and a second electrode connected to an anode electrode of the light emitting element EE.

In the present embodiment, the seventh switching element T7 may include a control electrode for receiving the data writing gate signal GW, a first electrode for receiving a second initialization voltage VAINT and a second electrode connected to the anode electrode.

The light emitting element EE may include the anode electrode and a cathode electrode for receiving a second power voltage ELVSS.

For example, the first switching element T1 may be the P-type transistor. The second switching element T2 may be the P-type transistor. The third switching element T3 may be the N-type transistor. The fourth switching element T4 may be the N-type transistor. The fifth switching element T5 may be the P-type transistor. The sixth switching element T6 may be the P-type transistor. The seventh switching element T7 may be the P-type transistor.

A first period DR1 may be an initialization period of the first switching element T1.

In the first period DR1, the emission signal EM may have a high level, the initialization gate signal GI may have an active level, the compensation gate signal GC may have an inactive level and the data writing gate signal GW may have an inactive level.

Herein, when the transistor receiving the emission signal EM, the initialization gate signal GI, the compensation gate signal GC or the data writing gate signal GW is a P-type transistor, the active level may be a low level and the inactive level may be a high level. In contrast, when the transistor receiving the emission signal EM, the initialization gate signal GI, the compensation gate signal GC or the data writing gate signal GW is an N-type transistor, the active level may be a high level and the inactive level may be a low level.

Thus, in FIGS. 28, 30, 32, 34 and 36, the active level of the initialization gate signal GI may be a high level, the active level of the compensation gate signal GC may be a high level and the active level of the data writing gate signal GW may be a low level. However, a low level of the emission signal EM may be the active level to the fifth, sixth and ninth switching elements T5, T6 and T9 and the inactive level to the eighth switching element T8, while a high level of the emission signal EM may be the inactive level to the fifth, sixth and ninth switching elements T5, T6 and T9 and the active level to the eighth switching element T8.

In the first period DR1, the initialization voltage VINT may be applied to the first node N1 by the fourth switching element T4 turned on in response to the active level of the initialization gate signal GI.

In the first period DR1, the first power voltage ELVDD may be applied to the fourth node N4 by the eighth switching element T8 turned on in response to the active level of the emission signal EM.

A second period DR2 may be a turn-on period of the compensation gate signal GC.

In the second period DR2 subsequent to the first period DR1, the emission signal EM may have the high level, the initialization gate signal GI may have an inactive level, the compensation gate signal GC may have an active level and the data writing gate signal GW may have the inactive level.

In the second period DR2, the reference voltage VREF may be still applied to the fourth node N4 by the eighth switching element T8 turned on in response to the active level of the emission signal EM.

In the second period DR2, the first node N1 and the third node N3 may be connected to each other by the third switching element T3 turned on in response to the active level of the compensation gate signal GC.

A third period DR3 may be a data writing and compensation period.

In the third period DR3 subsequent to the second period DR2, the emission signal EM may have the high level, the initialization gate signal GI may have the inactive level, the compensation gate signal GC may have the active level and the data writing gate signal GW may have an active level.

In the third period DR3, the reference voltage VREF may be still applied to the fourth node N4 by the eighth switching element T8 turned on in response to the active level of the emission signal EM.

In the third period DR3, the data voltage VDATA including a threshold voltage VTH of the first switching element T1 may be written to the first node N1 by the second switching element T2 turned on in response to the active level of the data writing gate signal GW, the first switching element T1 turned on in response to the voltage of the first node N1 and the third switching element T3 turned on in response to the active level of the compensation gate signal GC. In the third period DR3, the voltage of the first node N1 may be VDATA-VTH.

In the third period DR3, a voltage of the second node N2 may be VDATA and a gate-source voltage Vgs of the first switching element T1 may be VTH.

In the present embodiment, an initialization of the anode electrode of the light emitting element EE may be operated in the third period DR3. In the third period DR3, the second initialization voltage VAINT may be applied to the anode electrode by the seventh switching element T7 turned on in response to the active level of the data writing gate signal GW.

A fourth period DR4 may be a turn-off period of the compensation gate signal GC.

In the fourth period DR4 subsequent to the third period DR3, the emission signal EM may have the high level, the initialization gate signal GI may have the inactive level, the compensation gate signal GC may have the inactive level and the data writing gate signal GW may have the inactive level.

In the fourth period DR4, the reference voltage VREF may be still applied to the fourth node N4 by the eighth switching element T8 turned on in response to the active level of the emission signal EM.

In the fourth period DR4, the voltage of the first node N1 may be VDATA-VTH like in the third period DR3.

In the fourth period DR4, the voltage of the second node N2 is VDATA and the gate-source voltage Vgs of the first switching element T1 may be VTH.

A fifth period DR5 may be a light emitting period.

In the fifth period DR5 subsequent to the fourth period DR4, the emission signal EM may have a low level, the initialization gate signal GI may have the inactive level, the compensation gate signal GC may have the inactive level and the data writing gate signal GW may have the inactive level.

In the fifth period DR5, the first power voltage ELVDD may be applied to the second node N2 by the fifth switching element T5 turned on in response to the active level of the emission signal EM.

In the fifth period DR5, the third node N3 may be connected to the anode electrode of the light emitting element EE by the sixth switching element T6 turned on in response to the active level of the emission signal EM.

In the fifth period DR5, the light emitting element EE may emit a light along a path of the turned-on fifth switching element T5, the turned-on first switching element T1 and the turned-on sixth switching element T6.

In the fifth period DR5, the first power voltage ELVDD may be applied to the fourth node N4 by the ninth switching element T9 turned on in response to the active level of the emission signal EM.

Herein, the voltage change ELVDD-VREF of the fourth node N4 may be reflected to the first node N1 by the capacitor CST. In the fifth period DR5, the voltage of the first node N1 may be VDATA-VTH+(ELVDD-VREF).

In the fifth period DR5, the voltage of the second node N2 may be ELVDD and the gate-source voltage Vgs of the first switching element T1 may be VREF-VDATA+VTH.

According to the present embodiment, the driving current of the light emitting element EE may be determined based on the difference between the reference voltage VREF, which is lower than the first power voltage ELVDD, and the data voltage VDATA in the pixel circuit. Thus, the power consumption of the pixel circuit may be reduced.

Figure 38:
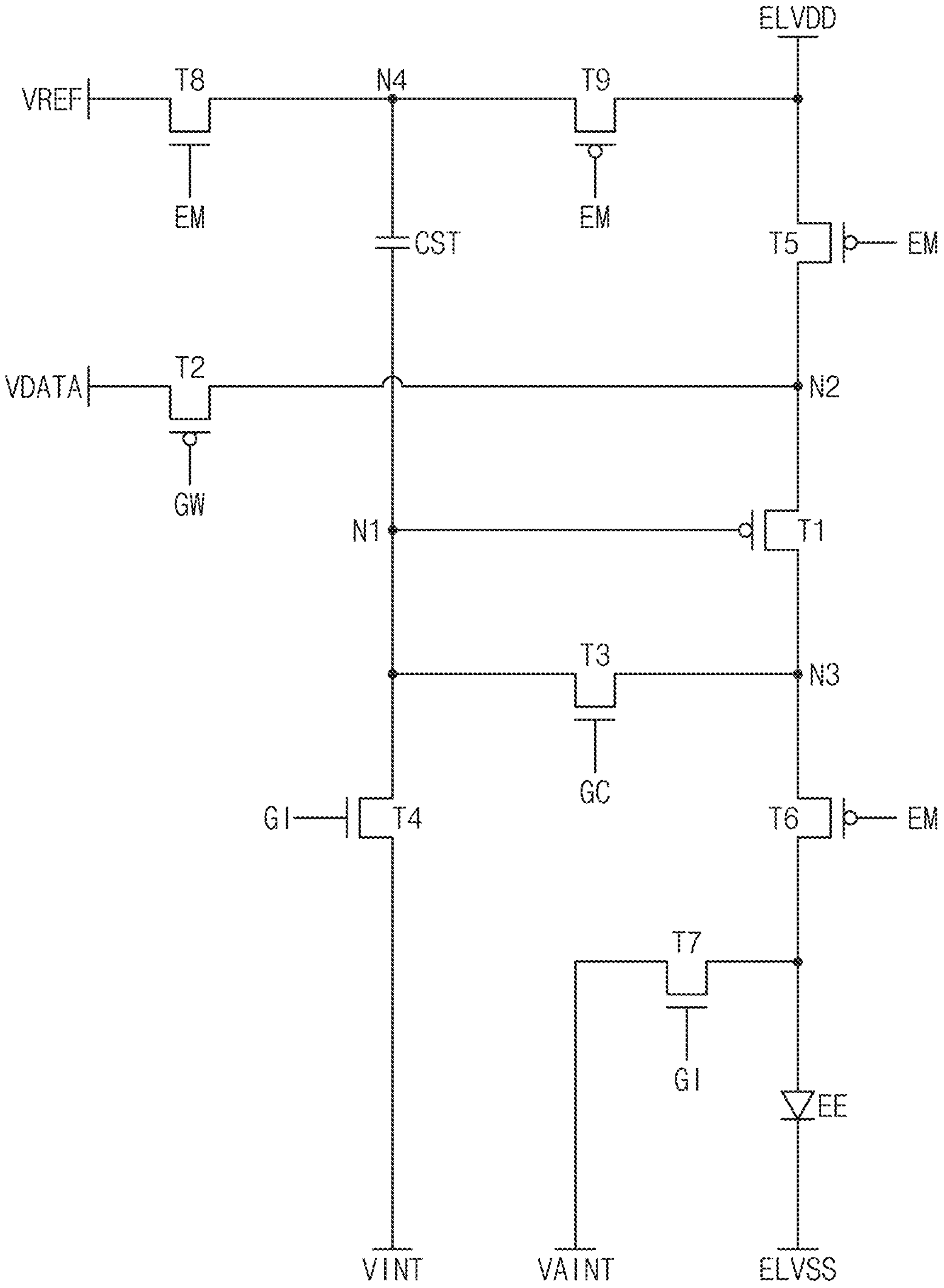
FIG. 38 is a circuit diagram illustrating a pixel circuit of a display apparatus according to an embodiment of the present invention.

FIG. 38 is a circuit diagram illustrating a pixel circuit of a display apparatus according to an embodiment of the present invention.

The pixel circuit of the display apparatus according to the present embodiment is substantially the same as the pixel circuit of the display apparatus of the previous embodiment explained referring to FIGS. 27 to 37 except for the seventh switching element. Thus, the same reference numerals will be used to refer to the same or like parts as those described in the previous embodiment of FIGS. 27 to 37 and any repetitive explanation concerning the above elements will be omitted.

Referring to FIGS. 1 and 38, the pixel circuit includes a light emitting element EE, a first switching element T1, a second switching element T2, a third switching element T3, a capacitor CST, an eighth switching element T8 and a ninth switching element T9.

The first switching element T1 includes a control electrode connected to a first node N1, a first electrode connected to a second node N2 and a second electrode connected to a third node N3. The first switching element T1 applies a driving current to the light emitting element EE.

The second switching element T2 applies a data voltage VDATA to the second node N2 in response to a data writing gate signal GW.

The third switching element T3 connects the first node N1 and the third node N3 in response to a compensation gate signal GC.

The capacitor CST includes a first electrode connected to the first node N1 and a second electrode connected to a fourth node N4.

The eighth switching element T8 includes a first electrode for receiving a reference voltage VREF and a second electrode connected to the fourth node N4. The ninth switching element T9 includes a first electrode for receiving a first power voltage ELVDD and a second electrode connected to the fourth node N4. One of the eighth switching element T8 and the ninth switching element T9 is an N-type transistor and the other of the eighth switching element T8 and the ninth switching element T9 is a P-type transistor. In other words, the eighth switching element T8 and the ninth switching element T9 may form a Complementary Metal Oxide Semiconductor (CMOS) circuit.

In the present embodiment, the eighth switching element T8 may further include a control electrode for receiving the emission signal EM. In addition, the ninth switching element T9 may further include a control electrode for receiving the emission signal EM.

In the present embodiment, the eighth switching element T8 may be an N-type transistor and the ninth switching element T9 may be a P-type transistor. The same signal (the emission signal EM) may be applied to the control electrode of the eighth switching element T8 and the control electrode of the ninth switching element T9. Thus, when the eighth switching element T8 is turned on, the ninth switching element T9 may be turned off. When the eighth switching element T8 is turned off, the ninth switching element T9 may be turned on.

In the present embodiment, the driving current of the light emitting element EE may be determined by a difference between the reference voltage VREF and the data voltage VDATA. The reference voltage VREF may be lower than the first power voltage ELVDD.

The pixel circuit may further include a fourth switching element T4, a fifth switching element T5, a sixth switching element T6 and a seventh switching element T7.

The fourth switching element T4 may include a control electrode for receiving an initialization gate signal GI, a first electrode connected to the first node N1 and a second electrode for receiving a first initialization voltage VINT.

The fifth switching element T5 may include a control electrode for receiving the emission signal EM, a first electrode for receiving the first power voltage ELVDD and a second electrode connected to the second node N2.

The sixth switching element T6 may include a control electrode for receiving the emission signal EM, a first electrode connected to the third node N3 and a second electrode connected to an anode electrode of the light emitting element EE.

In the present embodiment, the seventh switching element T7 may include a control electrode for receiving the initialization gate signal GI, a first electrode for receiving a second initialization voltage VAINT and a second electrode connected to the anode electrode. Thus, in the present embodiment, the anode electrode of the light emitting element EE may be initialized in the first period DR1 of FIG. 28.

The light emitting element EE may include the anode electrode and a cathode electrode for receiving a second power voltage ELVSS.

For example, the first switching element T1 may be the P-type transistor. The second switching element T2 may be the P-type transistor. The third switching element T3 may be the N-type transistor. The fourth switching element T4 may be the N-type transistor. The fifth switching element T5 may be the P-type transistor. The sixth switching element T6 may be the P-type transistor. The seventh switching element T7 may be the N-type transistor.

According to the present embodiment, the driving current IEE of the light emitting element EE may be determined based on the difference between the reference voltage VREF, which is lower than the first power voltage ELVDD, and the data voltage VDATA in the pixel circuit. Thus, the power consumption of the pixel circuit may be reduced.

Figure 39:
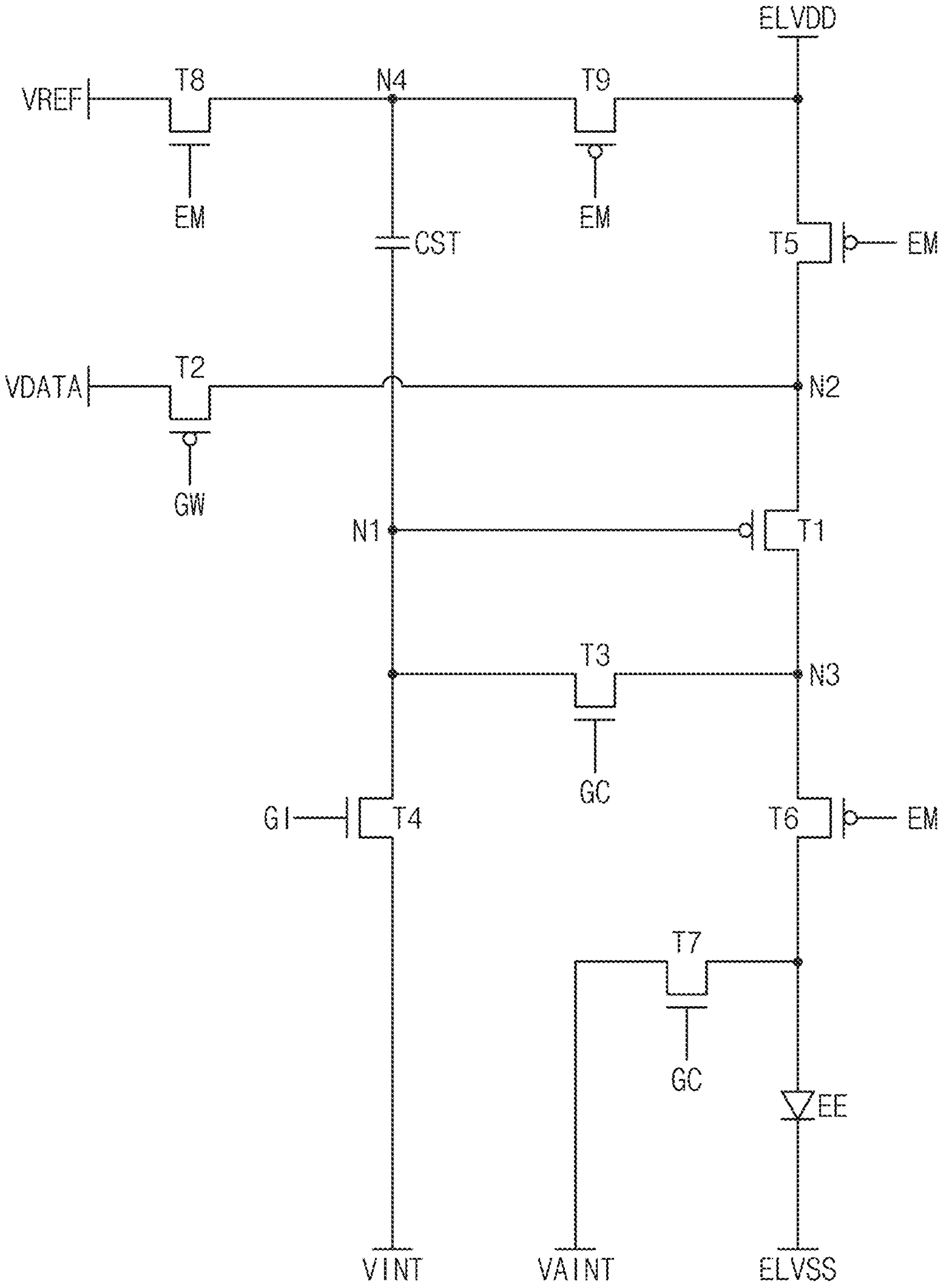
FIG. 39 is a circuit diagram illustrating a pixel circuit of a display apparatus according to an embodiment of the present invention.

FIG. 39 is a circuit diagram illustrating a pixel circuit of a display apparatus according to an embodiment of the present invention.

The pixel circuit of the display apparatus according to the present embodiment is substantially the same as the pixel circuit of the display apparatus of the previous embodiment explained referring to FIGS. 27 to 37 except for the seventh switching element. Thus, the same reference numerals will be used to refer to the same or like parts as those described in the previous embodiment of FIGS. 27 to 37 and any repetitive explanation concerning the above elements will be omitted.

Referring to FIGS. 1 and 39, the pixel circuit includes a light emitting element EE, a first switching element T1, a second switching element T2, a third switching element T3, a capacitor CST, an eighth switching element T8 and a ninth switching element T9.

The first switching element T1 includes a control electrode connected to a first node N1, a first electrode connected to a second node N2 and a second electrode connected to a third node N3. The first switching element T1 applies a driving current to the light emitting element EE.

The second switching element T2 applies a data voltage VDATA to the second node N2 in response to a data writing gate signal GW.

The third switching element T3 connects the first node N1 and the third node N3 in response to a compensation gate signal GC.

The capacitor CST includes a first electrode connected to the first node N1 and a second electrode connected to a fourth node N4.

The eighth switching element T8 includes a first electrode for receiving a reference voltage VREF and a second electrode connected to the fourth node N4. The ninth switching element T9 includes a first electrode for receiving a first power voltage ELVDD and a second electrode connected to the fourth node N4. One of the eighth switching element T8 and the ninth switching element T9 is an N-type transistor and the other of the eighth switching element T8 and the ninth switching element T9 is a P-type transistor. In other words, the eighth switching element T8 and the ninth switching element T9 may form a Complementary Metal Oxide Semiconductor (CMOS) circuit.

In the present embodiment, the eighth switching element T8 may further include a control electrode for receiving the emission signal EM. In addition, the ninth switching element T9 may further include a control electrode for receiving the emission signal EM.

In the present embodiment, the eighth switching element T8 may be an N-type transistor and the ninth switching element T9 may be a P-type transistor. The same signal (the emission signal EM) may be applied to the control electrode of the eighth switching element T8 and the control electrode of the ninth switching element T9. Thus, when the eighth switching element T8 is turned on, the ninth switching element T9 may be turned off. When the eighth switching element T8 is turned off, the ninth switching element T9 may be turned on.

In the present embodiment, the driving current of the light emitting element EE may be determined by a difference between the reference voltage VREF and the data voltage VDATA. The reference voltage VREF may be lower than the first power voltage ELVDD.

The pixel circuit may further include a fourth switching element T4, a fifth switching element T5, a sixth switching element T6 and a seventh switching element T7.

The fourth switching element T4 may include a control electrode for receiving an initialization gate signal GI, a first electrode connected to the first node N1 and a second electrode for receiving a first initialization voltage VINT.

The fifth switching element T5 may include a control electrode for receiving the emission signal EM, a first electrode for receiving the first power voltage ELVDD and a second electrode connected to the second node N2.

The sixth switching element T6 may include a control electrode for receiving the emission signal EM, a first electrode connected to the third node N3 and a second electrode connected to an anode electrode of the light emitting element EE.

In the present embodiment, the seventh switching element T7 may include a control electrode for receiving the compensation gate signal GC, a first electrode for receiving a second initialization voltage VAINT and a second electrode connected to the anode electrode. Thus, in the present embodiment, the anode electrode of the light emitting element EE may be initialized in the second period DR2 of FIG. 30 and the third period DR3 of FIG. 32 when the compensation gate signal GC has the active level.

The light emitting element EE may include the anode electrode and a cathode electrode for receiving a second power voltage ELVSS.

For example, the first switching element T1 may be the P-type transistor. The second switching element T2 may be the P-type transistor. The third switching element T3 may be the N-type transistor. The fourth switching element T4 may be the N-type transistor. The fifth switching element T5 may be the P-type transistor. The sixth switching element T6 may be the P-type transistor. The seventh switching element T7 may be the N-type transistor.

According to the present embodiment, the driving current IEE of the light emitting element EE may be determined based on the difference between the reference voltage VREF, which is lower than the first power voltage ELVDD, and the data voltage VDATA in the pixel circuit. Thus, the power consumption of the pixel circuit may be reduced.

Figure 40:
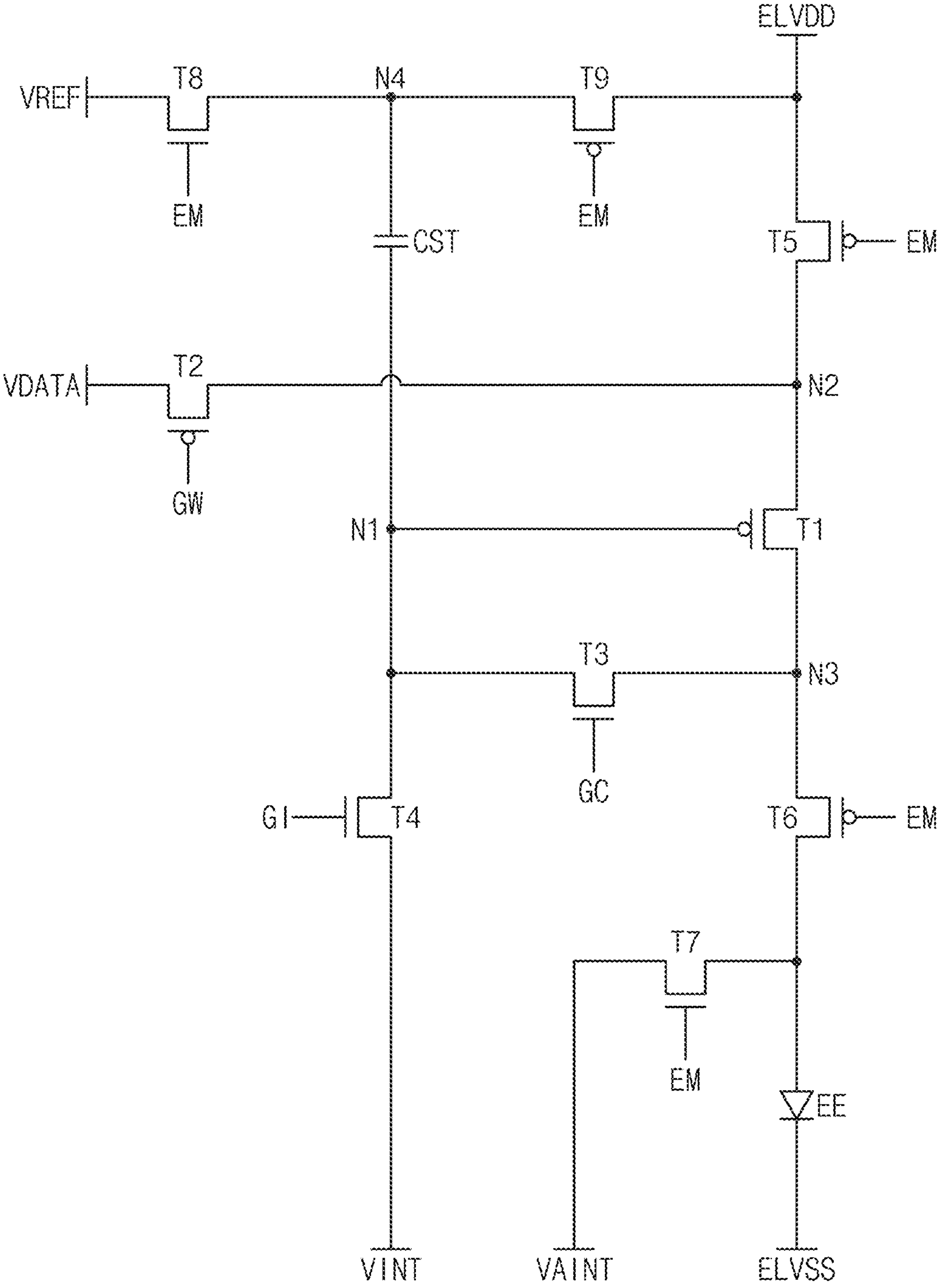
FIG. 40 is a circuit diagram illustrating a pixel circuit of a display apparatus according to an embodiment of the present invention.

FIG. 40 is a circuit diagram illustrating a pixel circuit of a display apparatus according to an embodiment of the present invention.

The pixel circuit of the display apparatus according to the present embodiment is substantially the same as the pixel circuit of the display apparatus of the previous embodiment explained referring to FIGS. 27 to 37 except for the seventh switching element. Thus, the same reference numerals will be used to refer to the same or like parts as those described in the previous embodiment of FIGS. 27 to 37 and any repetitive explanation concerning the above elements will be omitted.

Referring to FIGS. 1 and 40, the pixel circuit includes a light emitting element EE, a first switching element T1, a second switching element T2, a third switching element T3, a capacitor CST, an eighth switching element T8 and a ninth switching element T9.

The first switching element T1 includes a control electrode connected to a first node N1, a first electrode connected to a second node N2 and a second electrode connected to a third node N3. The first switching element T1 applies a driving current to the light emitting element EE.

The second switching element T2 applies a data voltage VDATA to the second node N2 in response to a data writing gate signal GW.

The third switching element T3 connects the first node N1 and the third node N3 in response to a compensation gate signal GC.

The capacitor CST includes a first electrode connected to the first node N1 and a second electrode connected to a fourth node N4.

The eighth switching element T8 includes a first electrode for receiving a reference voltage VREF and a second electrode connected to the fourth node N4. The ninth switching element T9 includes a first electrode for receiving a first power voltage ELVDD and a second electrode connected to the fourth node N4. One of the eighth switching element T8 and the ninth switching element T9 is an N-type transistor and the other of the eighth switching element T8 and the ninth switching element T9 is a P-type transistor. In other words, the eighth switching element T8 and the ninth switching element T9 may form a Complementary Metal Oxide Semiconductor (CMOS) circuit.

In the present embodiment, the eighth switching element T8 may further include a control electrode for receiving the emission signal EM. In addition, the ninth switching element T9 may further include a control electrode for receiving the emission signal EM.

In the present embodiment, the eighth switching element T8 may be an N-type transistor and the ninth switching element T9 may be a P-type transistor. The same signal (the emission signal EM) may be applied to the control electrode of the eighth switching element T8 and the control electrode of the ninth switching element T9. Thus, when the eighth switching element T8 is turned on, the ninth switching element T9 may be turned off. When the eighth switching element T8 is turned off, the ninth switching element T9 may be turned on.

In the present embodiment, the driving current of the light emitting element EE may be determined by a difference between the reference voltage VREF and the data voltage VDATA. The reference voltage VREF may be lower than the first power voltage ELVDD.

The pixel circuit may further include a fourth switching element T4, a fifth switching element T5, a sixth switching element T6 and a seventh switching element T7.

The fourth switching element T4 may include a control electrode for receiving an initialization gate signal GI, a first electrode connected to the first node N1 and a second electrode for receiving a first initialization voltage VINT.

The fifth switching element T5 may include a control electrode for receiving the emission signal EM, a first electrode for receiving the first power voltage ELVDD and a second electrode connected to the second node N2.

The sixth switching element T6 may include a control electrode for receiving the emission signal EM, a first electrode connected to the third node N3 and a second electrode connected to an anode electrode of the light emitting element EE.

In the present embodiment, the seventh switching element T7 may include a control electrode for receiving the emission signal EM, a first electrode for receiving a second initialization voltage VAINT and a second electrode connected to the anode electrode. Thus, in the present embodiment, the anode electrode of the light emitting element EE may be initialized in the first period DR1 of FIG. 28, the second period DR2 of FIG. 30, the third period DR3 of FIG. 32 and the fourth period DR4 of FIG. 34 when the emission signal EM has the inactive level (the high level).

The light emitting element EE may include the anode electrode and a cathode electrode for receiving a second power voltage ELVSS.

For example, the first switching element T1 may be the P-type transistor. The second switching element T2 may be the P-type transistor. The third switching element T3 may be the N-type transistor. The fourth switching element T4 may be the N-type transistor. The fifth switching element T5 may be the P-type transistor. The sixth switching element T6 may be the P-type transistor. The seventh switching element T7 may be the N-type transistor.

According to the present embodiment, the driving current IEE of the light emitting element EE may be determined based on the difference between the reference voltage VREF, which is lower than the first power voltage ELVDD, and the data voltage VDATA in the pixel circuit. Thus, the power consumption of the pixel circuit may be reduced.

Figure 41:
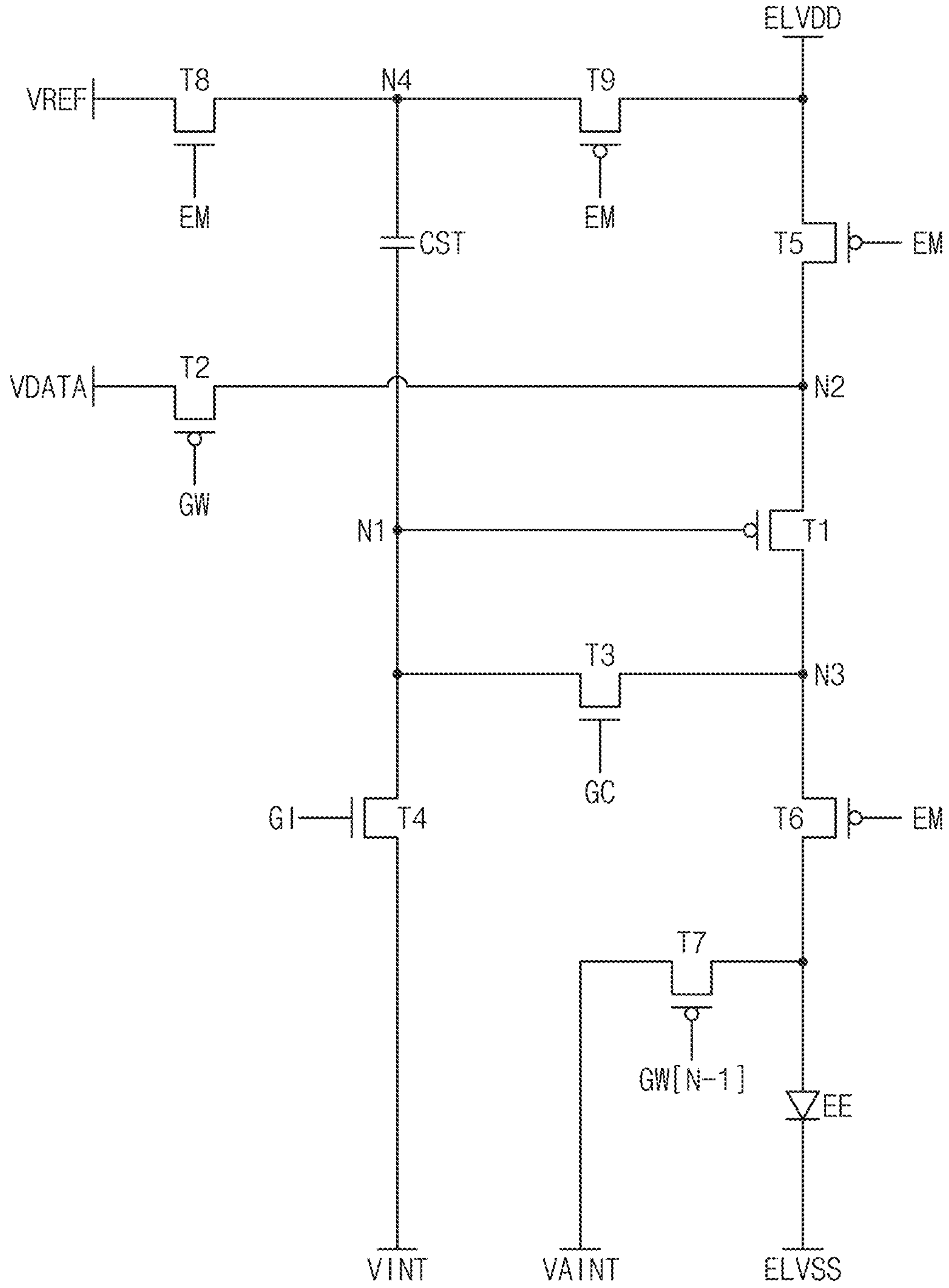
FIG. 41 is a circuit diagram illustrating a pixel circuit of a display apparatus according to an embodiment of the present invention.

FIG. 41 is a circuit diagram illustrating a pixel circuit of a display apparatus according to an embodiment of the present invention.

The pixel circuit of the display apparatus according to the present embodiment is substantially the same as the pixel circuit of the display apparatus of the previous embodiment explained referring to FIGS. 27 to 37 except for the seventh switching element. Thus, the same reference numerals will be used to refer to the same or like parts as those described in the previous embodiment of FIGS. 27 to 37 and any repetitive explanation concerning the above elements will be omitted.

Referring to FIGS. 1 and 41, the pixel circuit includes a light emitting element EE, a first switching element T1, a second switching element T2, a third switching element T3, a capacitor CST, an eighth switching element T8 and a ninth switching element T9.

The first switching element T1 includes a control electrode connected to a first node N1, a first electrode connected to a second node N2 and a second electrode connected to a third node N3. The first switching element T1 applies a driving current to the light emitting element EE.

The second switching element T2 applies a data voltage VDATA to the second node N2 in response to a data writing gate signal GW.

The third switching element T3 connects the first node N1 and the third node N3 in response to a compensation gate signal GC.

The capacitor CST includes a first electrode connected to the first node N1 and a second electrode connected to a fourth node N4.

The eighth switching element T8 includes a first electrode for receiving a reference voltage VREF and a second electrode connected to the fourth node N4. The ninth switching element T9 includes a first electrode for receiving a first power voltage ELVDD and a second electrode connected to the fourth node N4. One of the eighth switching element T8 and the ninth switching element T9 is an N-type transistor and the other of the eighth switching element T8 and the ninth switching element T9 is a P-type transistor. In other words, the eighth switching element T8 and the ninth switching element T9 may form a Complementary Metal Oxide Semiconductor (CMOS) circuit.

In the present embodiment, the eighth switching element T8 may further include a control electrode for receiving the emission signal EM. In addition, the ninth switching element T9 may further include a control electrode for receiving the emission signal EM.

In the present embodiment, the eighth switching element T8 may be an N-type transistor and the ninth switching element T9 may be a P-type transistor. The same signal (the emission signal EM) may be applied to the control electrode of the eighth switching element T8 and the control electrode of the ninth switching element T9. Thus, when the eighth switching element T8 is turned on, the ninth switching element T9 may be turned off. When the eighth switching element T8 is turned off, the ninth switching element T9 may be turned on.

In the present embodiment, the driving current of the light emitting element EE may be determined by a difference between the reference voltage VREF and the data voltage VDATA. The reference voltage VREF may be lower than the first power voltage ELVDD.

The pixel circuit may further include a fourth switching element T4, a fifth switching element T5, a sixth switching element T6 and a seventh switching element T7.

The fourth switching element T4 may include a control electrode for receiving an initialization gate signal GI, a first electrode connected to the first node N1 and a second electrode for receiving a first initialization voltage VINT.

The fifth switching element T5 may include a control electrode for receiving the emission signal EM, a first electrode for receiving the first power voltage ELVDD and a second electrode connected to the second node N2.

The sixth switching element T6 may include a control electrode for receiving the emission signal EM, a first electrode connected to the third node N3 and a second electrode connected to an anode electrode of the light emitting element EE.

In the present embodiment, the seventh switching element T7 may include a control electrode for receiving a data writing gate signal GW[N−1] of a previous stage, a first electrode for receiving a second initialization voltage VAINT and a second electrode connected to the anode electrode.

The light emitting element EE may include the anode electrode and a cathode electrode for receiving a second power voltage ELVSS.

For example, the first switching element T1 may be the P-type transistor. The second switching element T2 may be the P-type transistor. The third switching element T3 may be the N-type transistor. The fourth switching element T4 may be the N-type transistor. The fifth switching element T5 may be the P-type transistor. The sixth switching element T6 may be the P-type transistor. The seventh switching element T7 may be the P-type transistor.

According to the present embodiment, the driving current IEE of the light emitting element EE may be determined based on the difference between the reference voltage VREF, which is lower than the first power voltage ELVDD, and the data voltage VDATA in the pixel circuit. Thus, the power consumption of the pixel circuit may be reduced.

Figure 42:
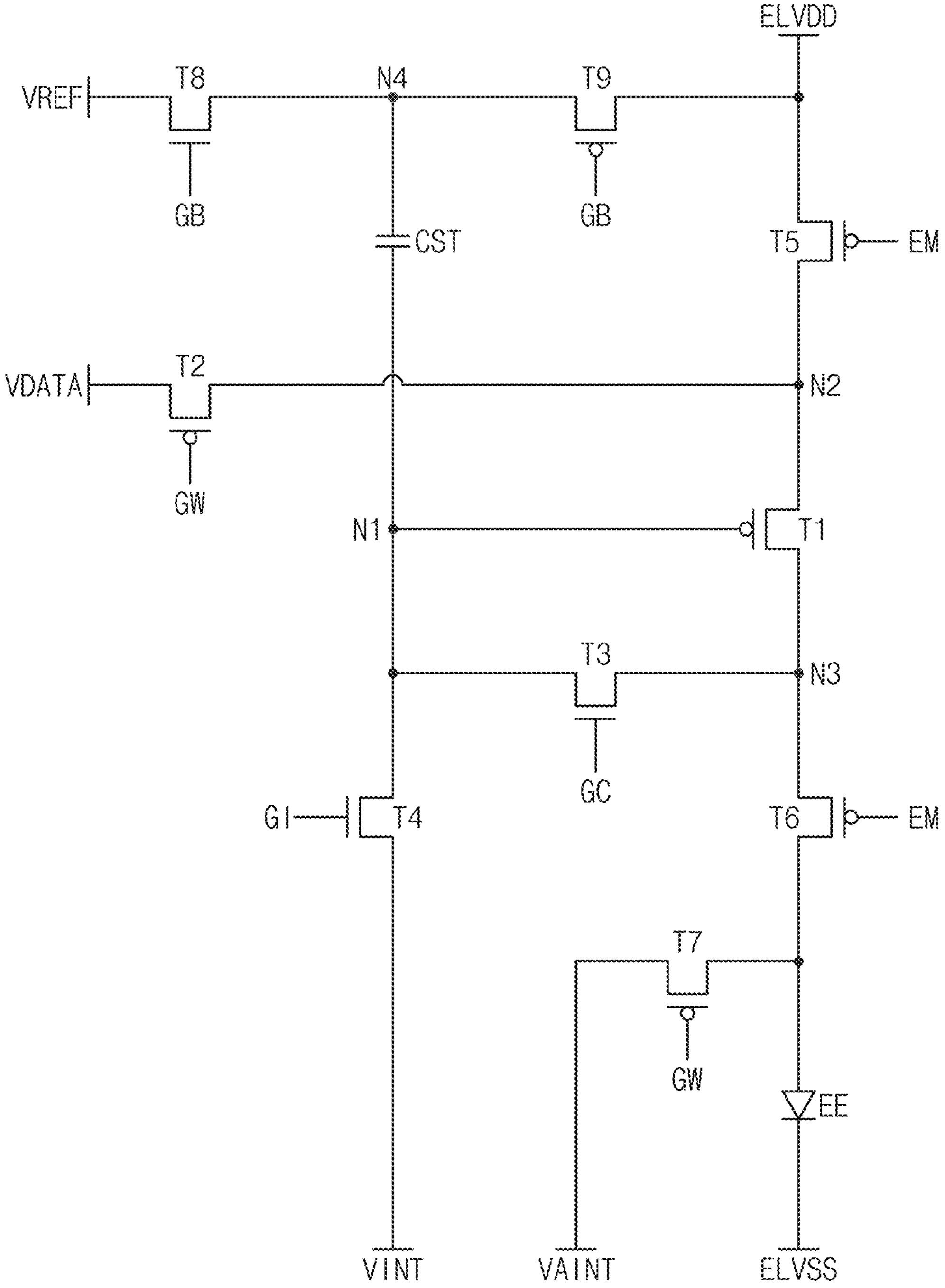
FIG. 42 is a circuit diagram illustrating a pixel circuit of a display apparatus according to an embodiment of the present invention.
Figure 43:
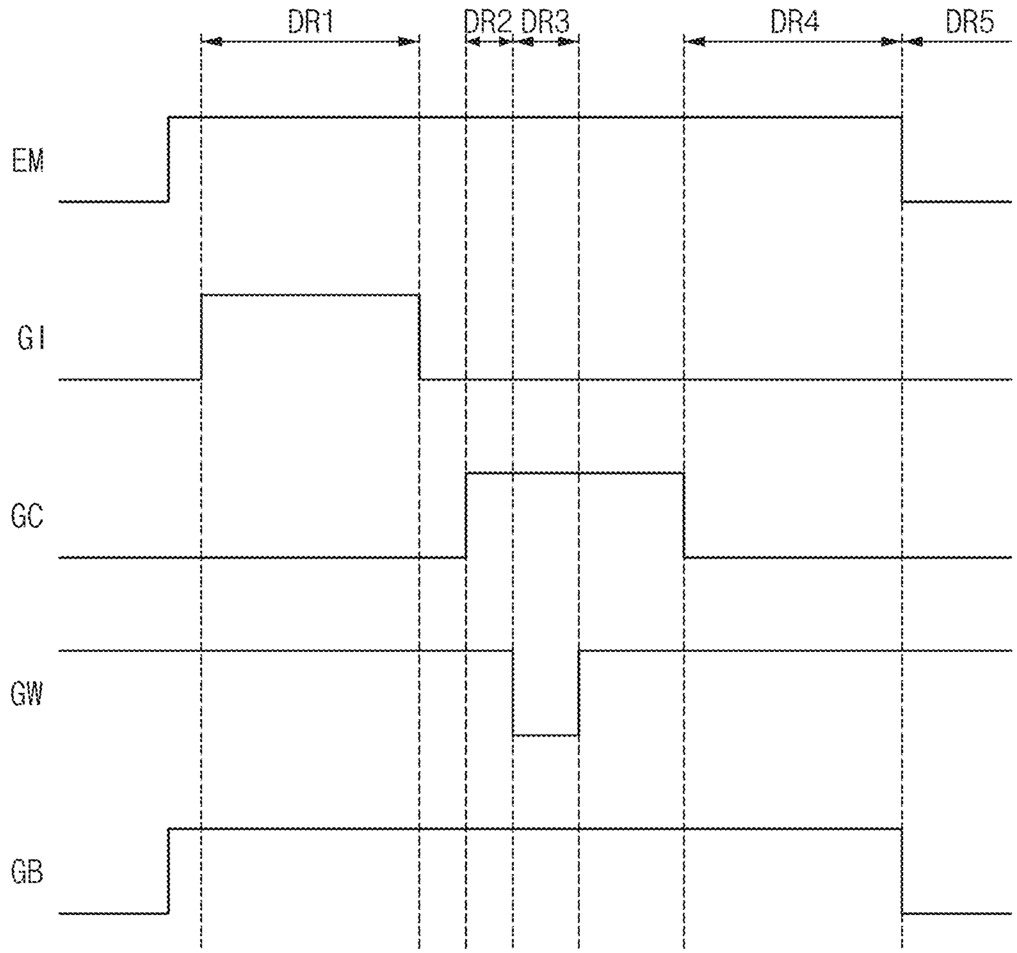
FIG. 43 is a timing diagram illustrating an operation of the pixel circuit of FIG. 42.

FIG. 42 is a circuit diagram illustrating a pixel circuit of a display apparatus according to an embodiment of the present invention. FIG. 43 is a timing diagram illustrating an example of an operation of the pixel circuit of FIG. 42.

The pixel circuit of the display apparatus according to the present embodiment is substantially the same as the pixel circuit of the display apparatus of the previous embodiment explained referring to FIGS. 1 to 12 except for the eighth switching element and the ninth switching element. Thus, the same reference numerals will be used to refer to the same or like parts as those described in the previous embodiment of FIGS. 1 to 12 and any repetitive explanation concerning the above elements will be omitted.

FIGS. 1, 42 and 43, the pixel circuit includes a light emitting element EE, a first switching element T1, a second switching element T2, a third switching element T3, a capacitor CST, an eighth switching element T8 and a ninth switching element T9.

The first switching element T1 includes a control electrode connected to a first node N1, a first electrode connected to a second node N2 and a second electrode connected to a third node N3. The first switching element T1 applies a driving current to the light emitting element EE.

The second switching element T2 applies a data voltage VDATA to the second node N2 in response to a data writing gate signal GW.

The third switching element T3 connects the first node N1 and the third node N3 in response to a compensation gate signal GC.

The capacitor CST includes a first electrode connected to the first node N1 and a second electrode connected to a fourth node N4.

The eighth switching element T8 includes a first electrode for receiving a reference voltage VREF and a second electrode connected to the fourth node N4. The ninth switching element T9 includes a first electrode for receiving a first power voltage ELVDD and a second electrode connected to the fourth node N4. One of the eighth switching element T8 and the ninth switching element T9 is an N-type transistor and the other of the eighth switching element T8 and the ninth switching element T9 is a P-type transistor. In other words, the eighth switching element T8 and the ninth switching element T9 may form a Complementary Metal Oxide Semiconductor (CMOS) circuit.

In the present embodiment, the eighth switching element T8 may further include a control electrode for receiving a reference gate signal GB. In addition, the ninth switching element T9 may further include a control electrode for receiving the reference gate signal GB. While not shown in FIG. 1, the display panel 100 may further include a reference gate line to transfer the reference gate signal GB from the gate driver 300 to the pixels.

In the present embodiment, the eighth switching element T8 may be an N-type transistor and the ninth switching element T9 may be a P-type transistor. The same signal (the reference gate signal GB) may be applied to the control electrode of the eighth switching element T8 and the control electrode of the ninth switching element T9. Thus, when the eighth switching element T8 is turned on, the ninth switching element T9 may be turned off. When the eighth switching element T8 is turned off, the ninth switching element T9 may be turned on.

In the present embodiment, the driving current of the light emitting element EE may be determined by a difference between the reference voltage VREF and the data voltage VDATA. The reference voltage VREF may be lower than the first power voltage ELVDD.

The pixel circuit may further include a fourth switching element T4, a fifth switching element T5, a sixth switching element T6 and a seventh switching element T7.

The fourth switching element T4 may include a control electrode for receiving an initialization gate signal GI, a first electrode connected to the first node N1 and a second electrode for receiving a first initialization voltage VINT.

The fifth switching element T5 may include a control electrode for receiving the emission signal EM, a first electrode for receiving the first power voltage ELVDD and a second electrode connected to the second node N2.

The sixth switching element T6 may include a control electrode for receiving the emission signal EM, a first electrode connected to the third node N3 and a second electrode connected to an anode electrode of the light emitting element EE.

In the present embodiment, the seventh switching element T7 may include a control electrode for receiving the data writing gate signal GW, a first electrode for receiving a second initialization voltage VAINT and a second electrode connected to the anode electrode.

The light emitting element EE may include the anode electrode and a cathode electrode for receiving a second power voltage ELVSS.

For example, the first switching element T1 may be the P-type transistor. The second switching element T2 may be the P-type transistor. The third switching element T3 may be the N-type transistor. The fourth switching element T4 may be the N-type transistor. The fifth switching element T5 may be the P-type transistor. The sixth switching element T6 may be the P-type transistor. The seventh switching element T7 may be the P-type transistor.

A first period DR1 may be an initialization period of the first switching element T1. In the first period DR1, the emission signal EM may have an inactive level, the initialization gate signal GI may have an active level, the compensation gate signal GC may have an inactive level, the data writing gate signal GW may have an inactive level and the reference gate signal GB may have a high level.

Herein, when the transistor receiving the emission signal EM, the initialization gate signal GI, the compensation gate signal GC, the data writing gate signal GW or the reference gate signal GB is a P-type transistor, the active level may be a low level and the inactive level may be a high level. In contrast, when the transistor receiving the emission signal EM, the initialization gate signal GI, the compensation gate signal GC, the data writing gate signal GW or the reference gate signal GB is an N-type transistor, the active level may be a high level and the inactive level may be a low level.

Thus, in FIG. 43, the active level of the emission signal EM may be a low level, the active level of the initialization gate signal GI may be a high level, the active level of the compensation gate signal GC may be a high level, and the active level of the data writing gate signal GW may be a low level. However, a low level of the reference gate signal GB may be the inactive level to the eighth switching element T8 and the active level to the ninth switching element T9, while a high level of the reference gate signal GB may be the active level to the eighth switching element T8 and the inactive level to the ninth switching element T9.

A second period DR2 may be a turn-on period of the compensation gate signal GC. In the second period DR2 subsequent to the first period DR1, the emission signal EM may have the inactive level, the initialization gate signal GI may have an inactive level, the compensation gate signal GC may have an active level, the data writing gate signal GW may have the inactive level and the reference gate signal GB may have the high level.

A third period DR3 may be a data writing and compensation period. In the third period DR3 subsequent to the second period DR2, the emission signal EM may have the inactive level, the initialization gate signal GI may have the inactive level, the compensation gate signal GC may have the active level, the data writing gate signal GW may have an active level and the reference gate signal GB may have the high level.

A fourth period DR4 may be a turn-off period of the compensation gate signal GC. In the fourth period DR4 subsequent to the third period DR3, the emission signal EM may have the inactive level, the initialization gate signal GI may have the inactive level, the compensation gate signal GC may have the inactive level, the data writing gate signal GW may have the inactive level and the reference gate signal GB may have the high level.

A fifth period DR5 may be a light emitting period. In the fifth period DR5 subsequent to the fourth period DR4, the emission signal EM may have an active level, the initialization gate signal GI may have the inactive level, the compensation gate signal GC may have the inactive level, the data writing gate signal GW may have the inactive level and the reference gate signal GB may have a low level.

According to the present embodiment, the driving current of the light emitting element EE may be determined based on the difference between the reference voltage VREF, which is lower than the first power voltage ELVDD, and the data voltage VDATA in the pixel circuit. Thus, the power consumption of the pixel circuit may be reduced.

Figure 44:
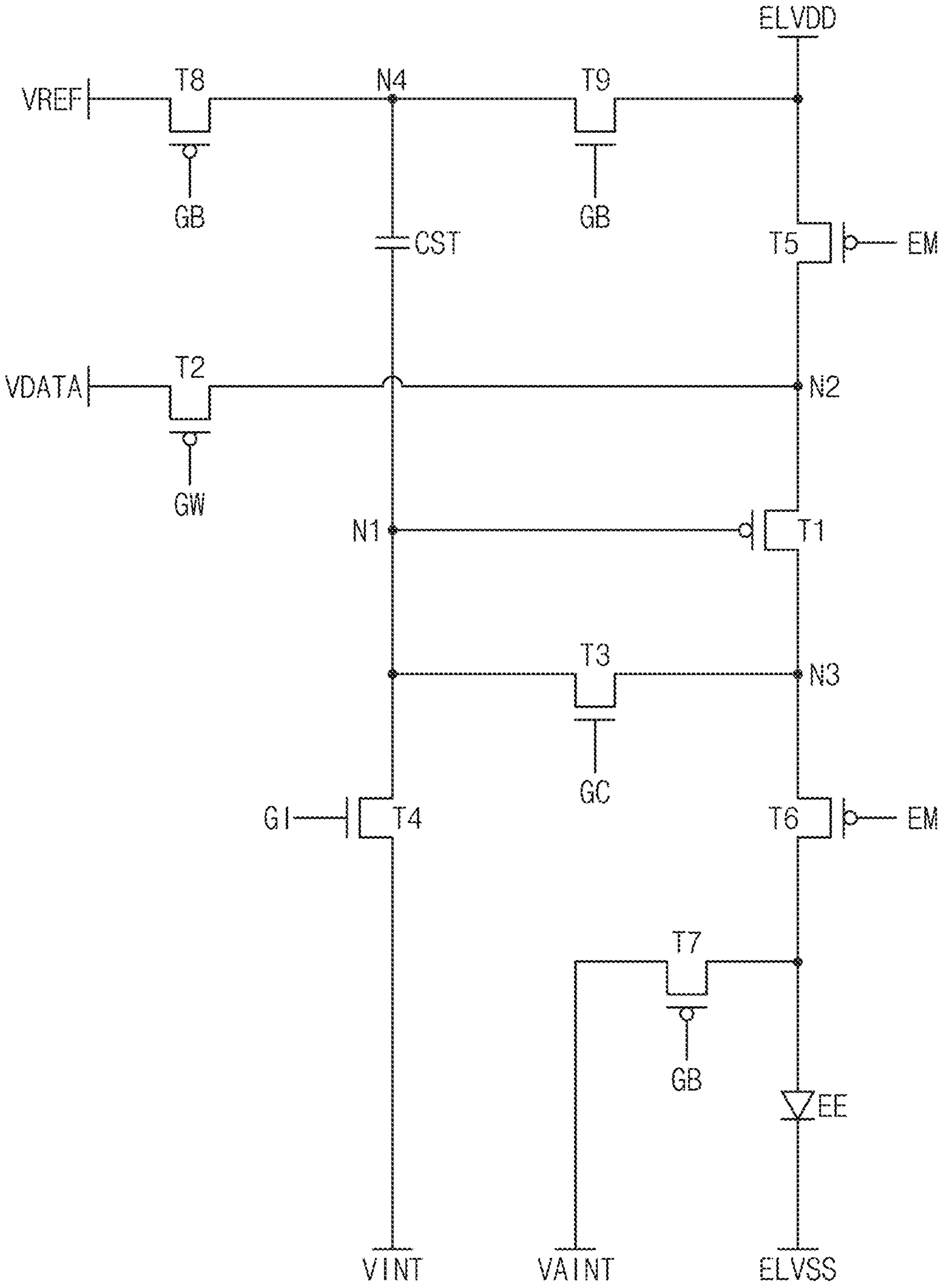
FIG. 44 is a circuit diagram illustrating a pixel circuit of a display apparatus according to an embodiment of the present invention.
Figure 45:
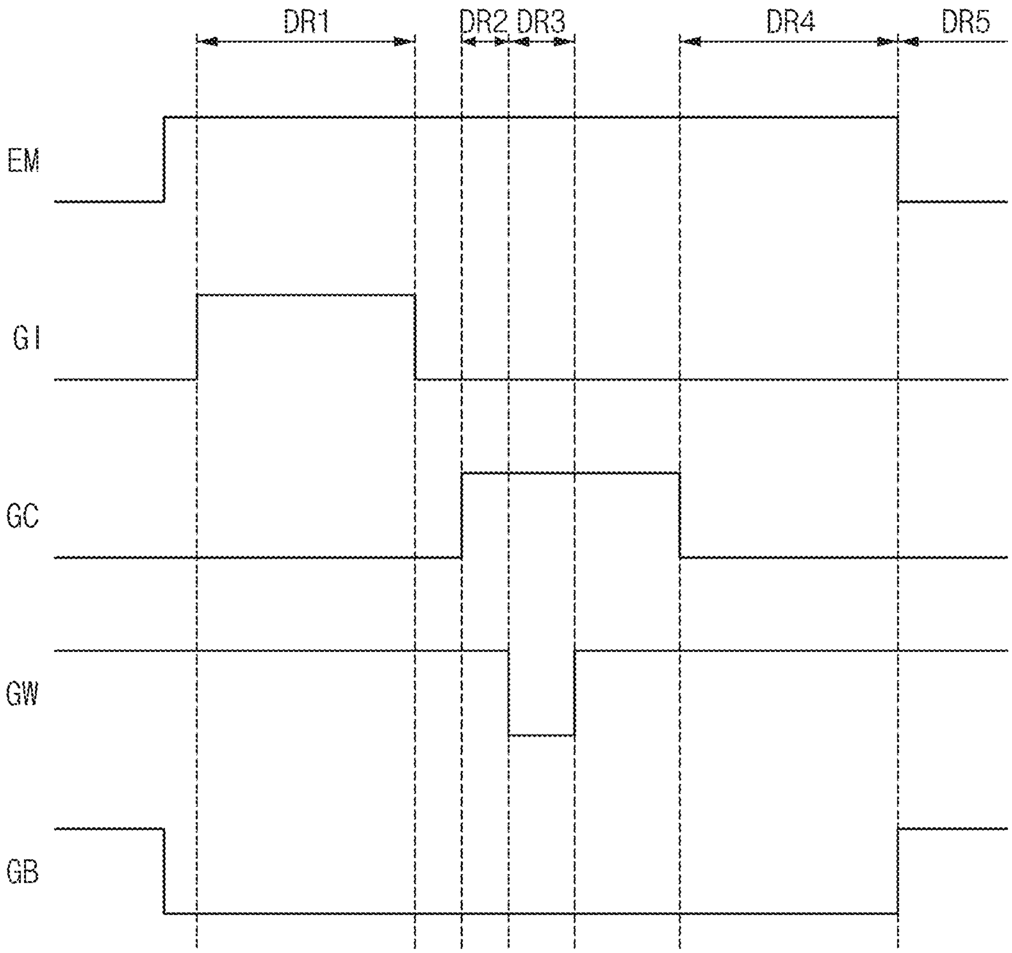
FIG. 45 is a timing diagram illustrating an operation of the pixel circuit of FIG. 44.

FIG. 44 is a circuit diagram illustrating a pixel circuit of a display apparatus according to an embodiment of the present invention. FIG. 45 is a timing diagram illustrating an operation of the pixel circuit of FIG. 44.

The pixel circuit of the display apparatus according to the present embodiment is substantially the same as the pixel circuit of the display apparatus of the previous embodiment explained referring to FIGS. 42 and 43 except for the seventh switching element, the eighth switching element and the ninth switching element. Thus, the same reference numerals will be used to refer to the same or like parts as those described in the previous embodiment of FIGS. 42 and 43 and any repetitive explanation concerning the above elements will be omitted.

FIGS. 1, 44 and 45, the pixel circuit includes a light emitting element EE, a first switching element T1, a second switching element T2, a third switching element T3, a capacitor CST, an eighth switching element T8 and a ninth switching element T9.

The first switching element T1 includes a control electrode connected to a first node N1, a first electrode connected to a second node N2 and a second electrode connected to a third node N3. The first switching element T1 applies a driving current to the light emitting element EE.

The second switching element T2 applies a data voltage VDATA to the second node N2 in response to a data writing gate signal GW.

The third switching element T3 connects the first node N1 and the third node N3 in response to a compensation gate signal GC.

The capacitor CST includes a first electrode connected to the first node N1 and a second electrode connected to a fourth node N4.

The eighth switching element T8 includes a first electrode for receiving a reference voltage VREF and a second electrode connected to the fourth node N4. The ninth switching element T9 includes a first electrode for receiving a first power voltage ELVDD and a second electrode connected to the fourth node N4. One of the eighth switching element T8 and the ninth switching element T9 is an N-type transistor and the other of the eighth switching element T8 and the ninth switching element T9 is a P-type transistor. In other words, the eighth switching element T8 and the ninth switching element T9 may form a Complementary Metal Oxide Semiconductor (CMOS) circuit.

In the present embodiment, the eighth switching element T8 may further include a control electrode for receiving a reference gate signal GB. In addition, the ninth switching element T9 may further include a control electrode for receiving the reference gate signal GB.

In the present embodiment, the eighth switching element T8 may be a P-type transistor and the ninth switching element T9 may be an N-type transistor. The same signal (the reference gate signal GB) may be applied to the control electrode of the eighth switching element T8 and the control electrode of the ninth switching element T9. Thus, when the eighth switching element T8 is turned on, the ninth switching element T9 may be turned off. When the eighth switching element T8 is turned off, the ninth switching element T9 may be turned on.

In the present embodiment, the driving current of the light emitting element EE may be determined by a difference between the reference voltage VREF and the data voltage VDATA. The reference voltage VREF may be lower than the first power voltage ELVDD.

The pixel circuit may further include a fourth switching element T4, a fifth switching element T5, a sixth switching element T6 and a seventh switching element T7.

The fourth switching element T4 may include a control electrode for receiving an initialization gate signal GI, a first electrode connected to the first node N1 and a second electrode for receiving a first initialization voltage VINT.

The fifth switching element T5 may include a control electrode for receiving the emission signal EM, a first electrode for receiving the first power voltage ELVDD and a second electrode connected to the second node N2.

The sixth switching element T6 may include a control electrode for receiving the emission signal EM, a first electrode connected to the third node N3 and a second electrode connected to an anode electrode of the light emitting element EE.

In the present embodiment, the seventh switching element T7 may include a control electrode for receiving the reference gate signal GB, a first electrode for receiving a second initialization voltage VAINT and a second electrode connected to the anode electrode.

The light emitting element EE may include the anode electrode and a cathode electrode for receiving a second power voltage ELVSS.

For example, the first switching element T1 may be the P-type transistor. The second switching element T2 may be the P-type transistor. The third switching element T3 may be the N-type transistor. The fourth switching element T4 may be the N-type transistor. The fifth switching element T5 may be the P-type transistor. The sixth switching element T6 may be the P-type transistor. The seventh switching element T7 may be the P-type transistor.

A first period DR1 may be an initialization period of the first switching element T1. In the first period DR1, the emission signal EM may have an inactive level, the initialization gate signal GI may have an active level, the compensation gate signal GC may have an inactive level, the data writing gate signal GW may have an inactive level and the reference gate signal GB may have a low level.

A second period DR2 may be a turn-on period of the compensation gate signal GC. In the second period DR2 subsequent to the first period DR1, the emission signal EM may have the inactive level, the initialization gate signal GI may have an inactive level, the compensation gate signal GC may have an active level, the data writing gate signal GW may have the inactive level and the reference gate signal GB may have the low level.

A third period DR3 may be a data writing and compensation period. In the third period DR3 subsequent to the second period DR2, the emission signal EM may have the inactive level, the initialization gate signal GI may have the inactive level, the compensation gate signal GC may have the active level, the data writing gate signal GW may have an active level and the reference gate signal GB may have the low level.

A fourth period DR4 may be a turn-off period of the compensation gate signal GC. In the fourth period DR4 subsequent to the third period DR3, the emission signal EM may have the inactive level, the initialization gate signal GI may have the inactive level, the compensation gate signal GC may have the inactive level, the data writing gate signal GW may have the inactive level and the reference gate signal GB may have the low level.

A fifth period DR5 may be a light emitting period. In the fifth period DR5 subsequent to the fourth period DR4, the emission signal EM may have an active level, the initialization gate signal GI may have the inactive level, the compensation gate signal GC may have the inactive level, the data writing gate signal GW may have the inactive level and the reference gate signal GB may have a high level.

According to the present embodiment, the driving current of the light emitting element EE may be determined based on the difference between the reference voltage VREF, which is lower than the first power voltage ELVDD, and the data voltage VDATA in the pixel circuit. Thus, the power consumption of the pixel circuit may be reduced.

Figure 46:
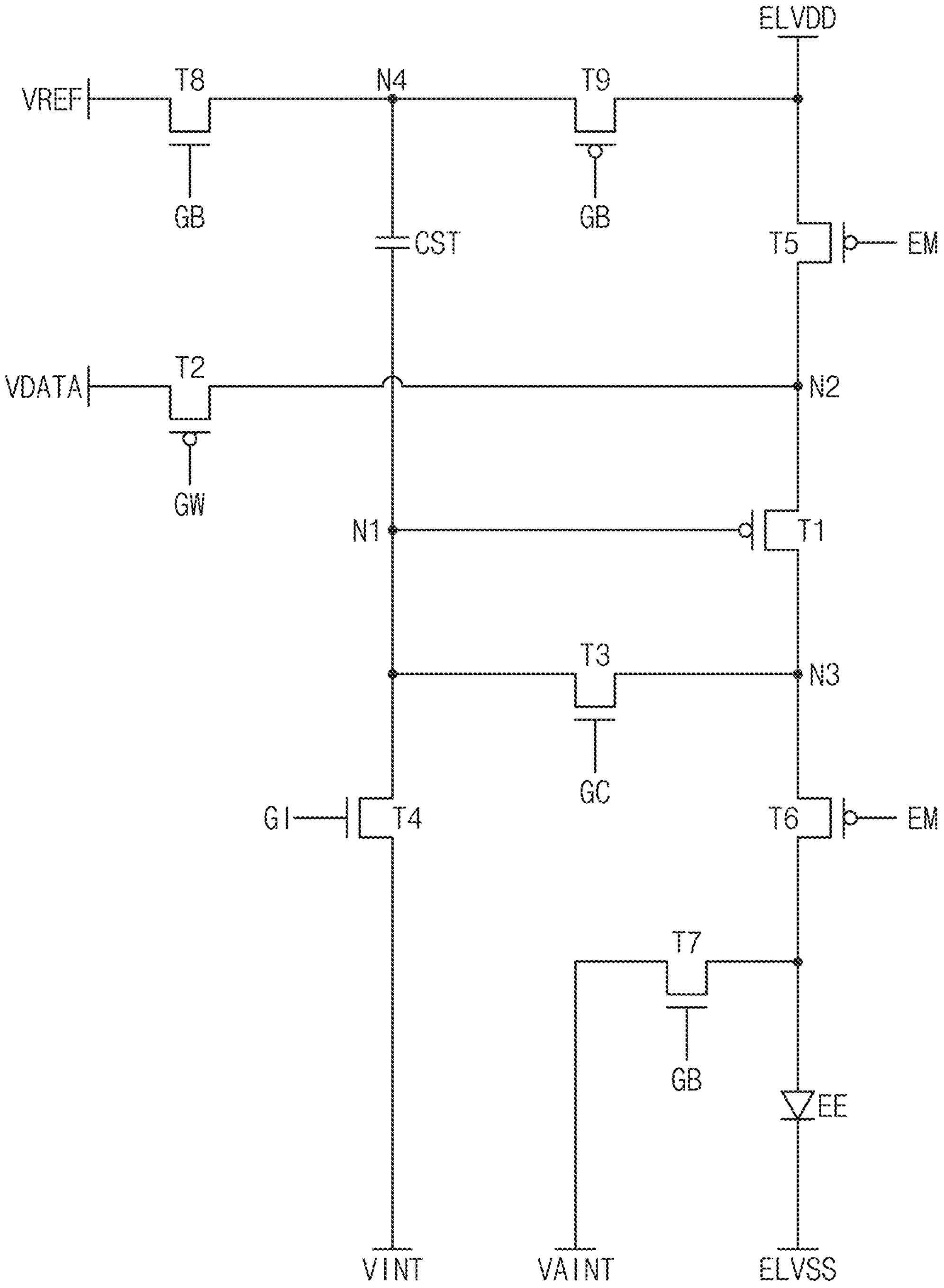
FIG. 46 is a circuit diagram illustrating a pixel circuit of a display apparatus according to an embodiment of the present invention.

FIG. 46 is a circuit diagram illustrating a pixel circuit of a display apparatus according to an embodiment of the present invention.

The pixel circuit of the display apparatus according to the present embodiment is substantially the same as the pixel circuit of the display apparatus of the previous embodiment explained referring to FIGS. 42 and 43 except for the seventh switching element. Thus, the same reference numerals will be used to refer to the same or like parts as those described in the previous embodiment of FIGS. 42 and 43 and any repetitive explanation concerning the above elements will be omitted.

FIGS. 1 and 46, the pixel circuit includes a light emitting element EE, a first switching element T1, a second switching element T2, a third switching element T3, a capacitor CST, an eighth switching element T8 and a ninth switching element T9.

The first switching element T1 includes a control electrode connected to a first node N1, a first electrode connected to a second node N2 and a second electrode connected to a third node N3. The first switching element T1 applies a driving current to the light emitting element EE.

The second switching element T2 applies a data voltage VDATA to the second node N2 in response to a data writing gate signal GW.

The third switching element T3 connects the first node N1 and the third node N3 in response to a compensation gate signal GC.

The capacitor CST includes a first electrode connected to the first node N1 and a second electrode connected to a fourth node N4.

The eighth switching element T8 includes a first electrode for receiving a reference voltage VREF and a second electrode connected to the fourth node N4. The ninth switching element T9 includes a first electrode for receiving a first power voltage ELVDD and a second electrode connected to the fourth node N4. One of the eighth switching element T8 and the ninth switching element T9 is an N-type transistor and the other of the eighth switching element T8 and the ninth switching element T9 is a P-type transistor. In other words, the eighth switching element T8 and the ninth switching element T9 may form a Complementary Metal Oxide Semiconductor (CMOS) circuit.

In the present embodiment, the eighth switching element T8 may further include a control electrode for receiving a reference gate signal GB. In addition, the ninth switching element T9 may further include a control electrode for receiving the reference gate signal GB.

In the present embodiment, the eighth switching element T8 may be an N-type transistor and the ninth switching element T9 may be a P-type transistor. The same signal (the reference gate signal GB) may be applied to the control electrode of the eighth switching element T8 and the control electrode of the ninth switching element T9. Thus, when the eighth switching element T8 is turned on, the ninth switching element T9 may be turned off. When the eighth switching element T8 is turned off, the ninth switching element T9 may be turned on.

In the present embodiment, the driving current of the light emitting element EE may be determined by a difference between the reference voltage VREF and the data voltage VDATA. The reference voltage VREF may be lower than the first power voltage ELVDD.

The pixel circuit may further include a fourth switching element T4, a fifth switching element T5, a sixth switching element T6 and a seventh switching element T7.

The fourth switching element T4 may include a control electrode for receiving an initialization gate signal GI, a first electrode connected to the first node N1 and a second electrode for receiving a first initialization voltage VINT.

The fifth switching element T5 may include a control electrode for receiving the emission signal EM, a first electrode for receiving the first power voltage ELVDD and a second electrode connected to the second node N2.

The sixth switching element T6 may include a control electrode for receiving the emission signal EM, a first electrode connected to the third node N3 and a second electrode connected to an anode electrode of the light emitting element EE.

In the present embodiment, the seventh switching element T7 may include a control electrode for receiving the reference gate signal GB, a first electrode for receiving a second initialization voltage VAINT and a second electrode connected to the anode electrode.

The light emitting element EE may include the anode electrode and a cathode electrode for receiving a second power voltage ELVSS.

For example, the first switching element T1 may be the P-type transistor. The second switching element T2 may be the P-type transistor. The third switching element T3 may be the N-type transistor. The fourth switching element T4 may be the N-type transistor. The fifth switching element T5 may be the P-type transistor. The sixth switching element T6 may be the P-type transistor. The seventh switching element T7 may be the N-type transistor.

According to the present embodiment, the driving current of the light emitting element EE may be determined based on the difference between the reference voltage VREF, which is lower than the first power voltage ELVDD, and the data voltage VDATA in the pixel circuit. Thus, the power consumption of the pixel circuit may be reduced.

While it is not shown in the figures, control electrodes that receive the same gate signal or emission signal may be directly connected to each other, since the same line transfers the same gate or emission signal. For example, in the embodiment of the pixel circuit of FIG. 2, the control electrodes of the third, eighth, and ninth switching elements T3, T8, and T9 may be directly connected to each other to receive the same compensation gate signal GC through the same compensation gate line GCL, the control electrodes of the second and seventh switching elements T2 and T7 may be directly connected to each other to receive the same data writing gate signal GW through the same data writing gate line GWL, and the control electrodes of the fifth and sixth switching elements T5 and T6 may be directly connected to each other to receive the same emission signal EM through the same emission line EML. For another example, in the embodiment of the pixel circuit of FIG. 42, the control electrodes of the eighth and ninth switching elements T8, and T9 may be directly connected to each other to receive the same reference gate signal GB through the same reference gate line, the control electrodes of the second and seventh switching elements T2 and T7 may be directly connected to each other to receive the same data writing gate signal GW through the same data writing gate line GWL, and the control electrodes of the fifth and sixth switching elements T5 and T6 may be directly connected to each other to receive the same emission signal EM through the same emission line EML.

Figure 47:
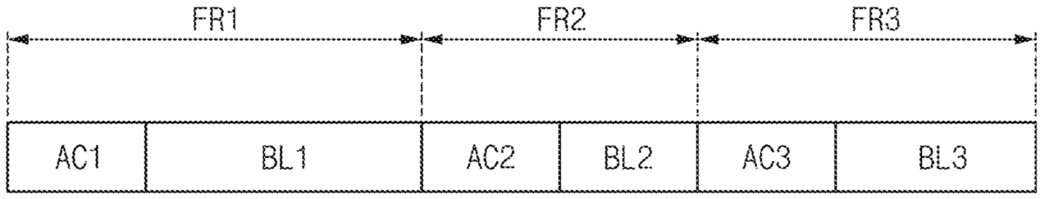
FIG. 47 is a timing diagram illustrating an operation of the pixel circuits of FIGS. 42, 44 and 46.
Figure 48:
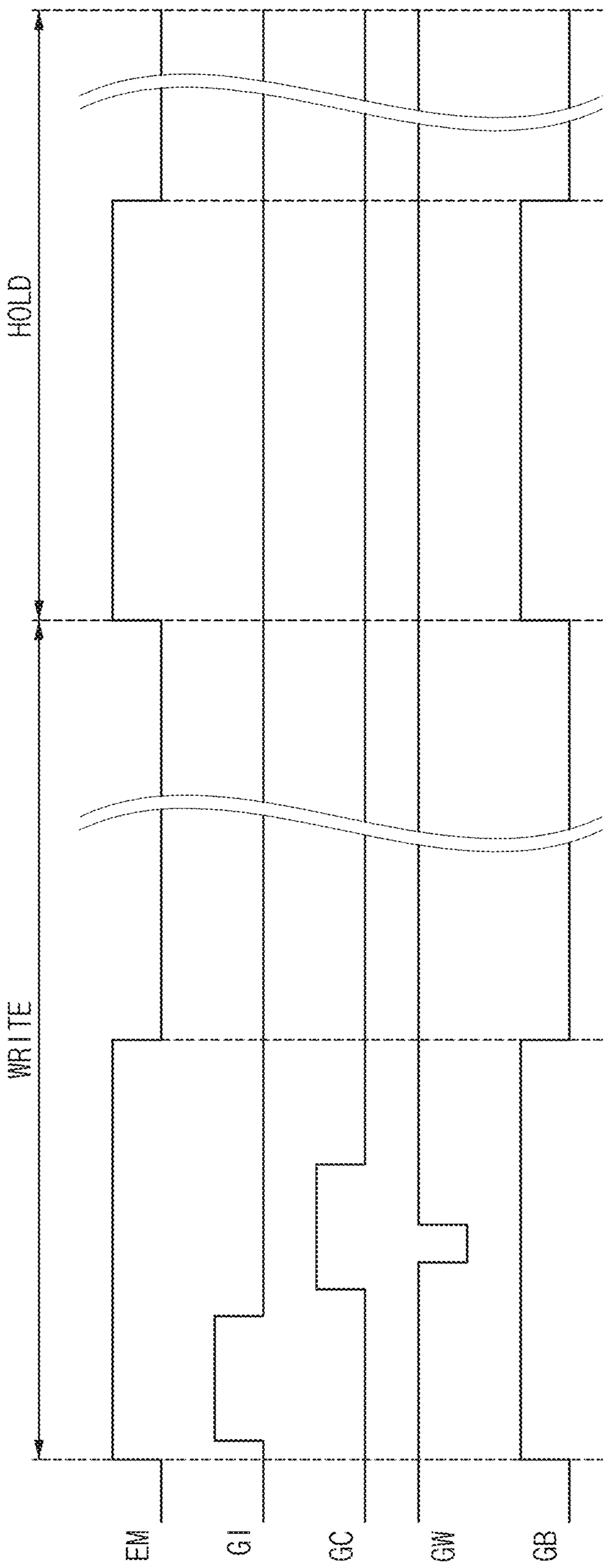
FIG. 48 is a timing diagram illustrating an operation of the pixel circuits of FIGS. 42 and 46.

FIG. 47 is a timing diagram illustrating an operation of the pixel circuits of FIGS. 42, 44 and 46. FIG. 48 is a timing diagram illustrating an operation of the pixel circuits of FIGS. 42 and 46.

FIGS. 47 and 48 represent a case in which the display panel 100 including the pixel circuit of FIGS. 42, 44 and 46 is driven in a variable frequency.

In a variable frequency driving, a first frame FR1 having a first frequency may include a first active period AC1 and a first blank period BL1. A second frame FR2 having a second frequency different from the first frequency may include a second active period AC2 and a second blank period BL2. A third frame FR3 having a third frequency different from the first frequency and the second frequency may include a third active period AC3 and a third blank period BL3.

A length of the first active period AC1 may be the same as a length of the second active period AC2. A length of the first blank period BL1 may be different from a length of the second blank period BL2.

The length of the second active period AC2 may be the same as a length of the third active period AC3. The length of the second blank period BL2 may be different from a length of the third blank period BL3.

A driving sequence of the display apparatus supporting the variable frequency driving may include a writing frame WRITE in which the data voltage is written to the pixel and the pixel emits a light and a holding frame HOLD in which the data voltage is not written to the pixel and the pixel emits a light. The writing frame WRITE may be disposed in the active period AC1, AC2 and AC3. The holding frame HOLD may be disposed in the blank period BL1, BL2 and BL3.

For example, in the writing frame WRITE, the data voltage VDATA may be written to the second node N2 and the light emitting element EE may emit a light. For example, in the holding frame HOLD, the data voltage VDATA may not be written to the second node N2 and the light emitting element EE may emit a light.

As shown in FIG. 48, in the writing frame WRITE, the emission signal EM may have an active period and an inactive period, the initialization gate signal GI may have an active period and an inactive period, the compensation gate signal GC may have an active period and an inactive period, the data writing gate signal GW may have an active period and an inactive period and the reference gate signal GB may have an active period and an inactive period. In the writing frame WRITE, waveforms of the emission signal EM, the initialization gate signal GI, the compensation gate signal GC, the data writing gate signal GW and the reference gate signal GB may be the same as the waveforms of the emission signal EM, the initialization gate signal GI, the compensation gate signal GC, the data writing gate signal GW and the reference gate signal GB of FIG. 43. Alternatively, in the writing frame WRITE, a waveform of the reference gate signal GB may be the same as the waveform of the reference gate signal GB of FIG. 45.

In contrast, as shown in FIG. 48, in the holding frame HOLD, the emission signal EM may have the active period and the inactive period, the initialization gate signal GI may have only the inactive period, the compensation gate signal GC may have only the inactive period, the data writing gate signal GW may have only the inactive period and the reference gate signal GB may have the active period and the inactive period.

In the writing frame WRITE, the reference voltage VREF may have a first voltage level. In the holding frame HOLD, the reference voltage VREF may have a second voltage level lower than the first voltage level.

In the writing frame WRITE, the reference voltage VREF may be a power voltage for determining the driving current of the light emitting element EE. In the holding frame HOLD, the reference voltage VREF may be a bias voltage applied to the first switching element T1.

In the present embodiment, the pixel circuit may support the variable frequency driving so that the power consumption of the display apparatus may be reduced.

Figure 49:
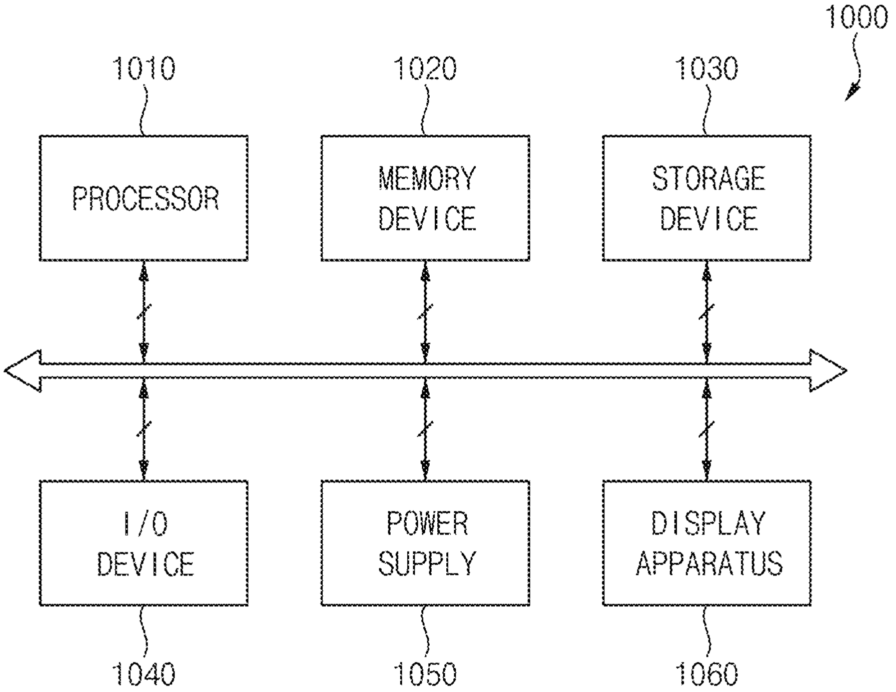
FIG. 49 is a block diagram illustrating an electronic apparatus according to an embodiment of the present invention.
Figure 50:
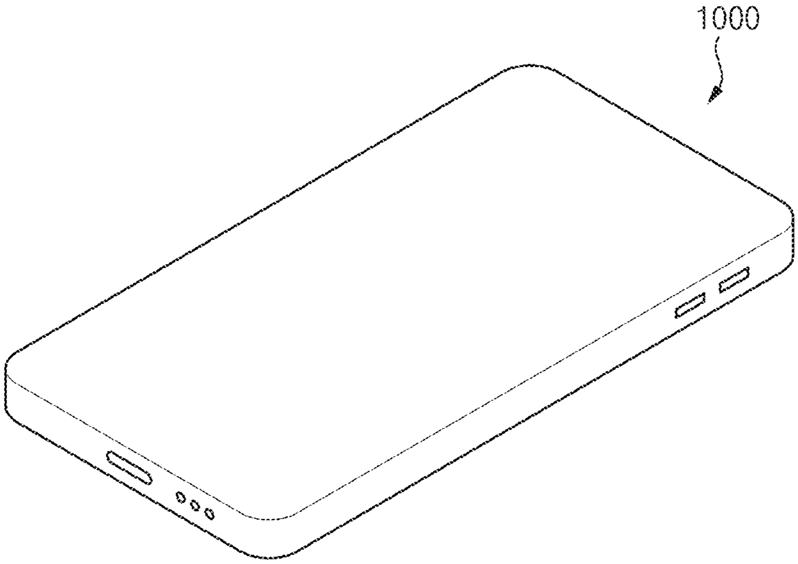
FIG. 50 is a diagram illustrating an example in which the electronic apparatus of FIG. 49 is implemented as a smart phone.

FIG. 49 is a block diagram illustrating an electronic apparatus according to an embodiment of the present invention. FIG. 50 is a diagram illustrating an example in which the electronic apparatus of FIG. 49 is implemented as a smart phone.

Referring to FIGS. 49 and 50, the electronic apparatus 1000 may include a processor 1010, a memory device 1020, a storage device 1030, an input/output (I/O) device 1040, a power supply 1050, and a display apparatus 1060. Here, the display apparatus 1060 may be the display apparatus of FIG. 1. In addition, the electronic apparatus 1000 may further include a plurality of ports for communicating with a video card, a sound card, a memory card, a universal serial bus (USB) device, other electronic apparatuses, etc.

In an embodiment, as illustrated in FIG. 50, the electronic apparatus 1000 may be implemented as a smart phone. However, the electronic apparatus 1000 is not limited thereto. For example, the electronic apparatus 1000 may be implemented as a cellular phone, a video phone, a smart pad, a smart watch, a tablet PC, a car navigation system, a computer monitor, a laptop, a head mounted display (HMD) device, and the like.

The processor 1010 may perform various computing functions or various tasks. The processor 1010 may be a micro-processor, a central processing unit (CPU), an application processor (AP), and the like. The processor 1010 may be coupled to other components via an address bus, a control bus, a data bus, etc. Further, the processor 1010 may be coupled to an extended bus such as a peripheral component interconnection (PCI) bus.

The processor 1010 may output the input image data IMG and the input control signal CONT to the driving controller 200 of FIG. 1.

The memory device 1020 may store data for operations of the electronic apparatus 1000. For example, the memory device 1020 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, and the like and/or at least one volatile memory device such as a dynamic random access memory (DRAM) device, a static random access memory (SRAM) device, a mobile DRAM device, and the like.

The storage device 1030 may include a solid state drive (SSD) device, a hard disk drive (HDD) device, a CD-ROM device, and the like. The I/O device 1040 may include an input device such as a keyboard, a keypad, a mouse device, a touch-pad, a touch-screen, and the like and an output device such as a printer, a speaker, and the like. In some embodiments, the display apparatus 1060 may be included in the I/O device 1040. The power supply 1050 may provide power for operations of the electronic apparatus 1000. The display apparatus 1060 may be coupled to other components via the buses or other communication links.

According to the pixel circuit, the display apparatus and the electronic apparatus of the present embodiment as explained above, the pixel circuit may include the light emitting element having the driving current determined based on the difference between the reference voltage and the data voltage so that the power consumption of the display apparatus may be reduced.

The foregoing is illustrative of the present invention and is not to be construed as limiting thereof. Although a few embodiments of the present invention have been described, those skilled in the art will readily appreciate that many modifications are possible in the embodiments without materially departing from the novel teachings and advantages of the present invention. Accordingly, all such modifications are intended to be included within the scope of the present invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The present invention is defined by the following claims, with equivalents of the claims to be included therein.

What is claimed is:

1. A pixel circuit comprising:
a light emitting element;
a first switching element including a control electrode connected to a first node, a first electrode connected to a second node and a second electrode connected to a third node and configured to apply a driving current to the light emitting element;
a second switching element configured to apply a data voltage to the second node in response to a data writing gate signal;
a third switching element configured to connect the first node and the third node in response to a compensation gate signal;
a capacitor including a first electrode connected to the first node and a second electrode connected to a fourth node;
an eighth switching element including a first electrode configured to receive a reference voltage and a second electrode connected to the fourth node; and
a ninth switching element including a first electrode configured to receive a first power voltage and a second electrode connected to the fourth node,
wherein one of the eighth switching element and the ninth switching element is an N-type transistor, and the other of the eighth switching element and the ninth switching element is a P-type transistor.

2. The pixel circuit of claim 1, wherein the reference voltage is lower than the first power voltage.

3. The pixel circuit of claim 1, wherein the driving current is determined by a difference between the reference voltage and the data voltage.

4. The pixel circuit of claim 1, wherein the eighth switching element further includes a control electrode configured to receive the compensation gate signal, and
wherein the ninth switching element further includes a control electrode configured to receive the compensation gate signal.

5. The pixel circuit of claim 4, further comprising:
a fourth switching element including a control electrode configured to receive an initialization gate signal, a first electrode connected to the first node and a second electrode configured to receive a first initialization voltage;
a fifth switching element including a control electrode configured to receive an emission signal, a first electrode configured to receive the first power voltage and a second electrode connected to the second node;
a sixth switching element including a control electrode configured to receive the emission signal, a first electrode connected to the third node and a second electrode connected to an anode electrode of the light emitting element; and
a seventh switching element including a control electrode configured to receive the data writing gate signal, a first electrode configured to receive a second initialization voltage and a second electrode connected to the anode electrode.

6. The pixel circuit of claim 4, further comprising:
a fourth switching element including a control electrode configured to receive an initialization gate signal, a first electrode connected to the first node and a second electrode configured to receive a first initialization voltage;
a fifth switching element including a control electrode configured to receive an emission signal, a first electrode configured to receive the first power voltage and a second electrode connected to the second node;
a sixth switching element including a control electrode configured to receive the emission signal, a first electrode connected to the third node and a second electrode connected to an anode electrode of the light emitting element; and
a seventh switching element including a control electrode configured to receive the initialization gate signal, a first electrode configured to receive a second initialization voltage and a second electrode connected to the anode electrode.

7. The pixel circuit of claim 4, further comprising:
a fourth switching element including a control electrode configured to receive an initialization gate signal, a first electrode connected to the first node and a second electrode configured to receive a first initialization voltage;
a fifth switching element including a control electrode configured to receive an emission signal, a first electrode configured to receive the first power voltage and a second electrode connected to the second node;
a sixth switching element including a control electrode configured to receive the emission signal, a first electrode connected to the third node and a second electrode connected to an anode electrode of the light emitting element; and
a seventh switching element including a control electrode configured to receive the compensation gate signal, a first electrode configured to receive a second initialization voltage and a second electrode connected to the anode electrode.

8. The pixel circuit of claim 4, further comprising:
a fourth switching element including a control electrode configured to receive an initialization gate signal, a first electrode connected to the first node and a second electrode configured to receive a first initialization voltage;
a fifth switching element including a control electrode configured to receive an emission signal, a first electrode configured to receive the first power voltage and a second electrode connected to the second node;
a sixth switching element including a control electrode configured to receive the emission signal, a first electrode connected to the third node and a second electrode connected to an anode electrode of the light emitting element; and
a seventh switching element including a control electrode configured to receive the emission signal, a first electrode configured to receive a second initialization voltage and a second electrode connected to the anode electrode.

9. The pixel circuit of claim 4, further comprising:
a fourth switching element including a control electrode configured to receive an initialization gate signal, a first electrode connected to the first node and a second electrode configured to receive a first initialization voltage;
a fifth switching element including a control electrode configured to receive an emission signal, a first electrode configured to receive the first power voltage and a second electrode connected to the second node;

a sixth switching element including a control electrode configured to receive the emission signal, a first electrode connected to the third node and a second electrode connected to an anode electrode of the light emitting element; and a seventh switching element including a control electrode configured to receive a data writing gate signal of a previous stage, a first electrode configured to receive a second initialization voltage and a second electrode connected to the anode electrode.

10. The pixel circuit of claim 1, wherein the eighth switching element further includes a control electrode configured to receive an emission signal, and wherein the ninth switching element further includes a control electrode configured to receive the emission signal.

11. The pixel circuit of claim 10, further comprising:

a fourth switching element including a control electrode configured to receive an initialization gate signal, a first electrode connected to the first node and a second electrode configured to receive a first initialization voltage;

a fifth switching element including a control electrode configured to receive the emission signal, a first electrode configured to receive the first power voltage and a second electrode connected to the second node;

a sixth switching element including a control electrode configured to receive the emission signal, a first electrode connected to the third node and a second electrode connected to an anode electrode of the light emitting element; and a seventh switching element including a control electrode configured to receive the data writing gate signal, a first electrode configured to receive a second initialization voltage and a second electrode connected to the anode electrode.

12. The pixel circuit of claim 10, further comprising:

a fourth switching element including a control electrode configured to receive an initialization gate signal, a first electrode connected to the first node and a second electrode configured to receive a first initialization voltage;

a fifth switching element including a control electrode configured to receive the emission signal, a first electrode configured to receive the first power voltage and a second electrode connected to the second node;

a sixth switching element including a control electrode configured to receive the emission signal, a first electrode connected to the third node and a second electrode connected to an anode electrode of the light emitting element; and a seventh switching element including a control electrode configured to receive the initialization gate signal, a first electrode configured to receive a second initialization voltage and a second electrode connected to the anode electrode.

13. The pixel circuit of claim 10, further comprising:

a fourth switching element including a control electrode configured to receive an initialization gate signal, a first electrode connected to the first node and a second electrode configured to receive a first initialization voltage;

a fifth switching element including a control electrode configured to receive the emission signal, a first electrode configured to receive the first power voltage and a second electrode connected to the second node;

a sixth switching element including a control electrode configured to receive the emission signal, a first electrode connected to the third node and a second electrode connected to an anode electrode of the light emitting element; and a seventh switching element including a control electrode configured to receive the compensation gate signal, a first electrode configured to receive a second initialization voltage and a second electrode connected to the anode electrode.

14. The pixel circuit of claim 10, further comprising:

a fourth switching element including a control electrode configured to receive an initialization gate signal, a first electrode connected to the first node and a second electrode configured to receive a first initialization voltage;

a fifth switching element including a control electrode configured to receive the emission signal, a first electrode configured to receive the first power voltage and a second electrode connected to the second node;

a sixth switching element including a control electrode configured to receive the emission signal, a first electrode connected to the third node and a second electrode connected to an anode electrode of the light emitting element; and a seventh switching element including a control electrode configured to receive the emission signal, a first electrode configured to receive a second initialization voltage and a second electrode connected to the anode electrode.

15. The pixel circuit of claim 10, further comprising:

a fourth switching element including a control electrode configured to receive an initialization gate signal, a first electrode connected to the first node and a second electrode configured to receive a first initialization voltage;

a fifth switching element including a control electrode configured to receive the emission signal, a first electrode configured to receive the first power voltage and a second electrode connected to the second node;

a sixth switching element including a control electrode configured to receive the emission signal, a first electrode connected to the third node and a second electrode connected to an anode electrode of the light emitting element; and a seventh switching element including a control electrode configured to receive a data writing gate signal of a previous stage, a first electrode configured to receive a second initialization voltage and a second electrode connected to the anode electrode.

16. The pixel circuit of claim 1, wherein the eighth switching element further includes a control electrode configured to receive a reference gate signal, and wherein the ninth switching element further includes a control electrode configured to receive the reference gate signal.

17. The pixel circuit of claim 16, further comprising:

a fourth switching element including a control electrode configured to receive an initialization gate signal, a first electrode connected to the first node and a second electrode configured to receive a first initialization voltage;

a fifth switching element including a control electrode configured to receive an emission signal, a first electrode configured to receive the first power voltage and a second electrode connected to the second node;

a sixth switching element including a control electrode configured to receive the emission signal, a first electrode connected to the third node and a second electrode connected to an anode electrode of the light emitting element; and a seventh switching element including a control electrode configured to receive the data writing gate signal, a first electrode configured to receive a second initialization voltage and a second electrode connected to the anode electrode.

18. The pixel circuit of claim 16, further comprising:

a fourth switching element including a control electrode configured to receive an initialization gate signal, a first electrode connected to the first node and a second electrode configured to receive a first initialization voltage;

a fifth switching element including a control electrode configured to receive an emission signal, a first electrode configured to receive the first power voltage and a second electrode connected to the second node;

a sixth switching element including a control electrode configured to receive the emission signal, a first electrode connected to the third node and a second electrode connected to an anode electrode of the light emitting element; and a seventh switching element including a control electrode configured to receive the reference gate signal, a first electrode configured to receive a second initialization voltage and a second electrode connected to the anode electrode, wherein the seventh switching element and the eighth pixel switching element are P-type transistors, and wherein the ninth switching element is an N-type transistor.

19. The pixel circuit of claim 16, further comprising:

a fourth switching element including a control electrode configured to receive an initialization gate signal, a first electrode connected to the first node and a second electrode configured to receive a first initialization voltage;

a fifth switching element including a control electrode configured to receive an emission signal, a first electrode configured to receive the first power voltage and a second electrode connected to the second node;

a sixth switching element including a control electrode configured to receive the emission signal, a first electrode connected to the third node and a second electrode connected to an anode electrode of the light emitting element; and a seventh switching element including a control electrode configured to receive the reference gate signal, a first electrode configured to receive a second initialization voltage and a second electrode connected to the anode electrode, wherein the seventh switching element and the eighth pixel switching element are N-type transistors, and wherein the ninth switching element is a P-type transistor.

20. The pixel circuit of claim 1, further comprising:

a fourth switching element including a control electrode configured to receive an initialization gate signal;

a fifth switching element including a control electrode configured to receive an emission signal; and a sixth switching element including a control electrode configured to receive the emission signal, wherein the eighth switching element further includes a control electrode configured to receive the compensation gate signal, and wherein the ninth switching element further includes a control electrode configured to receive the compensation gate signal.

21. The pixel circuit of claim 20, wherein, in a first period, the emission signal has an inactive level, the initialization gate signal has an active level, the compensation gate signal has a low level and the data writing gate signal has an inactive level.

22. The pixel circuit of claim 21, wherein, in a second period subsequent to the first period, the emission signal has the inactive level, the initialization gate signal has an inactive level, the compensation gate signal has a high level and the data writing gate signal has the inactive level.

23. The pixel circuit of claim 22, wherein, in a third period subsequent to the second period, the emission signal has the inactive level, the initialization gate signal has the inactive level, the compensation gate signal has the high level and the data writing gate signal has an active level.

24. The pixel circuit of claim 23, wherein, in a fourth period subsequent to the third period, the emission signal has the inactive level, the initialization gate signal has the inactive level, the compensation gate signal has the low level and the data writing gate signal has the inactive level.

25. The pixel circuit of claim 24, wherein, in a fifth period subsequent to the fourth period, the emission signal has an active level, the initialization gate signal has the inactive level, the compensation gate signal has the low level and the data writing gate signal has the inactive level.

26. The pixel circuit of claim 21, wherein, in a second period subsequent to the first period, the emission signal has the inactive level, the initialization gate signal has the active level, the compensation gate signal has an high level and the data writing gate signal has the inactive level.

27. The pixel circuit of claim 1, further comprising:

a fourth switching element including a control electrode configured to receive an initialization gate signal;

a fifth switching element including a control electrode configured to receive an emission signal; and a sixth switching element including a control electrode configured to receive the emission signal, wherein the eighth switching element further includes a control electrode configured to receive the emission signal, and wherein the ninth switching element further includes a control electrode configured to receive the emission signal.

28. The pixel circuit of claim 27, wherein, in a first period, the emission signal has a high level, the initialization gate signal has an active level, the compensation gate signal has an inactive level and the data writing gate signal has an inactive level, wherein, in a third period subsequent to the first period, the emission signal has the high level, the initialization gate signal has an inactive level, the compensation gate signal has an active level and the data writing gate signal has an active level, and wherein, in a fifth period subsequent to the third period, the emission signal has a low level, the initialization gate signal has the inactive level, the compensation gate signal has the inactive level and the data writing gate signal has the inactive level.

29. The pixel circuit of claim 1, further comprising:

a fourth switching element including a control electrode configured to receive an initialization gate signal;

a fifth switching element including a control electrode configured to receive an emission signal; and a sixth switching element including a control electrode configured to receive the emission signal, wherein the eighth switching element further includes a control electrode configured to receive a reference gate signal, and wherein the ninth switching element further includes a control electrode configured to receive the reference gate signal.

30. The pixel circuit of claim 29, wherein, in a first period, the emission signal has an inactive level, the initialization gate signal has an active level, the compensation gate signal has an inactive level, the data writing gate signal has an inactive level and the reference gate signal has a high level, wherein, in a third period subsequent to the first period, the emission signal has the inactive level, the initialization gate signal has an inactive level, the compensation gate signal has an active level, the data writing gate signal has an active level and the reference gate signal has the high level, and wherein, in a fifth period subsequent to the third period, the emission signal has an active level, the initialization gate signal has the inactive level, the compensation gate signal has the inactive level, the data writing gate signal has the inactive level and the reference gate signal has a low level.

31. The pixel circuit of claim 29, wherein, in a writing frame in which the data voltage is written to the second node and the light emitting element emits a light, the emission signal has an active period and an inactive period, the initialization gate signal has an active period and an inactive period, the compensation gate signal has an active period and an inactive period, the data writing gate signal has an active period and an inactive period and the reference gate signal has an active period and an inactive period, and wherein, in a holding frame in which the data voltage is not written to the second node and the light emitting element emits a light, the emission signal has the active period and the inactive period, the initialization gate signal has only the inactive period among the inactive period and the active period, the compensation gate signal has only the inactive period among the inactive period and the active period, the data writing gate signal has only the inactive period among the inactive period and the active period, and the reference gate signal has the active period and the inactive period.

32. The pixel circuit of claim 31, wherein the reference voltage has a first voltage level in the writing frame, and wherein the reference voltage has a second voltage level lower than the first voltage level in the holding frame.

33. A display apparatus comprising:

a display panel including a pixel;

a gate driver configured to apply a gate signal to the pixel;

a data driver configured to apply a data voltage to the pixel; and an emission driver configured to apply an emission signal to the pixel, wherein the pixel comprises:

a light emitting element;

a first switching element including a control electrode connected to a first node, a first electrode connected to a second node and a second electrode connected to a third node and configured to apply a driving current to the light emitting element;

a second switching element configured to apply the data voltage to the second node in response to a data writing gate signal;

a third switching element configured to connect the first node and the third node in response to a compensation gate signal;

a capacitor including a first electrode connected to the first node and a second electrode connected to a fourth node;

an eighth switching element including a first electrode configured to receive a reference voltage and a second electrode connected to the fourth node; and a ninth switching element including a first electrode configured to receive a first power voltage and a second electrode connected to the fourth node, and wherein one of the eighth switching element and the ninth switching element is an N-type transistor and the other of the eighth switching element and the ninth switching element is a P-type transistor.

34. An electronic apparatus comprising:

a display panel including a pixel configured to display an image based on input image data;

a gate driver configured to apply a gate signal to the pixel;

a data driver configured to apply a data voltage to the pixel;

an emission driver configured to apply an emission signal to the pixel;

a driving controller configured to control the gate driver, the data driver and the emission driver, and a host configured to output the input image data to the driving controller, wherein the pixel comprises:

a light emitting element;

a first switching element including a control electrode connected to a first node, a first electrode connected to a second node and a second electrode connected to a third node and configured to apply a driving current to the light emitting element;

a second switching element configured to apply the data voltage to the second node in response to a data writing gate signal;

a third switching element configured to connect the first node and the third node in response to a compensation gate signal;

a capacitor including a first electrode connected to the first node and a second electrode connected to a fourth node;

an eighth switching element including a first electrode configured to receive a reference voltage and a second electrode connected to the fourth node; and a ninth switching element including a first electrode configured to receive a first power voltage and a second electrode connected to the fourth node, and wherein one of the eighth switching element and the ninth switching element is an N-type transistor and the other of the eighth switching element and the ninth switching element is a P-type transistor.

* * * * *